United States Patent
Urayama et al.

(10) Patent No.: US 6,650,061 B1
(45) Date of Patent: Nov. 18, 2003

(54) ELECTRON-SOURCE ARRAY AND MANUFACTURING METHOD THEREOF AS WELL AS DRIVING METHOD FOR ELECTRON-SOURCE ARRAY

(75) Inventors: Masao Urayama, Misato (JP); Hiroshi Ohki, Nerima-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/627,656

(22) Filed: Jul. 28, 2000

(30) Foreign Application Priority Data

Jul. 29, 1999 (JP) .......................... 11-214976
Jul. 19, 2000 (JP) ........................ 2000-219621

(51) Int. Cl.[7] ............................... G09G 3/10
(52) U.S. Cl. ................... 315/169.3; 315/169.4; 313/309; 313/336
(58) Field of Search .................. 313/309, 351, 313/336, 495; 315/169.3, 169.4, 169.1; 445/24

(56) References Cited

U.S. PATENT DOCUMENTS

| | | | | |
|---|---|---|---|---|
| 3,665,241 A | | 5/1972 | Spindt et al. ............... 313/351 |
| 4,857,161 A | * | 8/1989 | Borel et al. ............. 204/192.15 |
| 4,940,916 A | * | 7/1990 | Borel et al. ................. 313/306 |
| 5,451,830 A | * | 9/1995 | Huang ......................... 313/309 |
| 5,973,444 A | * | 10/1999 | Xu et al. ..................... 313/309 |
| 6,031,328 A | * | 2/2000 | Nakamoto ................... 313/495 |
| 6,097,138 A | * | 8/2000 | Nakamoto ................... 313/309 |
| 6,255,771 B1 | * | 7/2001 | Jones et al. ................. 313/306 |

FOREIGN PATENT DOCUMENTS

| | | | |
|---|---|---|---|
| JP | 10-040805 | 2/1998 | ............. H01J/1/30 |
| JP | 11-11917 | 1/1999 | |
| JP | 11-162383 | 6/1999 | |
| JP | 11-194134 | 7/1999 | |
| JP | 11-200090 | 7/1999 | |
| JP | P3008852 | 12/1999 | |
| JP | 2000-31462 | 1/2000 | |

OTHER PUBLICATIONS

"Field emitters based on porous aluminum oxide templates", Davydov, et al. Journal of Applied Physics, vol. 86, No. 7, pp. 3983–3987, Oct. 1, 1999.

"Highly–ordered carbon nanotube arrays for electronics applications", J. Li, et al. Applied Physics Letters, vol. 75, No. 3, pp. 367–369, Jul. 19, 1999.

(List continued on next page.)

Primary Examiner—Haissa Philogene
Assistant Examiner—Ephrem Alemu
(74) Attorney, Agent, or Firm—Edwards & Angell, LLP; David C. Conlin, Esq.; Richard J. Roos, Esq.

(57) ABSTRACT

The electron-source array of the present invention is provided with cathode electrodes placed on an insulation substrate in the form of lines; and gate electrodes that are placed face to face with the cathode electrodes with the insulation film being interpolated in between. In this arrangement, the cathode electrodes and the gate electrodes are arranged so as to intersect each other with a pore being formed at an intersecting portion between each cathode electrode and each gate electrode in a manner so as to penetrate the insulation film, and the pore is filled with a conductive material or a semiconductive material with the material being electrically connected to the corresponding cathode electrode, and is formed in a manner so as to separate from the gate electrodes with a space in between. Thus, it becomes possible to form very fine emitters uniformly without the need for a high-precision patterning technique and consequently to provide an electron-source array that enables an X-Y matrix driving process.

21 Claims, 37 Drawing Sheets

OTHER PUBLICATIONS

"Helical microtubules of graphitic carbon", S. Iijima. Nature, vol. 354, pp. 56–58, Nov. 7, 1991.

"Unraveling Nanotubes: Field Emission from an Atomic Wire", Rinzler, et al. Science, vol. 269, pp. 1550–1553, Sep. 15, 1995.

"A Carbon Nanotube Field–Emisison Electron Source", deHeer, et al. Science, vol. 270, pp. 1179–1180, Nov. 17, 1995.

"Self–Oriented Regular Arrays of Carbon Nanotubes and Their Field Emission Properties", S. Fan, et al. Science, vol. 283, pp. 512–514, Jan. 22, 1999.

* cited by examiner (a)

(b)

(a)

(b)

ELECTRON-SOURCE ARRAY AND MANUFACTURING METHOD THEREOF AS WELL AS DRIVING METHOD FOR ELECTRON-SOURCE ARRAY

FIELD OF THE INVENTION

The present invention relates to an electron source, and more particularly concerns an electron-source array which is applied to displays, fluorescent display tubes, lamps, electron guns, etc., and which can be driven based on the X-Y matrix, and a manufacturing method thereof as well as a driving method for such an electron-source array.

BACKGROUND OF THE INVENTION

In recent years, it has been expected that field emission displays (FED) can be applied to self-emission type flat panel displays, and studies and developments have been extensively made on electron emitting type electron sources. With respect to the electron source used for FEDs, a pyramid-type metal electron source, disclosed by C. A. Spindt et al. as shown in FIG. 35 (U.S. Pat. No. 3,665,241), has been well known.

As illustrated in FIG. 35, the electron source has a construction in which: a cathode electrode 113, a gate insulation layer 114 and a gate electrode 115 are successively stacked on a substrate 112 and a conic shape metal emitter (electron source) 116 electrically connected to the cathode electrode 113 is placed into a through hole 114a reaching the cathode electrode 13, formed in the gate insulation layer 114.

In the above-mentioned electron source, however, although the conic shape metal emitter 116, which is an electron source, is made of a high-melting-point metal material, there have been serious problems relating to the tip-diameter control, uniformity control and reliability of the electron source (metal emitter 116).

Moreover, in 1991, a carbon nanotube was discovered by Iijima, et al. (Nature, 354, 56, 1991). This carbon nanotube has an arrangement in which a graphite layer, rolled into a cylinder shape, is allowed to have a nest shape, and its tip diameter is approximately 10 nm; thus, since this is superior in oxidation resistant property and ion-impact resistant property, this is considered to form a material having superior properties for use as the electron source.

In fact, in 1995, research groups of R. E. Smalley et al. (Science, 269, 1550, 1995) and W. A. de Heer et al. (Science, 270, 1179, 1995) reported electric field discharging experiments from carbon nanotubes. In the electric field discharging experiments of this type, a carbon nanotube is placed on a metal electrode as a cast film and a metal plate mesh is used as a lead-out electrode so that electrons are collected onto an anode that is an opposing electrode.

With respect to an electron source using such a carbon nanotube, for example, Japanese Laid-Open Patent Application No. 162383/1999 (Tokukaihei 11-162383 (published on Jun. 18, 1999)) (hereinafter, referred to as reference 1) has disclosed a technique in which a carbon nanotube in the form of paste is formed on a substrate by a printing method so as to manufacture a plane display.

As illustrated in FIG. 36, in the electron source disclosed in reference 1, a cathode electrode 113 is formed on a substrate 112 as a metal electrode, an insulation layer 121 having contact holes 120 is formed on the cathode electrode 113, ribs 122 are formed on the insulation layer 121 in the form of lines in a manner so as to avoid the contact holes 120, a gate insulation layer 114 is formed on the ribs 112, and a carbon nanotube film 123 is formed so as to cover areas having the contact holes 120 of the insulation layer 121 as a paste film, with an anode electrode 124 being located so as to oppose the gate insulation layer 114 with a space in between.

Moreover, Japanese Laid-Open Patent Application No. 12124/1998 (Tokukaihei 10-12124 (published on Jan. 16, 1998)) (hereinafter, referred to as reference 2) discloses an electron source in which, as illustrated in FIG. 37, an alumina layer 118 is placed on a substrate 112 made of glass with an aluminum layer 117 interpolated in between, and in which pores reaching the aluminum layer 117 are formed in the alumina layer 118. Carbon nanotubes 119, which have grown as metal catalyst starting points, are placed in the respective pores formed in the alumina layer 118 so that the carbon nanotubes 119 to which power is supplied through the aluminum layer 117 are allowed to function as electron sources.

Therefore, conventionally, with respect to the electron source, it has been known that the time-wise stability of the current intensity is improved by allowing the carbon nanotubes to selectively grow in the pores in the metal and regularly arranging the carbon nanotubes.

However, in the conventional electron source using carbon nanotubes as shown in reference 1, as illustrated in FIG. 36, only a paste film is two-dimensionally formed on the cathode electrode 113 that is a metal electrode;

consequently, it is impossible to control a number of electron-emitting points located on the surface of the paste film. For this reason, it is difficult to ensure uniformity between respective pixels that constitute a display.

Moreover, the carbon nanotube film 123, formed on the cathode electrode 113 that is a metal electrode, is a plane paste film, with the result that it becomes difficult to control the electron emitting points, and electron discharge takes place randomly on the paste film that forms the discharging section, with the result that it becomes very difficult to assemble this film into a device.

Moreover, as illustrated in FIG. 37, in reference 2, the division of the electron source is achieved by allowing the carbon nanotubes to selectively grow in the pores in the metal; however, in order to separate the electron source, the anodic oxidation film and metal forming a pre-oxide have to be removed up to the supporting substrate, resulting in a difficulty in carrying out X-Y matrix driving required for a display.

Moreover, since the temperature of this process also reaches 1000° C., this process cannot be applied if there is metal remaining as an unoxidized portion, in particular, if there is low-melting-point metal, such as aluminum, remaining as such.

SUMMARY OF THE INVENTION

The objective of the present invention is to provide an electron-source array which enables X-Y matrix driving that is indispensable for achieving a display and also has a construction that is suitable for practical use in terms of processes, and a manufacturing method for such an electron-source array.

In order to achieve the above-mentioned objective, the electron-source array of the present invention, which is provided with cathode electrodes placed on an insulation substrate in the form of lines and gate electrodes that are placed face to face with the cathode electrodes with the insulation film being interpolated in between, is characterized in that the cathode electrodes and the gate electrodes are arranged so as to orthogonally intersect each other with a pore being formed at an intersecting portion between each cathode electrode and each gate electrode in a manner so as to penetrate the insulation film, and in that the pore is filled with a conductive material or a semiconductive material with the material being electrically connected to the corresponding cathode electrode, and is formed in a manner so as to separate from the gate electrodes with a space in between.

Thus, since the gate electrode is placed in a manner so as to orthogonally intersect the cathode electrode, it is possible to provide a construction that enables the X-Y matrix driving that is indispensable for achieving a display.

Moreover, in order to achieve the above-mentioned objective, the electron-source array of the present invention, which is provided with cathode electrodes placed on an insulation substrate in the form of lines, and gate electrodes that are placed face to face therewith with the insulation film being interpolated in between, may be arranged so that the gate electrodes are placed in a manner so as to surround each of electron emitting areas that are developed planarly on the cathode electrodes, and so that electron emitting sections, which form a plurality of separated divisions on each cathode electrode, are formed within the electron emitting area, with each electron emitting section being constituted by an aggregate mainly formed by an electron emitting material having a fine size.

In other words, in the case when the electron emitting section is constituted by an aggregate mainly formed by an electron emitting material having a fine size (for example, carbon-based materials, such as carbon nanotube, carbon fibers, graphite, diamond and diamond-like carbon), the electron emitting section, formed on each cathode electrode surrounded by the gate electrodes, may be formed separately into a plurality of divisions within the electron emitting area.

In the case when the electron emitting section is constituted by an aggregate of an electron emitting material having a fine size and the electron emitting section, formed on each cathode electrode, is developed in a film shape, it is difficult to control the electron emitting points, and the electron emission takes place randomly within the film face, which is different from the case where the electron emitting sections are formed regularly in the pores. However, when the electron emitting section is separated into a plurality of divisions within the electron emitting area, the electron emitting points are dispersed so that the operation of the electron-source array can be stabilized and uniformed.

Moreover, the manufacturing method of another electron-source array of the present invention comprises the steps of: patterning cathode electrodes on the surface of a substrate, patterning an insulation film on the cathode electrodes and the substrate, patterning a ballast resistance layer, patterning a conductive layer on the ballast resistance layer, patterning a gate insulation film, patterning a pre-oxide that forms an insulation film having the pores on the ballast resistance layer, forming pores in the pre-oxide while converting it into an insulation film, further patterning the insulation film, filling the pores with an electron emitting material, patterning a first gate electrodes, and patterning a second gate electrodes.

Among the manufacturing processes, in the process for forming pores in the pre-oxide after the process for patterning the pre-oxide that forms an insulation film having pores, the present invention features that an anodic oxidation method is adopted by using the cathode electrodes as the corresponding electrodes. In other words, the present invention features that the anodic oxidation method is used as a method for forming the insulation film having pores, and that a method for removing a barrier layer formed through the anodic oxidation and for allowing the pores to penetrate is provided as a method for dissolving the barrier layer by applying a voltage reversed to that of the cathode oxidizing method. In this case, a material that is resistant to the cathode oxidizing solvent is used as the ballast resistance layer; thus, it is possible to use the ballast resistance layer as a stopper layer for protecting the cathode electrodes, and for completely converting the pre-oxide into the insulation film.

For a fuller understanding of the nature and advantages of the invention, reference should be made to the ensuing detailed description taken in conjunction with the accompanying drawings.

DESCRIPTION OF THE EMBODIMENTS

Embodiment 1

The following description will discuss one embodiment of the present invention.

Here, the present embodiment explains a construction in which the electron source of the present invention is applied to a display-use electron-source array that enables X-Y matrix driving.

Figure 1A:
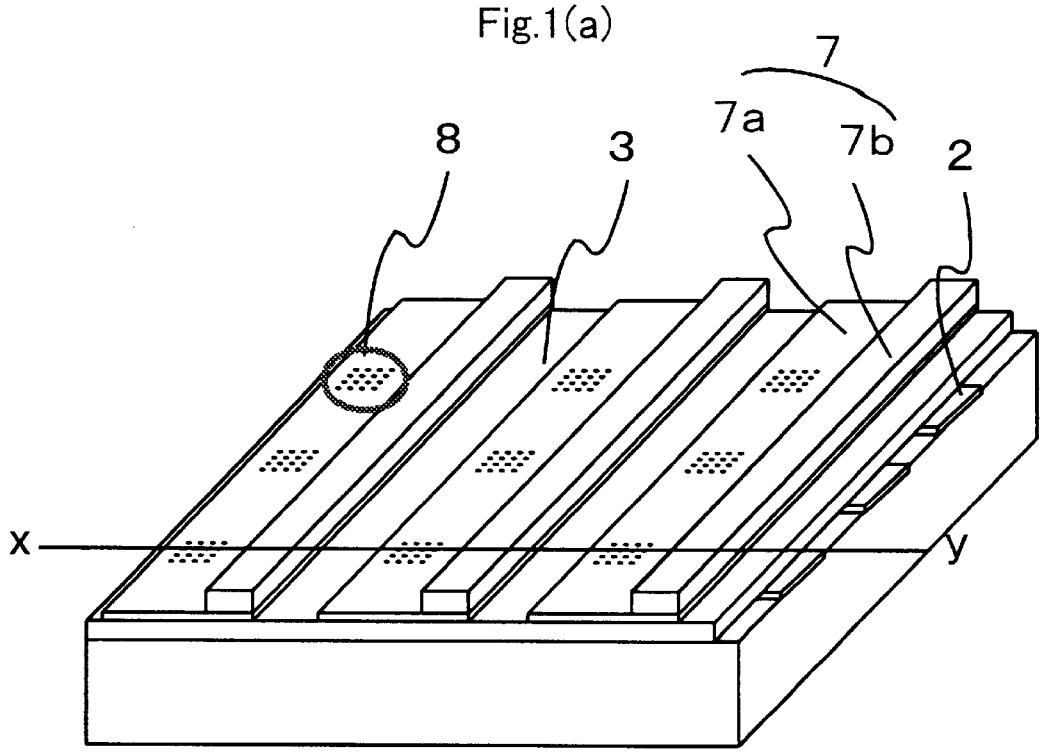
FIG. 1(a) is a perspective view showing an electron-source array of the present invention.
Figure 1B:
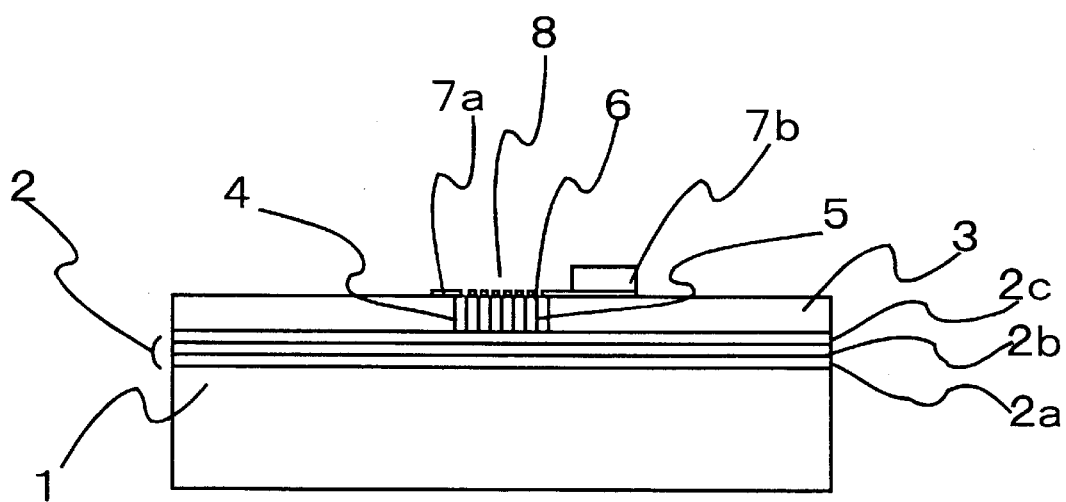
FIG. 1(b) is a cross-sectional view taken along line x-y of FIG. 1(a).

FIG. 1(a) is a perspective view showing the present invention, and FIG. 1(b) is a cross-sectional view taken along line x-y in FIG. 1(a).

An electron emitting area is provided with electron emitting sections 8 that are formed at portions at which cathode wires 2 and gate electrode wires 7 orthogonally intersect each other so as to allow X-Y matrix driving. Moreover, each electron emitting section 8 is constituted by a plurality of emitters 6 formed by filling pores 5 in an insulation film 4 independently formed on each crossing section of the cathode electrode wire 2 and the gate electrode wire 7 with an electron emitting material.

Each cathode electrode wire 2, which supplies electrons to an electron source, is constituted by a cathode electrode layer 2a, a ballast resistance layer 2b and a conductive layer 2c contacting the electron emitting section 8 that are formed in succession from a substrate 1.

In the case when the emitter 6 is constituted by carbon nanotubes, the conductive layer 2c is preferably made from a material that exerts a catalytic action upon forming the carbon nanotubes, or a mixture having such a material as a main component. Thus, the conductive layer 2c is properly selected from metal layers made of any metal selected from the group consisting of metals of the iron family such as iron, nickel and cobalt, metals of the platinum family such as platinum, palladium, ruthenium and rhodium, and rare earth metals such as yttrium, lanthanum and cerium, and alloy layers, etc. containing these metals as their main component; consequently, the resulting effects are lower processing temperatures and selective growth provided by the catalytic action.

Moreover, in the case when the above-mentioned emitter 6 is a metal formed by a plating method, the above-mentioned conductive layer 2c, which is designed in combination with the electron emitting material so as to function as a seed layer for accelerating the growth of a plating material, is properly selected from metal layers such as nickel, iron, cobalt, rhodium, chromium, platinum, copper, gold and silver, or alloy materials, etc., containing a metal such as nickel, iron, cobalt, rhodium, chromium, platinum, copper, gold and silver as a main component.

The gate electrode wire 7 serving as an electron drawing electrode is formed on the upper portion of the insulation film 4 having the pores 5 so as to function as the electron source. With respect to the gate electrode wires 7, the film thickness thereof is sometimes limited depending on its forming method; and in the case when the film thickness is small, the gate wire resistance becomes greater, resulting in problems such as an increase in the power consumption, variations in the application voltage at the electron emitting position and signal delay due to a voltage drop caused by the resistance, etc. In order to avoid such problems, in addition to a first gate insulation layer 7a, it is preferable to install a second gate insulation layer 7b in parallel with the first gate insulation layer 7a as a gate assisting wire, so as to reduce gate-wiring resistance.

Next, the following description will discuss the insulation film 4 having pores 5 used for forming the electron emitting sections 8, which features the present invention. In a typical manufacturing method, the insulation film 4 having the pores 5 is obtained by subjecting a metal film that is a pre-oxide 4a of the insulation film 4 formed on the substrate 1 to an anodic oxidation process. Although it also depends on the oxidizing conditions, the diameter of the pores 5 is preferably formed uniformly in the range of 10 to 100 nm; therefore, without the need for a high-precision pattern forming technique currently used in the semiconductor device process, it is possible to form a fine structure more easily.

Moreover, in the present invention, in a separate manner from the metal film that is the pre-oxide 4a of the insulation film 4 having the pores 5 used for forming the electron emitting sections 8, an anodic oxidation process is carried out by using the cathode electrode wire 2 as the electrode. With this method, the metal film that is the pre-oxide 4a is completely oxidized. In particular, in the case when the carbon nanotubes are filled into the pours 5 by means of the thermal CVD, etc., since the processing temperature tends to rise to not less than 1000° C., aluminum, which is generally used as an anodic oxidation material, is no longer used since the processing temperature exceeds its melting-point, in the case when unoxidized portions exist.

Here, the material to be filled into the pours 5 is properly selected from carbon nanotubes, or metals such as nickel, iron, cobalt, rhodium, chromium, platinum, copper, gold and silver, or semiconductor materials, such as boron nitride and silicon, etc. In the case when the material to be filled into the pores 5 is carbon nanotubes, the formation of the cathode electrode layer by using a transition metal, etc. having a catalytic action, such as iron, makes it possible to provide the following effects: a low formation temperature, a reduction in structural defects in the carbon nanotubes, and a selective growth at necessary portions.

Moreover, the metal film of the pre-oxide 4a is divided into small areas on the substrate, and formed as a pattern; therefore, even in the case of a high-temperature process using the above-mentioned thermal CVD, it is possible to reduce strains occurring in the substrate or between the wires due to thermal expansion, and consequently to make the device immune from temperatures in a wider range. In this manner, as compared with the Spindt type metal electron-source that has been mainly used in recent year, the present invention makes it possible to form a uniform fine electron-source without the need for the application of a high-precision patterning technique, and consequently to increase its density to not less than 10 times; thus, it becomes possible to improve the stability and reproducibility of the electron emitting characteristics.

Figure 2:
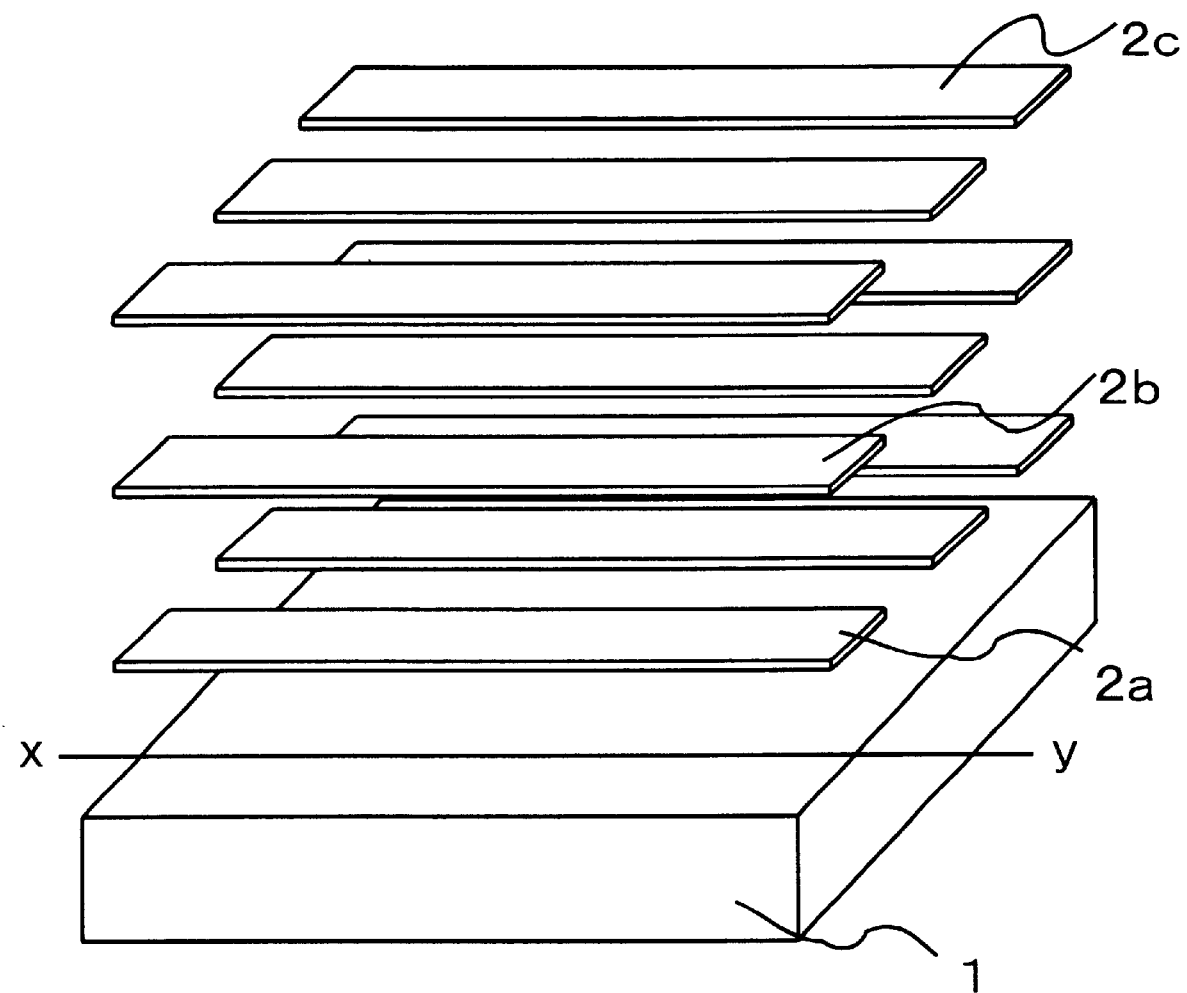
FIG. 2 is a perspective view that shows typical manufacturing processes of the electron-source array of the present invention.

Referring to FIG. 2 and FIG. 3, an explanation will be briefly given of the manufacturing method for the above-mentioned electron-source array. In the present case, carbon nanotubes that are superior in the electron emitting characteristics are used as the electron emitting material.

First, a cathode electrode layer 2a, a ballast resistance layer 2b, an iron alloy layer serving as a conductive layer 2c are formed as laminated layers on a substrate 1 having an insulation surface, and this is patterned in the form of lines (FIG. 2).

Referring to FIGS. 3(a) through 3(f) that are cross-sectional views taken along line x-y of FIG. 2, an explanation will be given of the construction. After the laminating process as shown in FIG. 2, a gate insulation layer 3 is formed, and the gate insulation layer 3 on the cathode electrode wires 2 that form electron emitting sections 8 is removed (FIG. 3(a)). Aluminum serving as a pre-oxide 4a is embedded at the portions thus subjected to the removal by sputtering or an electron beam deposition method (FIG. 3(b)). The aluminum deposited on the insulation layer is removed by a CMP method or a lift-off method. Thus, the formation of the pre-oxide 4a prior to an anode oxidization is completed.

Figure 3A:
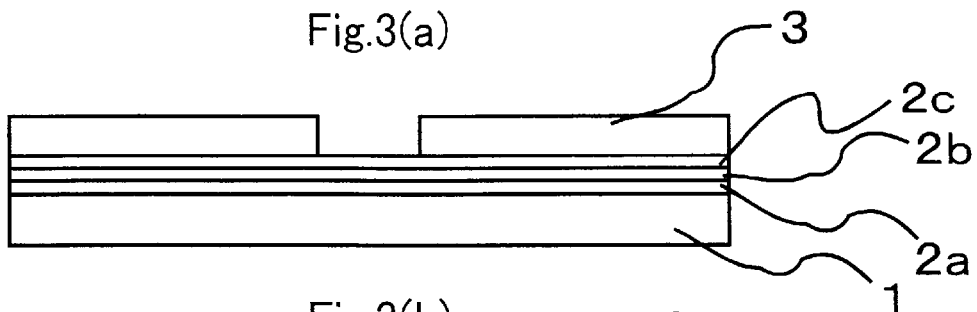
FIGS. 3(a) to 3(f) are explanatory drawings that show typical manufacturing processes of the electron-source array of the present invention.
Figure 3B:
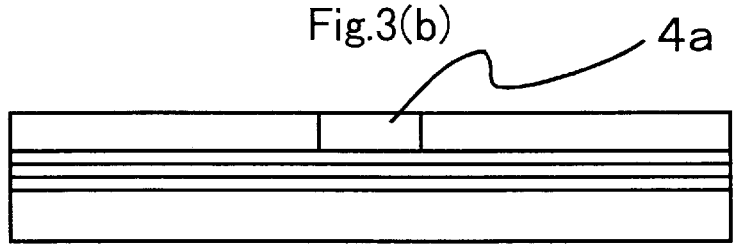
Figure 3C:
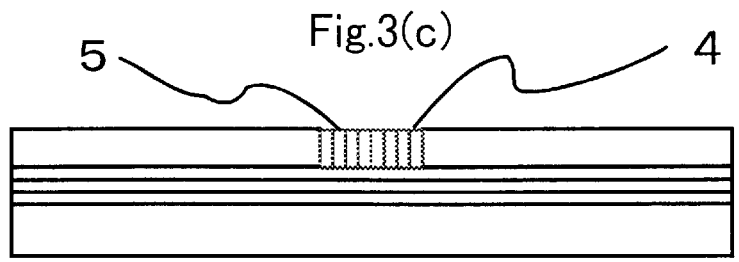

Thereafter, this is subjected to an anodic oxidation in a solution of sulfuric acid so that the aluminum serving as the pre-oxide 4a is oxidized and pores 5 are formed in the alumina (FIG. 3(c)). In this case, since a barrier layer is formed on the electrode interface of the oxidized film, the pore 5 is not allowed to penetrate to reach the electrode. Therefore, in order to remove the barrier layer in the pore 5, a voltage is applied in the direction reversed to that in the oxidizing process, etc.; thus, only the barrier layer is removed.

In the case when the conductive layer 2c is formed by a material such as platinum having resistance to an anodic oxidizing solution, it is allowed to serve as a stopper layer for protecting the cathode electrode 2a, for completely converting the pre-oxide 4a to an insulation film, and for allowing the pore 5 to penetrate to the conductive layer 2c. In contrast, in the case when the conductive layer 2c is formed by a material such as iron that is active to an anodic oxidizing solution, it is preferable to remove the barrier etching layer by using a dry etching method, etc. In this case, the conductive layer 2c can be used as a stopper layer for use in dry etching.

Figure 3D:
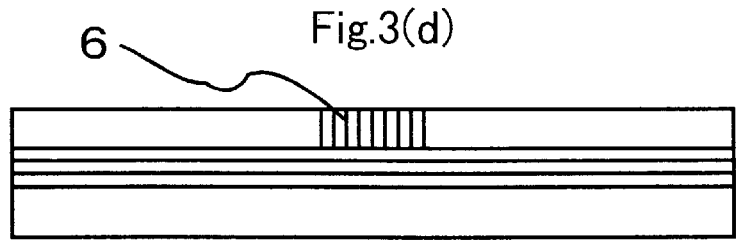

After the formation of the pores 5, ethylene and hydrogen, which are materials of carbon nanotubes, are allowed to flow in the plasma CVD process so as to form carbon nanotubes in the pores 5; however, the growth is completed at a level in which the tip of the carbon nanotube is maintained slightly lower than the alumina surface (FIG. 3(d)). Thus, provision is made so that a first gate layer 7a, which will be next formed, and the carbon nanotube are not made in contact with each other.

Figure 3E:
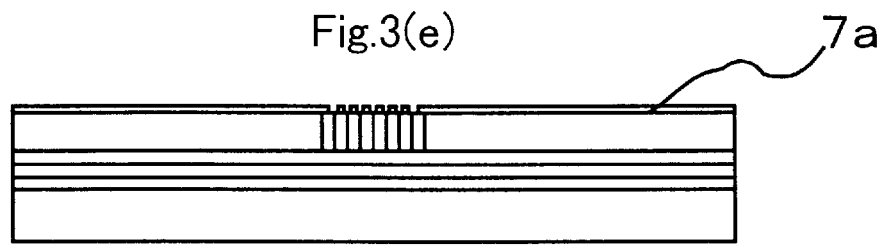
Figure 3F:
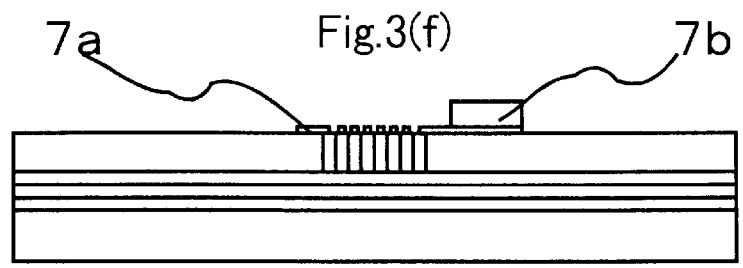

Then, a first gate insulation layer 7a is formed in a manner so as to surround the respective pores 5 by using a diagonal vapor deposition method (FIG. 3(e)), and a second gate insulation layer 7b, used for reducing the resistance, is formed, and patterned; thus, the manufacturing processes of the electron-source array is completed (FIG. 3(f)). Here, even when the tip of the carbon nanotube is allowed to grow to a level higher than the surface of the alumina, only the protruding carbon nanotube can be selectively removed by a plasma etching process using oxygen.

The following description will discuss the construction of the electron-source array and the manufacturing method thereof explained in the present embodiment, by means of examples:

EXAMPLE 1

Figure 4A:
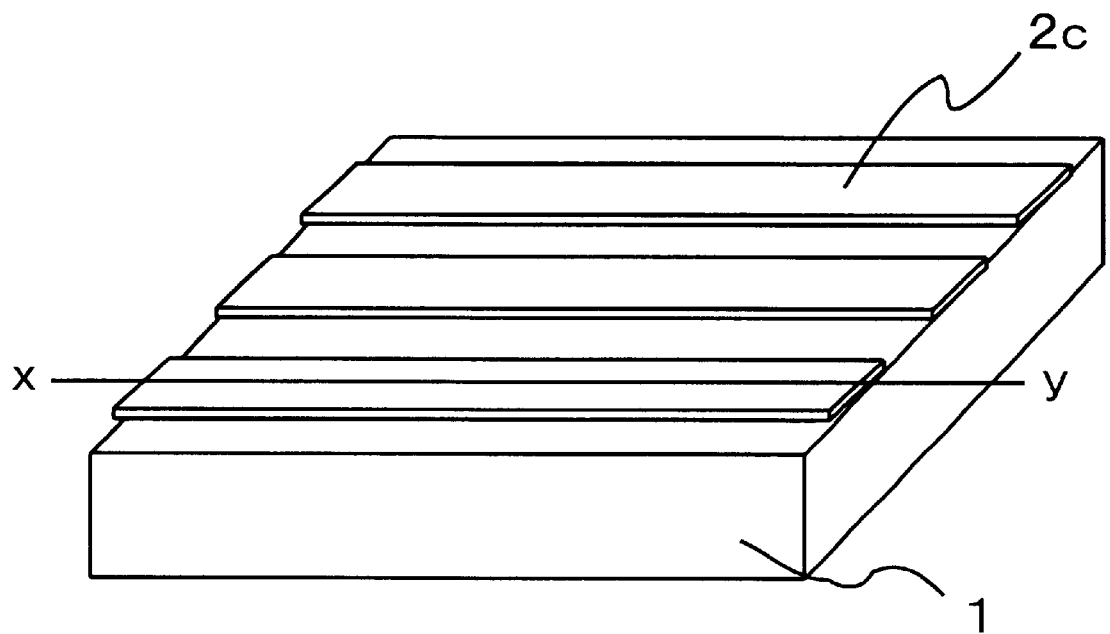
FIGS. 4(a) and 4(b) are explanatory drawings that show manufacturing processes of an electron-source array related to Examples 1 and 3.
Figure 4B:
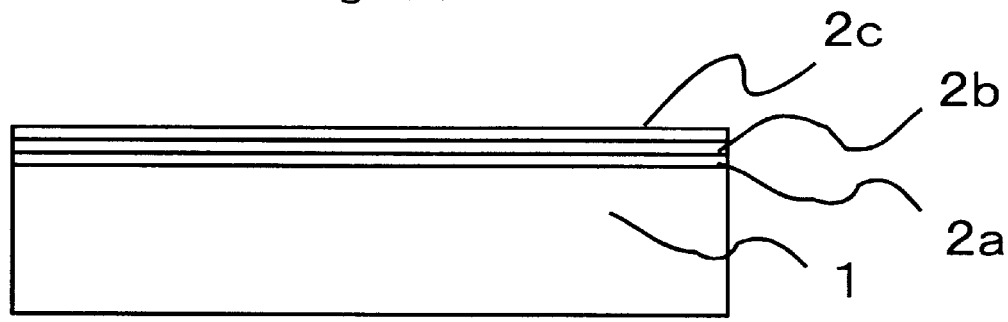

Referring to FIGS. 4(a) and 4(b) through FIGS. 6(a) to 6(e) that are process drawings, a detailed explanation will be given of the first Example of the present invention. First, as illustrated in FIGS. 4(a) and 4(b), a molybdenum film of 0.4 $\mu$m serving as the cathode electrode layer 2a, an amorphous silicon film of 0.5 $\mu$m serving as the ballast resistance layer 2b and an alloy layer of 0.1 $\mu$m having iron and nickel as its main components and serving as the conductive layer 2c were successively formed as laminated layers on a substrate 1 made of silica-alumina. In this case, the width of the respective wires was set to 100 $\mu$m with pitches of 200 $\mu$m, and five lines of them were formed (FIG. 4(b) is a cross-sectional view taken along line x-y of FIG. 4(a)).

Figure 5A:
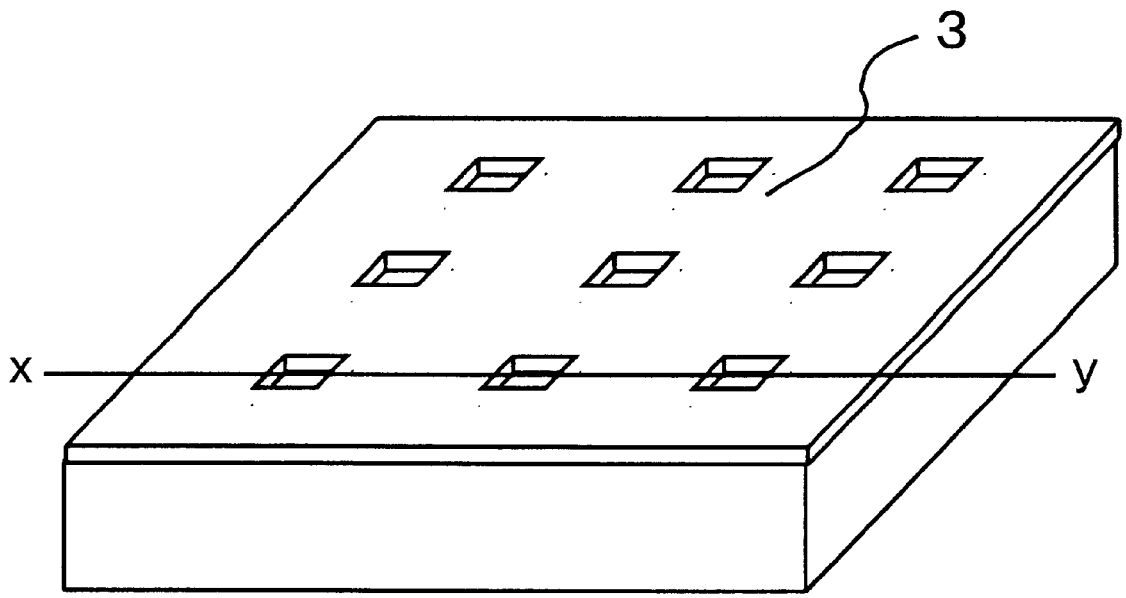
FIGS. 5(a) and 5(b) are explanatory drawings that show manufacturing processes of the electron-source array related to Examples 1 and 3.
Figure 5B:
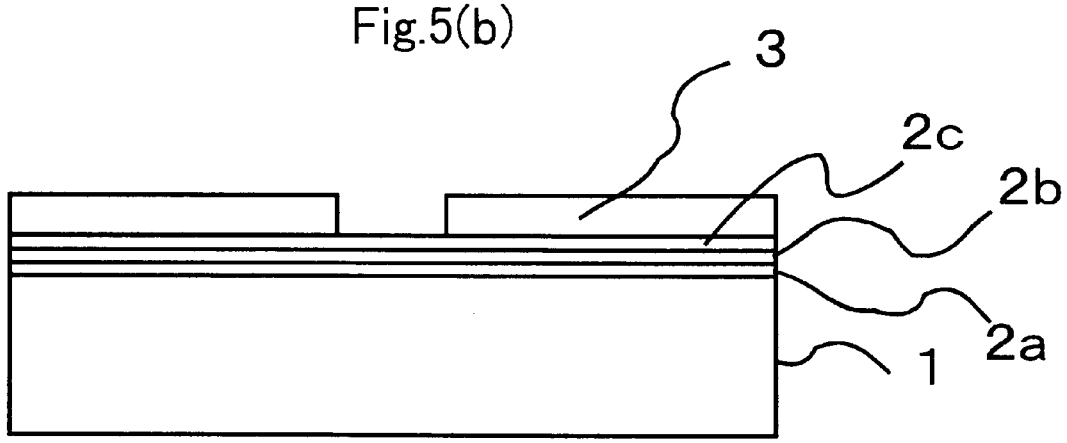

Next, as illustrated in FIGS. 5(a) and 5(b), after having deposited an $SiO_2$ film of 3 μm as the gate insulation layer 3, the $SiO_2$ was removed from portions that were to form the electron emitting sections 8 by means of RIE using a resist mask (FIG. 5(b) is a cross-sectional view taken along line x-y of FIG. 5(a)). In this case, the size of the windows formed in the gate insulation layer 3 was 50 μm square, and the number of the windows was 5×5, that is, 25. The pitch of the windows was 200 μm that was the same as that of the cathode electrode wires 2.

Next, referring to FIGS. 6(a) through 6(e) that are cross-sectional views taken along line x-y of FIG. 5(a), an explanation will be given of the manufacturing method.

Aluminum of 3 μm serving as the pre-oxide 4a was deposited at the portions thus subjected to the removal by a sputtering method. The aluminum deposited on the insulation layer 3 was removed, and also embedded, by a CMP method (FIG. 6(a)). Then, this was subjected to an anodic oxidation in a solution of oxalic acid so that the aluminum was oxidized and pores 5 were formed in the alumina that was the insulation film 4. In this case, since a barrier layer was formed on the electrode interface of the oxidized film, the pore 5 was not allowed to penetrate to reach the electrode.

Figure 6A:
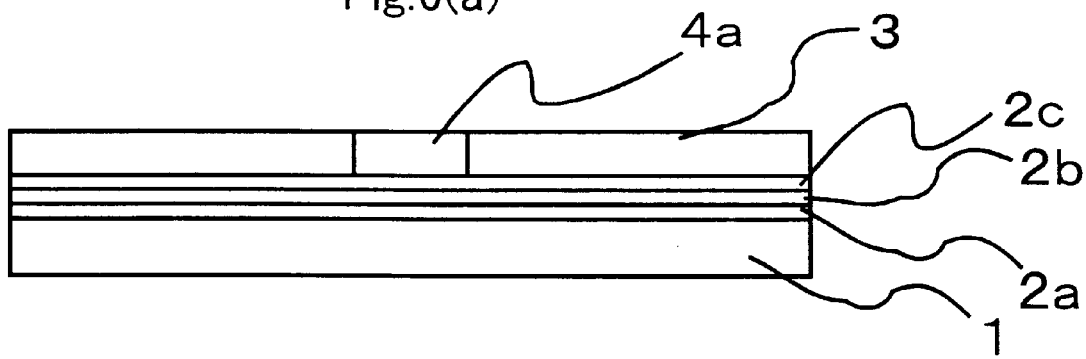
FIGS. 6(a) to 6(e) are explanatory drawings that show manufacturing processes of the electron-source array related to Examples 1 and 3.
Figure 6B:
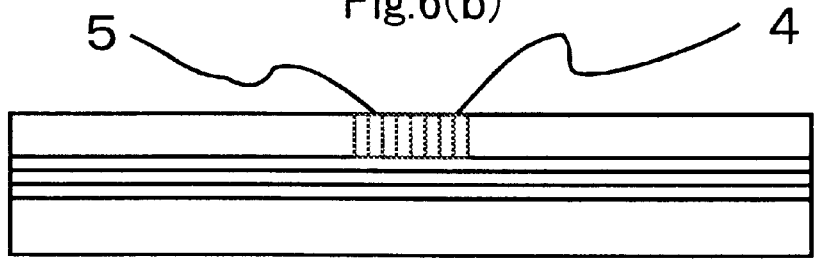
Figure 6C:
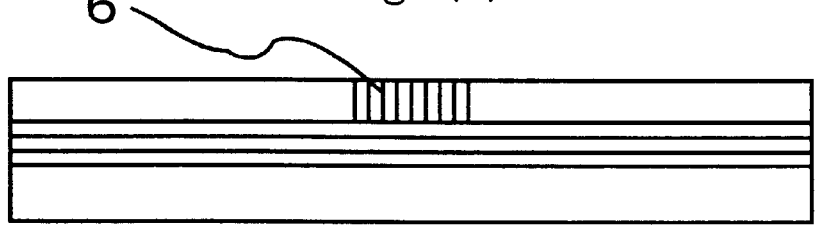

Therefore, in order to remove the barrier layer in the pore 5, a dry etching method was used; thus, only the barrier layer was removed (FIG. 6(b)). The pores 5 thus formed had a diameter of 60 nm and a pitch of 100 nm. After the formation of the pores 5, ethylene and hydrogen, which were materials of carbon nanotubes, were allowed to flow in the plasma CVD process so as to form carbon nanotubes that were to serve as emitters 6 in the pores 5. Here, the growth was completed at a level in which the tip of the carbon nanotube was maintained slightly lower than the alumina surface (approximately, 60 nm) (FIG. 6(c)).

Figure 6D:
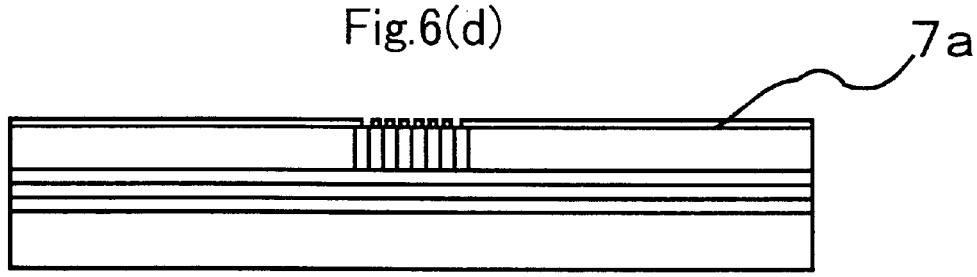
Figure 6E:
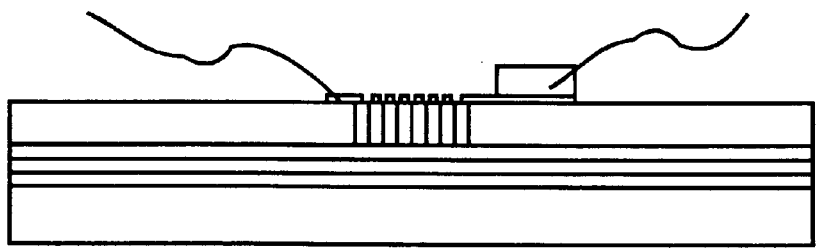

Then, molybdenum of 20 nm serving as the first gate insulation layer 7a was formed with an angle of 30 degrees with respect to the substrate surface by using a diagonal vapor deposition method in a manner so as to surround the respective pores 5 (FIG. 6(d)). An aluminum layer of 1 μm, serving as the second gate insulation layer 7b used for reducing the resistance, was formed, and patterned; thus, the manufacturing processes of the electron-source array was completed (FIG. 6(e)).

A fluorescent plate was placed 1 mm above the electron-source array manufactured as described, and a voltage of 5 kV was applied as an anode voltage while the gate voltage was varied in the range of −2 to 4 V; thus, emission currents were observed. An anode current of 5 μA per pixel was obtained at maximum, and it was confirmed that the anode current varied in proportion to the number of pixels to be addressed.

EXAMPLE 2

Figure 7A:
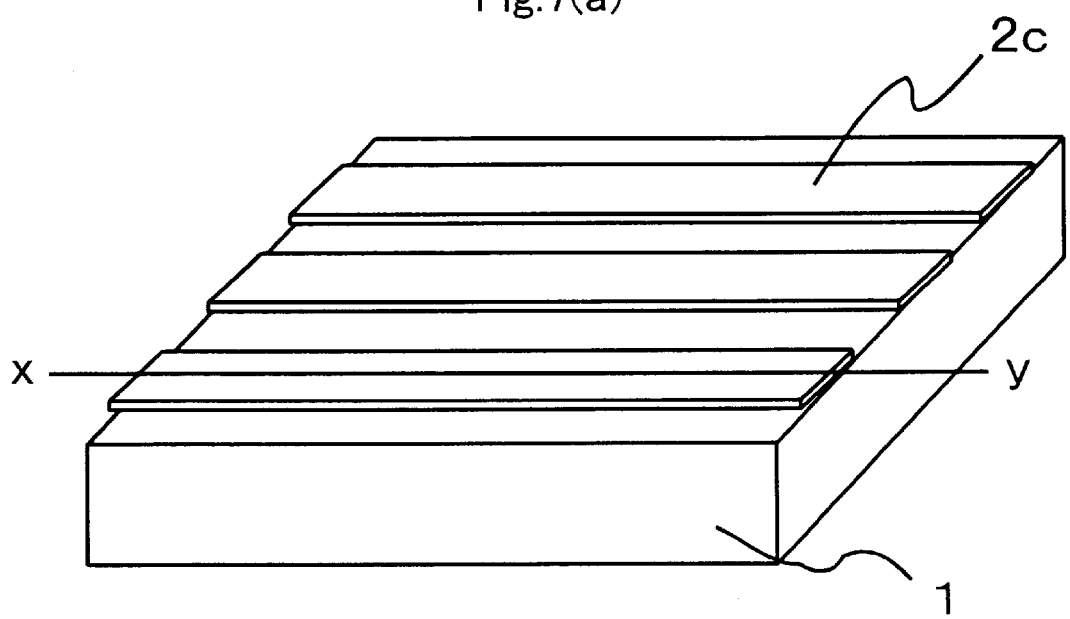
FIGS. 7(a) and 7(b) are explanatory drawings that show manufacturing processes of an electron-source array related to Examples 2 and 4.
Figure 7B:
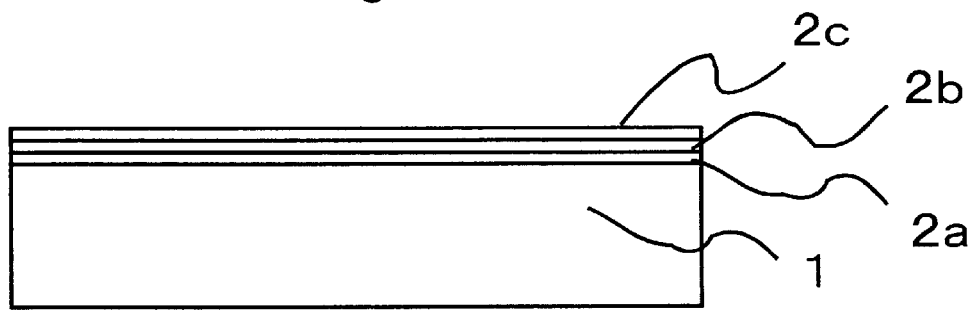

Referring to FIGS. 7(a) and 7(b) through FIGS. 9(a) to 9(e), a detailed explanation will be given of the second Example of the present invention. First, as illustrated in FIGS. 7(a) and 7(b), a molybdenum film of 0.4 μm serving as the cathode electrode layer 2a, an amorphous silicon film of 0.5 μm serving as the ballast resistance layer 2b and an alloy layer of 0.1 μm having iron and nickel as its main components and serving as the conductive layer 2c were successively formed as laminated layers on a substrate 1 made of silica-alumina. In this case, the width of the respective wires was set to 100 μm with pitches of 200 μm, and five lines of them were formed (FIG. 7(b) is a cross-sectional view taken along line x-y of FIG. 7(a)).

Figure 8A:
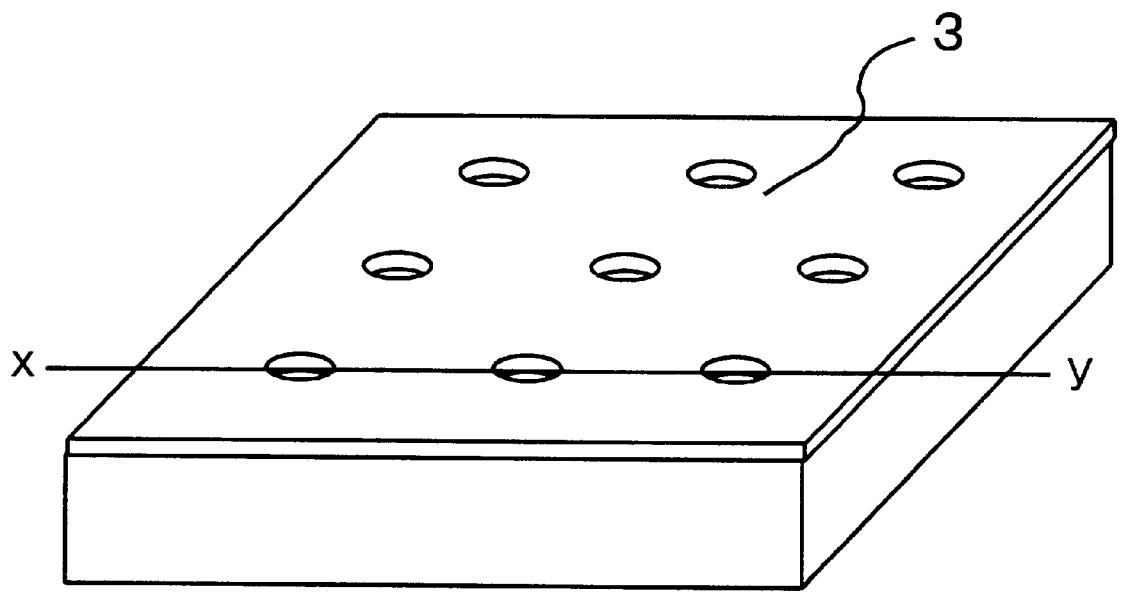
FIGS. 8(a) and 8(b) are explanatory drawings that show manufacturing processes of the electron-source array related to Examples 2 and 4.
Figure 8B:
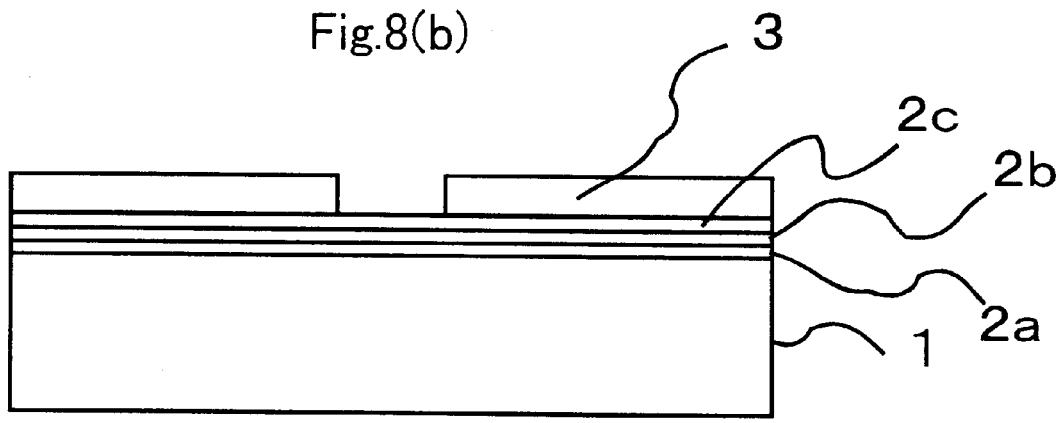

Next, as illustrated in FIGS. 8(a) and 8(b), after having deposited an $SiO_2$ film of 3 μm as the gate insulation layer 3, the $SiO_2$ was removed from portions that were to form the electron emitting sections 8 by means of RIE using a resist mask (FIG. 8(b) is a cross-sectional view taken along line x-y of FIG. 8(a)). Up to this process, the same processes as Example 1 were carried out; however, each of the windows formed in the gate insulation layer 3 had a round shape with a diameter of 3 μm. The number of the windows was 5×5, that is, 25, and the pitch thereof was 200 μm, which were the same as those of Example 1.

Next, referring to FIGS. 9(a) through 9(e) that are cross-sectional views taken along line x-y of FIG. 8(a), an explanation will be given of the manufacturing method. Aluminum of 3 μm serving as the pre-oxide 4a was deposited at the portions thus subjected to the removal by a sputtering method. The aluminum deposited on the insulation layer 3 was removed, and also embedded, by a CMP method (FIG. 9(a)).

Figure 9A:
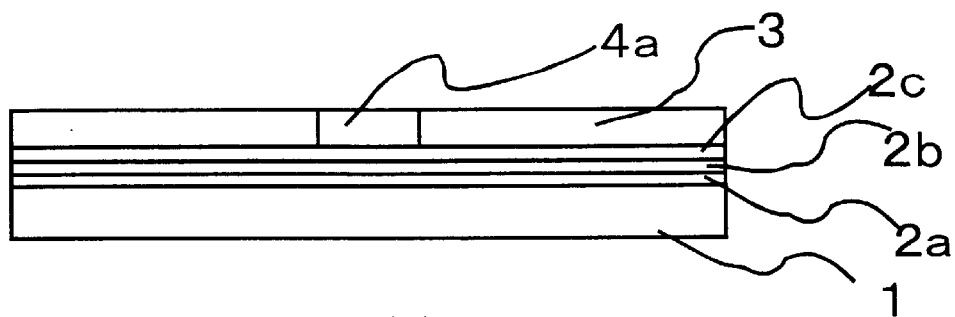
FIGS. 9(a) to 9(e) are explanatory drawings that show manufacturing processes of the electron-source array related to Examples 2 and 4.
Figure 9B:
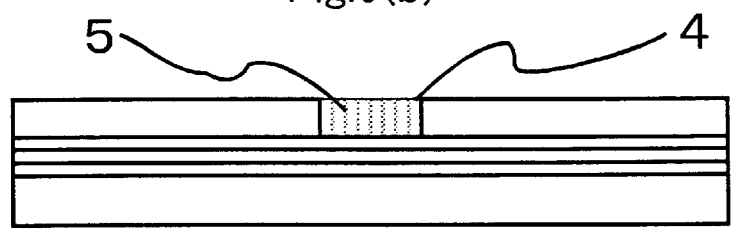
Figure 9C:
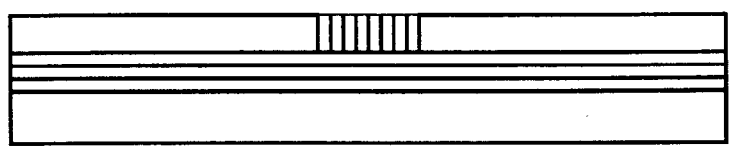

Then, this was subjected to an anodic oxidation in a solution of oxalic acid so that the aluminum was oxidized and pores 5 were formed in the alumina that was the insulation film 4, and the barrier layer was then removed in the same manner as the first example so as to allow each pore 5 to penetrate (FIG. 9(b)).

After the formation of the pores 5, ethylene and hydrogen, which were materials of carbon nanotubes, were allowed to flow in the plasma CVD process so as to form carbon nanotubes in the pores 5. Here, the growth was completed when the tip of the carbon nanotube had reached the alumina surface (FIG. 9(c)).

Figure 9D:
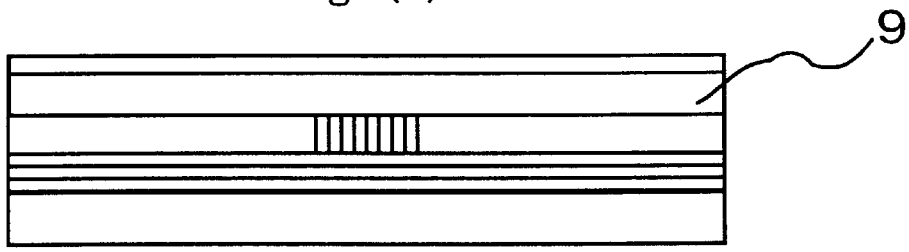
Figure 9E:
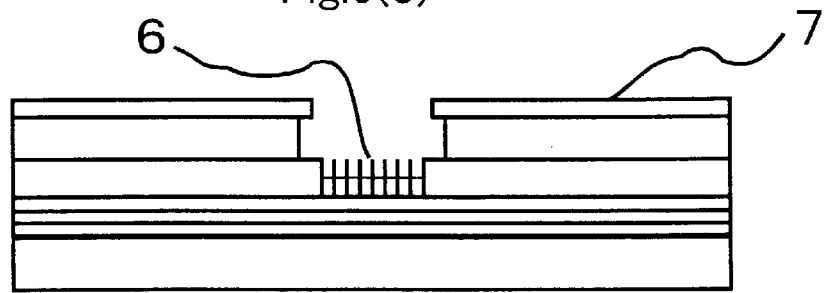

Thereafter, an $SiO_2$ film of 3 μm serving as the second gate insulation layer 9 and a molybdenum film of 0.5 μm serving as the gate electrode wires 7 were deposited (FIG. 9(d)). A round pattern having a diameter of 4 μm greater than the alumina portion was made from resist, and placed on the gate electrode wires 7, and the molybdenum film was removed by using RIE while the $SiO_2$ film was removed by using hydrofluoric acid so that carbon nanotubes were exposed. Successively, one portion of the alumina was removed by using hydrofluoric acid so that the carbon nanotubes, which were to form the emitters 6 as the electron sources, were exposed with a length of approximately 1 μm; thus, the manufacturing processes of the electron-source array was completed (FIG. 9(e)).

ShoushanFan et al. have reported a technique (Science, 283, 512, 1999) for orienting and forming carbon nanotubes on catalyst metal by means of CVD. In this case, however, the carbon nanotubes are only in contact with the substrate, with the result that only very weak adhesion strength is obtained. Carbon nanotubes have a length of several microns although their diameter is very small, and is also conductive; consequently, when separated from the substrate during the processes, they form dusts, and contaminate the processes. Moreover, if separated in a resulting product, they might cause short-circuiting between the electrodes; therefore, this method is not practical. In contrast, in the case of reference 2 and the present invention, carbon nanotubes are formed in fine pores; therefore, since they have contact faces not only on their tube end, but also on their side faces, they have greater adhesive strength to the substrate, thereby making it possible to avoid separation in the forming processes, and consequently to improve the yield.

A fluorescent plate is placed 1 mm above the electron-source array manufactured as described above, and an anode voltage of 5 kV was applied thereto while the gate voltage was varied in the range of −5 to 10 V so that the emission current was confirmed. A maximum anode current of 3 μA per pixel was obtained, and it was confirmed that the anode current varied in proportion to the number of pixels that had been addressed.

EXAMPLE 3

In the third Example in accordance with the present invention, an explanation will be given of a structure that does not need a high-temperature process for forming carbon nanotubes. Referring to process drawings of FIGS. 4(a) and 4(b) as well as FIG. 6(c), a detailed explanation will be given of the processes, which are basically same as those of the first Example, except that a glass substrate is used as the substrate 1.

As illustrated in FIGS. 4(a) and 4(b), a molybdenum film of 0.4 μm serving as the cathode electrode layer 2a, an amorphous silicon film of 0.5 μm serving as the ballast resistance layer 2b and a platinum layer of 0.1 μm serving as the conductive layer 2c were successively formed on a substrate 1 made of glass. Thereafter, the same processes as those of the first Example were carried out up to the process where the emitter material was filled into the pores 5. However, in the present example, a solution of sulfuric acid was used as the anodic oxidizing solution, and a voltage was applied in a direction reversed to the direction at the time of oxidation so as to remove the barrier layer in the pore 5; thus, only the barrier layer was removed. After the formation of the pores 5, instead of forming carbon nanotubes, platinum was deposited in the pores 5 while applying an electric field thereto in a bath. Here, the growth was completed at a level in which the tip of the platinum was maintained slightly lower than the alumina surface (approximately, 30 nm) (FIG. 6(c)). Thereafter, the same forming process of the gate electrode wires 7 and patterning process as those of the first Example were carried out, thereby completing the manufacturing processes of the electron-source array.

A fluorescent plate is placed 1 mm above the electron-source array manufactured as described above, and an anode voltage of 5 kV was applied thereto while the gate voltage was varied in the range of 0 to 10 V so that the emission current was confirmed. A maximum anode current of 1 μA per pixel was obtained, and it was confirmed that the anode current varied in proportion to the number of pixels that had been addressed.

EXAMPLE 4

In the fourth Example in accordance with the present invention, an explanation will be given of a structure that does not need a high-temperature process for forming carbon nanotubes. Referring to process drawings of FIGS. 7(a) and 7(b) as well as FIG. 9(c), a detailed explanation will be given of the processes are basically same as those of the second Example 2, except that a glass substrate is used as the substrate 1.

As illustrated in FIGS. 7(a) and 7(b), a molybdenum film of 0.4 μm serving as the cathode electrode layer 2a, an amorphous silicon film of 0.5 μm serving as the ballast resistance layer 2b and a platinum layer of 0.1 μm serving as the conductive layer 2c were successively formed on a substrate 1 made of glass. Thereafter, the same processes as those of the second Example were carried out up to the process where the emitter material was filled into the pores 5. However, in the present embodiment, a solution of sulfuric acid was used as the anodic oxidizing solution, and a voltage was applied in a direction reversed to the direction at the time of oxidation so as to remove the barrier layer in the pore 5; thus, only the barrier layer was removed. After the formation of the pores 5, platinum was deposited in the pores 5 while applying an electric field thereto in a bath. Here, the growth was completed when the tip of the platinum had reached the alumina surface (FIG. 9(c)). Thereafter, the same forming processes of the gate insulation layer 9 and gate electrode wires 7 and the same patterning process as those of the second Example were carried out, thereby completing the manufacturing processes of the electron-source array.

A fluorescent plate is placed 1 mm above the electron-source array manufactured as described above, and an anode voltage of 5 kV was applied thereto while the gate voltage was varied in the range of 0 to 100 V so that the emission current was confirmed. A maximum anode current of 1 μA per pixel was obtained, and it was confirmed that the anode current varied in proportion to the number of pixels that had been addressed.

EXAMPLE 5

Figure 10A:
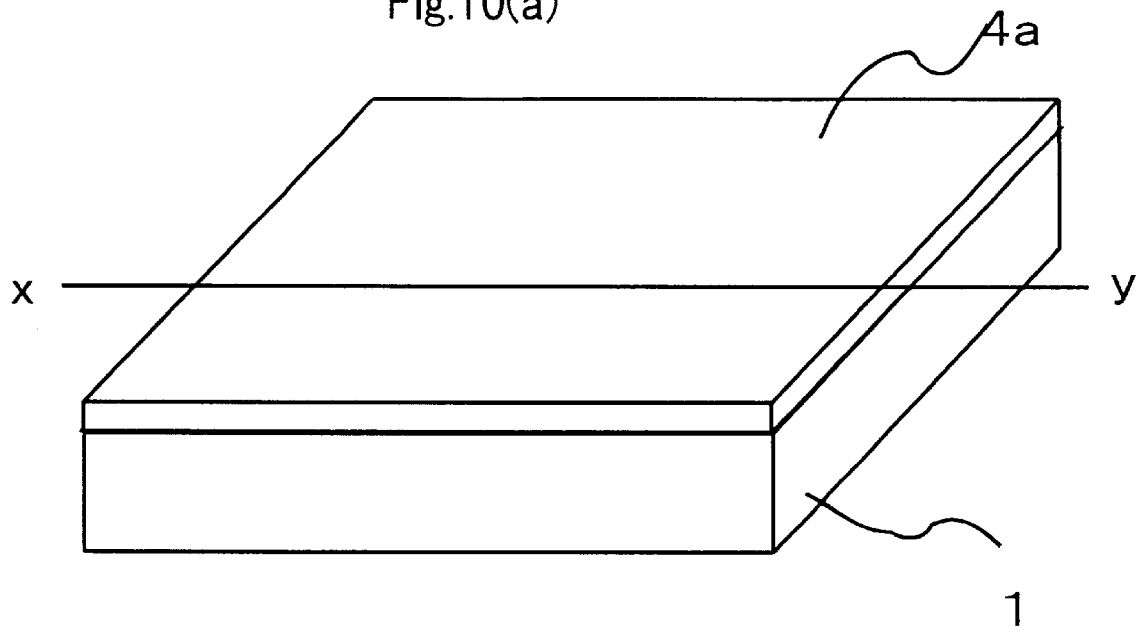
FIGS. 10(a) and 10(b) are explanatory drawings that show manufacturing processes of an electron-source array related to Examples 5 and 6.
Figure 10B:
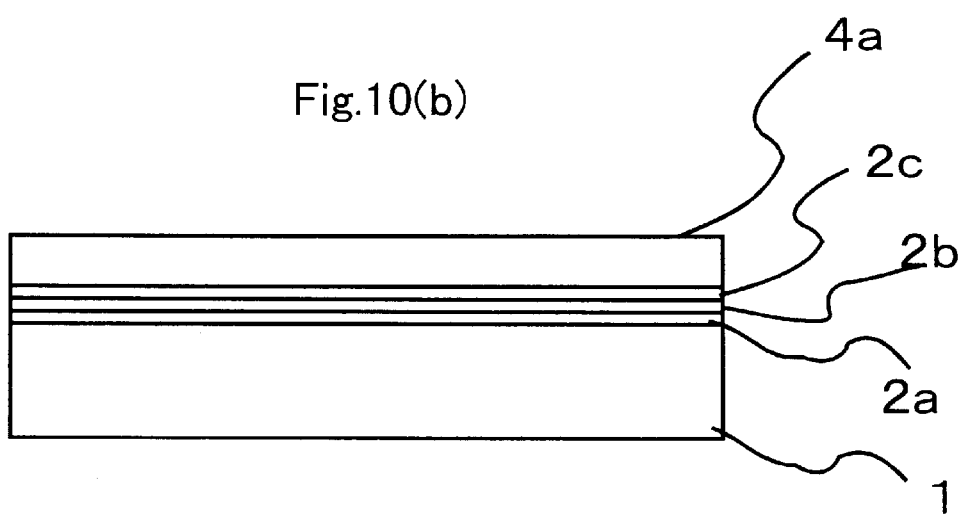

Referring to FIGS. 10(a) and 10(b) through FIG. 16, a detailed explanation will be given of the fifth Example of the present invention. First, as illustrated in FIGS. 10(a) and 10(b), a molybdenum film of 0.4 μm serving as the cathode electrode layer 2a, an amorphous silicon film of 0.5 μm serving as the ballast resistance layer 2b, an alloy layer of 0.1 μm having iron and nickel as its main components and serving as the conductive layer 2c and aluminum of 3 μm serving as the pre-oxide 4a were successively formed as laminated layers on a substrate 1 made of silica-alumina. (Here, FIG. 10(b) is a cross-sectional view taken along line x-y of FIG. 10(a)).

Figure 11A:
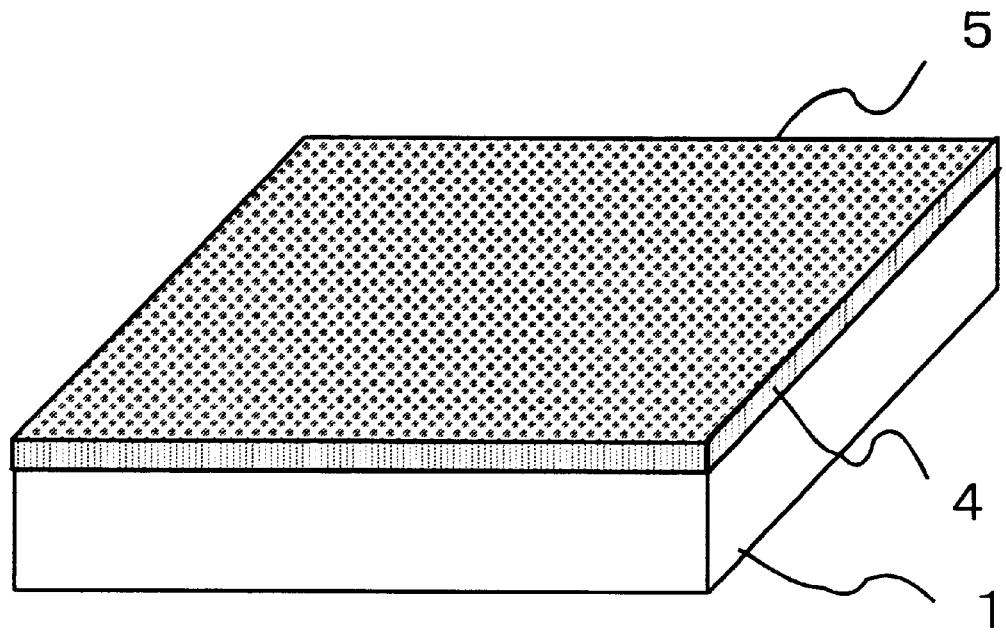
FIGS. 11(a) and 11(b) are explanatory drawings that show manufacturing processes of the electron-source array related to Examples 5 and 6.
Figure 11B:
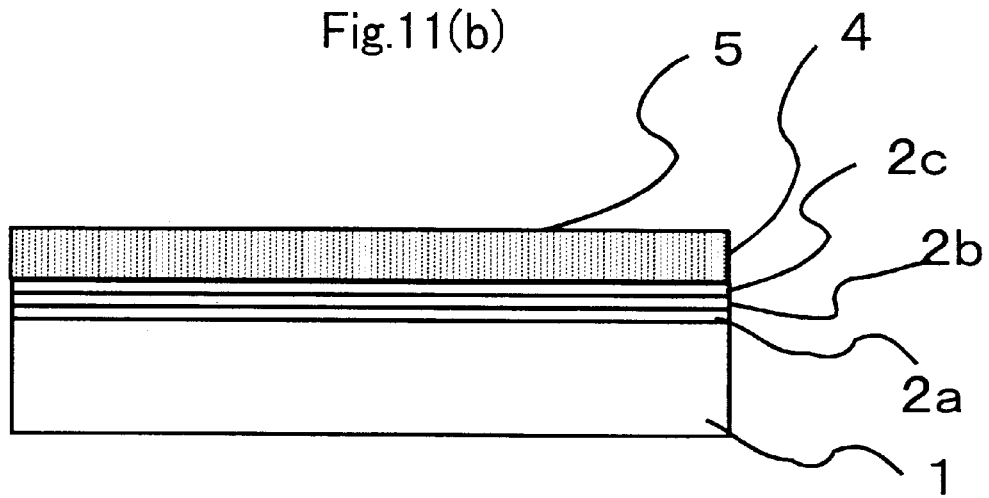
Figure 12A:
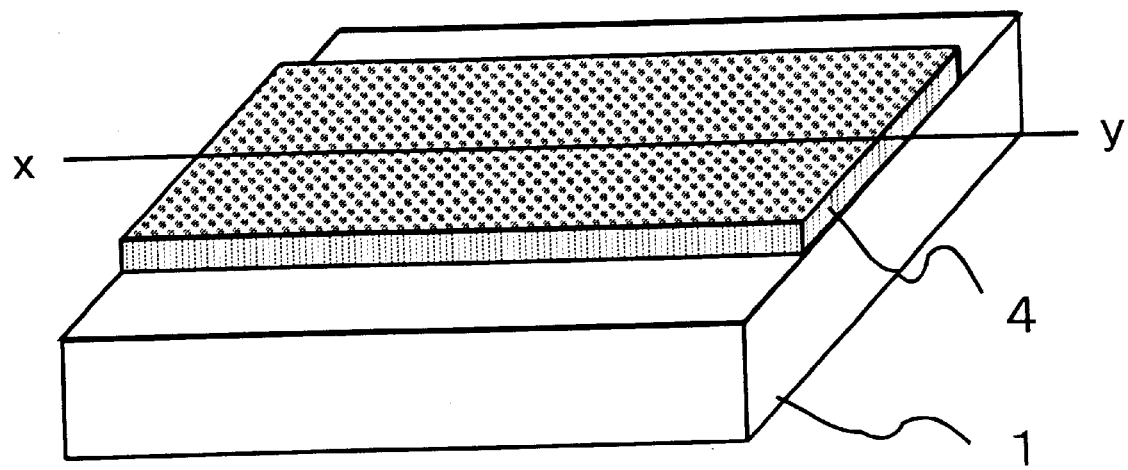
FIGS. 12(a) and 12(b) are explanatory drawings that show manufacturing processes of the electron-source array related to Examples 5 and 6.
Figure 12B:
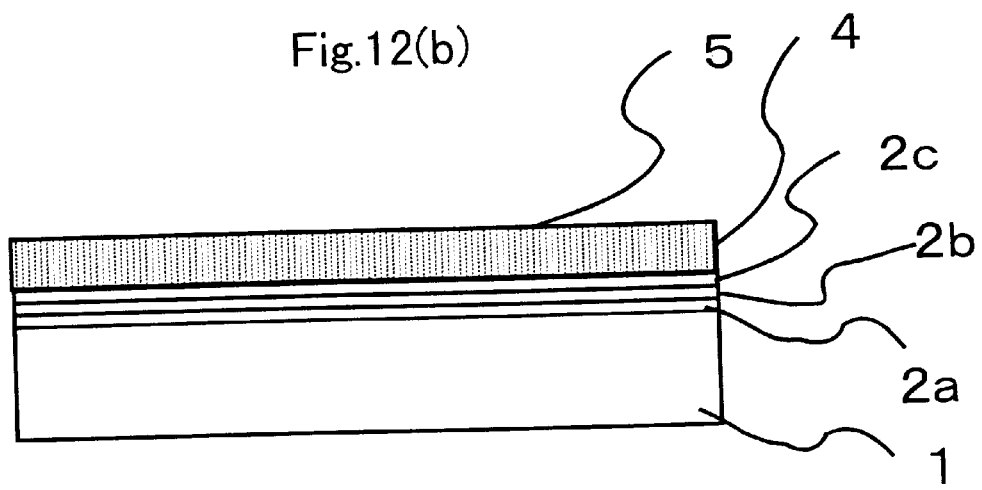
Figure 13A:
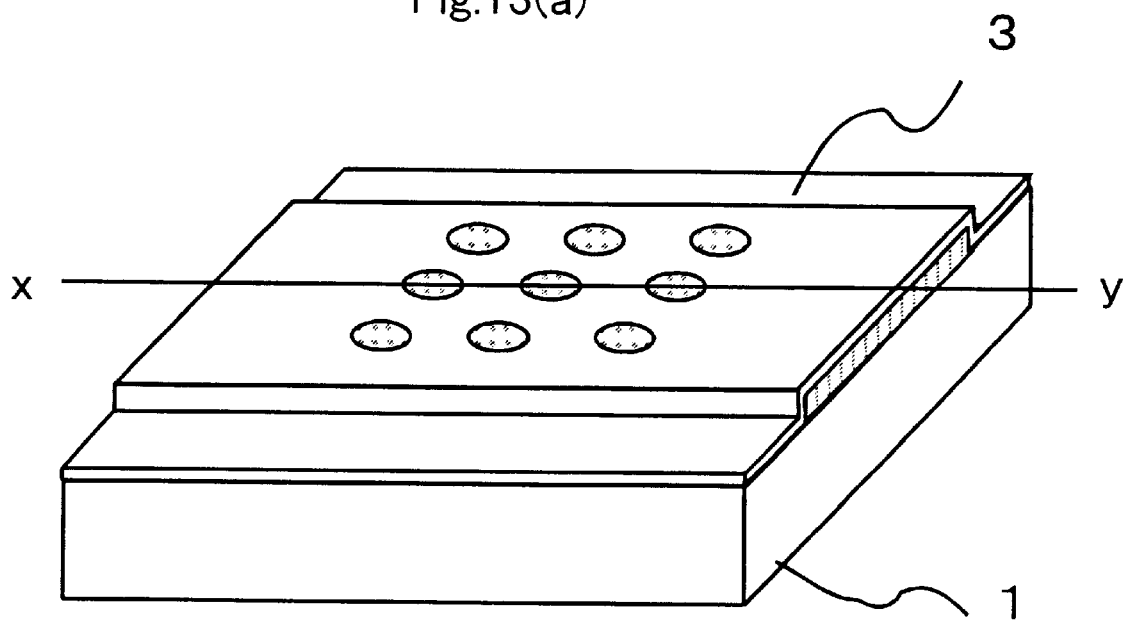
FIGS. 13(a) and 13(b) are explanatory drawings that show manufacturing processes of the electron-source array related to Examples 5 and 6.
Figure 13B:
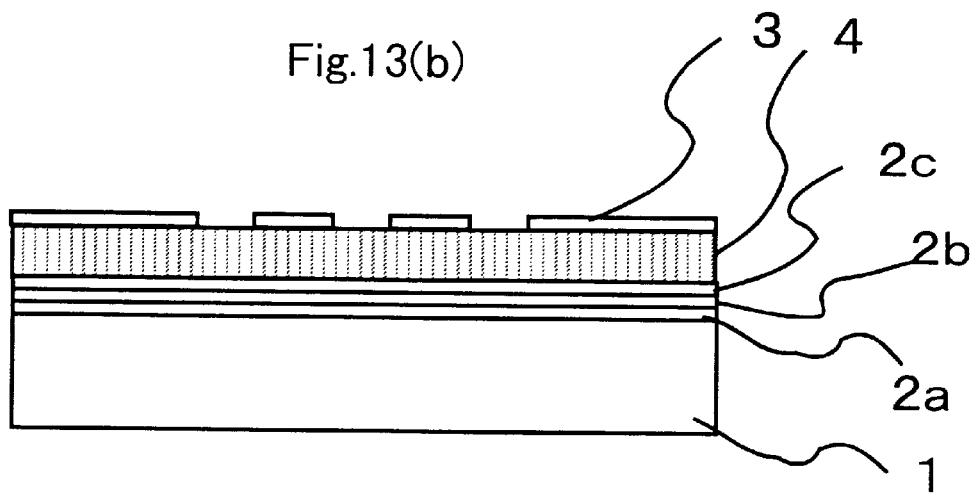
Figure 14A:
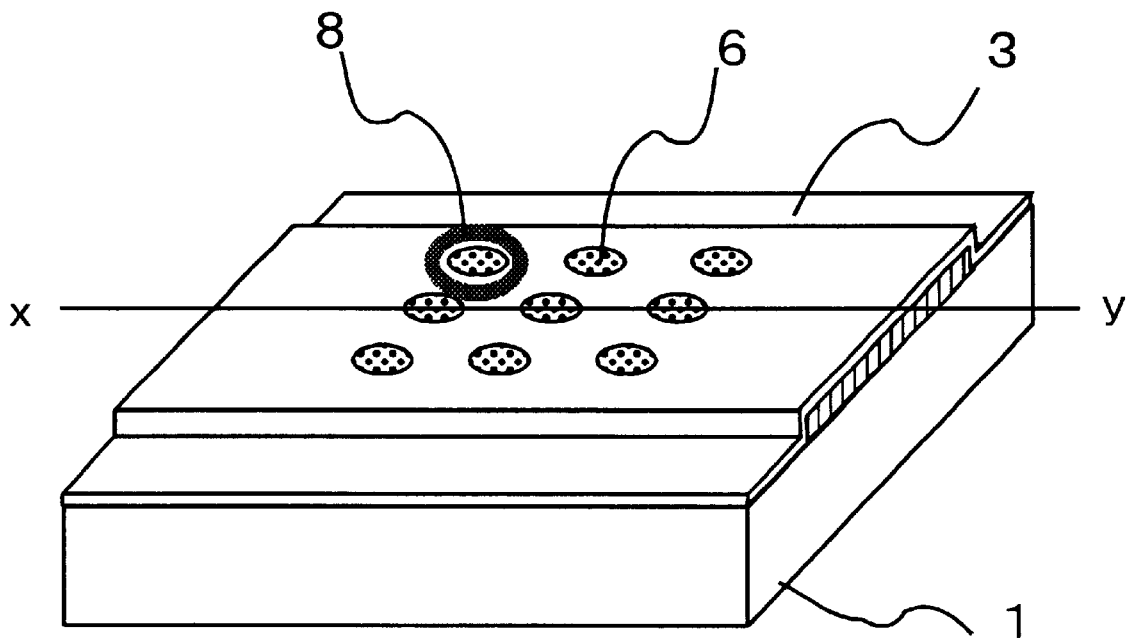
FIGS. 14(a) and 14(b) are explanatory drawings that show manufacturing processes of the electron-source array related to Examples 5 and 6.
Figure 14B:
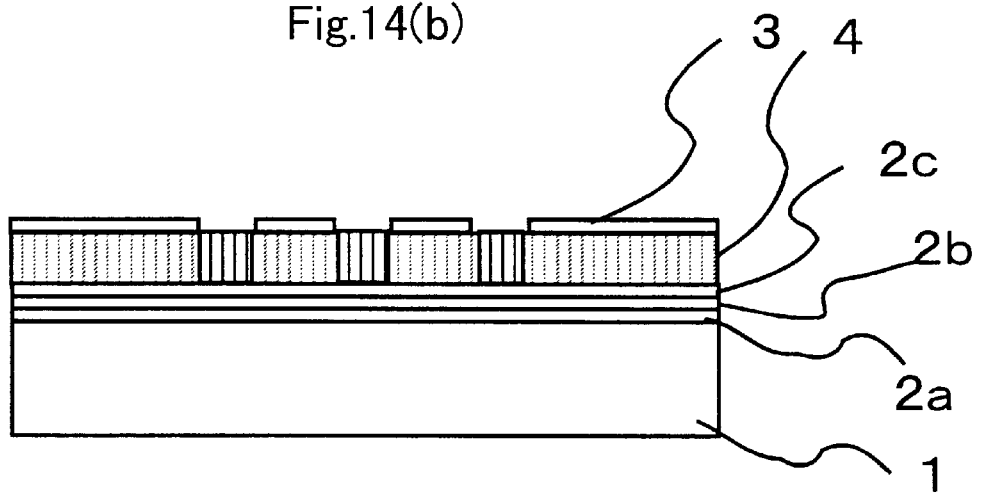

Next, as illustrated in FIGS. 11(a) and 11(b), this was subjected to an anodic oxidation in a solution of sulfuric acid so that the aluminum serving as the pre-oxide 4a was oxidized and pores 5 were formed in the alumina that was the insulation film 4, and the barrier layer was then removed in the same manner as the first example so as to allow each pore 5 to penetrate (FIG. 11(b) is a cross-sectional view taken along line x-y of FIG. 11(a)). Thereafter, as illustrated in FIGS. 12(a) and 12(b), a resist pattern in the form of lines was formed so that the alumina serving as the insulation film 4, the alloy layer having iron and nickel as its main component and serving as the conductive layer 2c, the amorphous silicon film serving as the ballast resistance layer 2b and the molybdenum film serving as the cathode electrode layer 2a were successively etched into the form of the lines (FIG. 12(b) is a cross-sectional view taken along line x-y of FIG. 12(a)). In this case, the width of the respective wires was set to 100 μm with pitches of 200 μm, and five lines of them were formed. Next, as illustrated in FIGS. 13(a) and 13(b), $SiO_2$ with a thickness of 0.5 μm, which was to form the gate insulation layer 3, was formed on the surface thereof. This layer also served as a mask layer used so as not to fill the electron emitting material into unnecessary pores. Nine windows per one pixel, each having a round shape with a diameter of 3 μm, were formed on the $SiO_2$ film thus formed with a pitch of 10 μm by using resist, only at positions which were to be filled with the electron emitting material (FIG. 13(b) is a cross-sectional view taken along line x-y of FIG. 13(a)). As illustrated in FIGS. 14 (a) and 14(b), after completion of the formation of the windows, methane gas and hydrogen, which were materials of carbon nanotubes, were allowed to flow in the plasma CVD process so as to form carbon nanotubes in the pores 5. Here, the growth was completed when the tip of the carbon nanotube had reached the alumina surface. (Here, FIG. 14(b) is a cross-sectional view taken along line x-y of FIG. 14(a)).

Figure 15A:
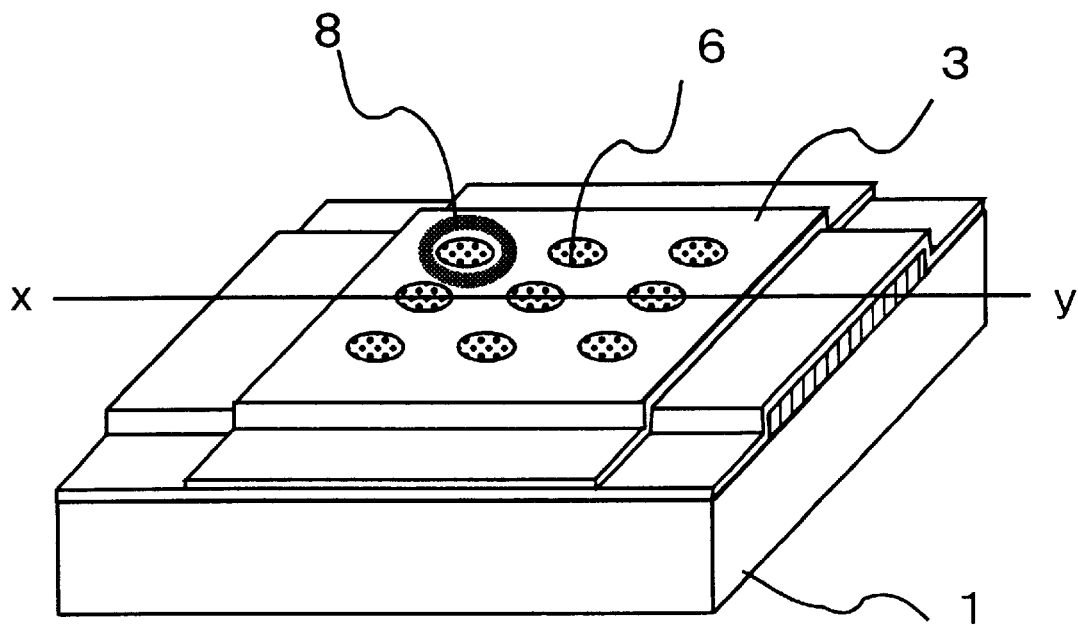
FIGS. 15(a) and 15(b) are explanatory drawings that show manufacturing processes of the electron-source array related to Examples 5 and 6.
Figure 15B:
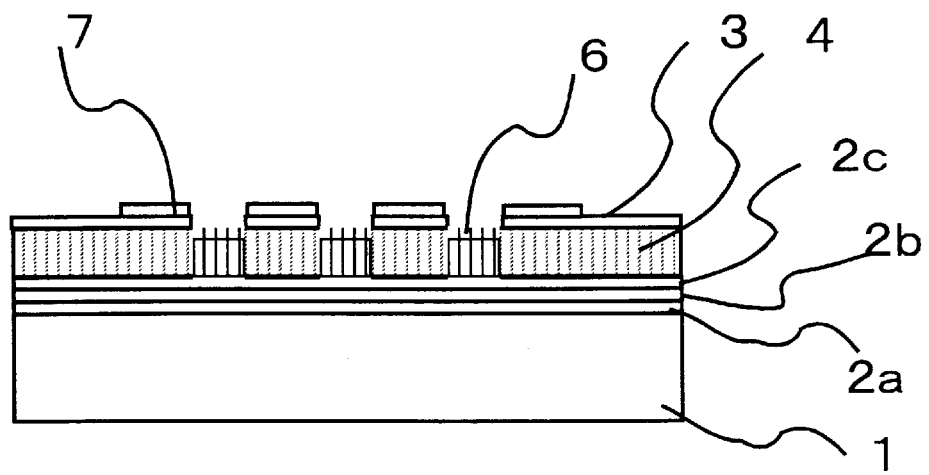
Figure 16:
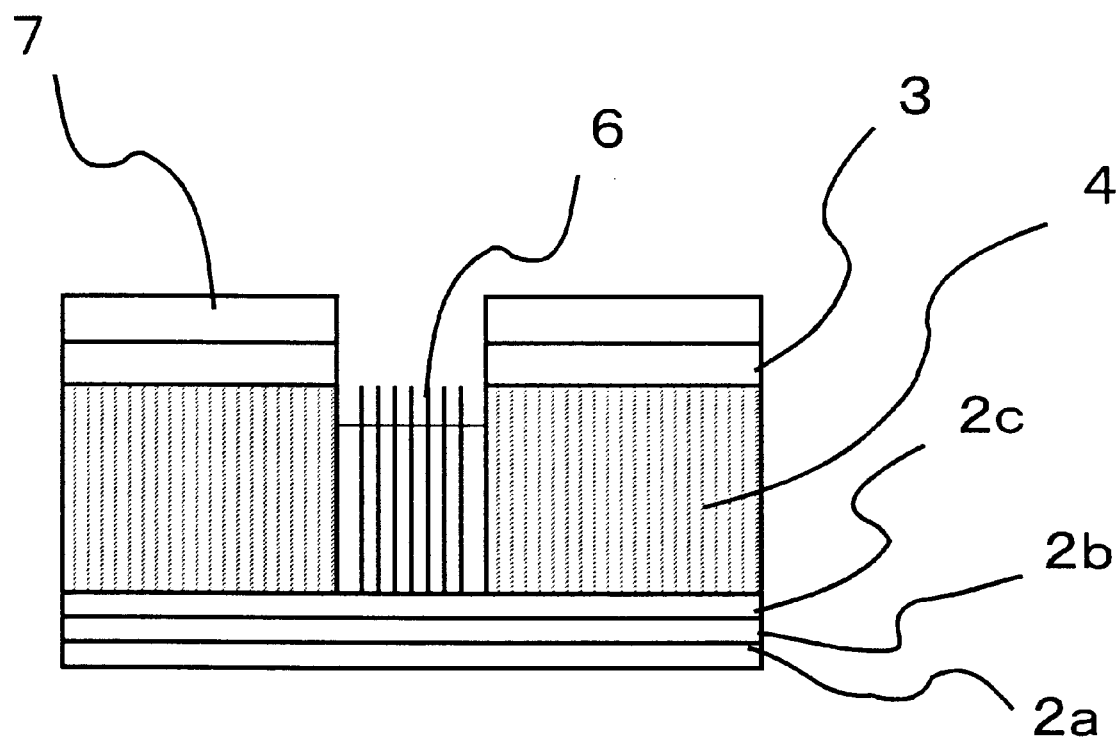
FIG. 16 is a schematic cross-sectional view that shows the electron-source array related to Examples 5 and 6.

Thereafter, as illustrated in FIGS. 15(a) and 15(b), a molybdenum film of 0.5 μm serving as the gate electrode wires 7 was deposited, and a resist mask that allowed only the electron emitting sections 8 filled with the electron emitting material to be exposed was formed so that the molybdenum film was etched and the emitters 6 were exposed. Successively, one portion of the alumina was removed by using hydrofluoric acid so that the carbon nanotubes, which were to form the emitters 6, were exposed with a length of approximately 1 μm; thus, the manufacturing processes of the electron-source array was completed (FIG. 15(b) is a cross-sectional view taken along line x-y of FIG. 15(a)). FIG. 16 is an enlarged cross-sectional view of the electron emitting sections 8.

The electron-source array thus manufactured had an arrangement in which one pixel had a construction shown in FIG. 15(a) with nine electron emitting sections. The number of the windows was 5×5, that is, 25, and the pitch thereof was 200 μm.

A fluorescent plate is placed 1 mm above the electron-source array manufactured as described above, and an anode voltage of 5 kV was applied thereto while the gate voltage was varied in the range of −5 to 10 V so that the emission current was confirmed. A maximum anode current of 10 μA per pixel was obtained, and it was confirmed that the anode current varied in proportion to the number of pixels that had been addressed.

EXAMPLE 6

In the sixth Example in accordance with the present invention, an explanation will be given of a structure that does not need a high-temperature process for forming carbon nanotubes. Referring to process drawings of FIGS. 10(a) and 10(b) as well as FIGS. 14(a) and 14(b), a detailed explanation will be given of the processes, which are basically same as those of the fifth Example 1, except that a glass substrate is used as the substrate 1.

As illustrated in FIGS. 10(a) and 10(b), a molybdenum film of 0.4 μm serving as the cathode electrode layer 2a, an amorphous silicon film of 0.5 μm serving as the ballast resistance layer 2b, a copper layer of 0.1 μm serving as the conductive layer 2c and aluminum of 3 μm serving as the pre-oxide 4a were successively formed on a substrate 1 made of glass. (Here, FIG. 10(b) is a cross-sectional view taken along line x-y of FIG. 10(a)).

Thereafter, the same processes as those of the fifth Example were carried out up to the process where the emitter material was filled into the pores 5. As illustrated in FIGS. 14(a) and 14(b), after the formation of the pores 5, copper was deposited in the pores 5 while applying an electric field thereto in a bath. Here, the growth was completed when the tip of the copper had reached the alumina surface (see FIG. 14(b) that is a cross-sectional view taken along line x-y of FIG. 14 (a)). Thereafter, the same forming processes of the gate electrode wires 7 and the same patterning process as those of the fifth Example were carried out, thereby completing the manufacturing processes of the electron-source array.

A fluorescent plate is placed 1 mm above the electron-source array manufactured as described above, and an anode voltage of 5 kV was applied thereto while the gate voltage was varied in the range of 0 to 100 V so that the emission current was confirmed. A maximum anode current of 6 μA per pixel was obtained, and it was confirmed that the anode current varied in proportion to the number of pixels that had been addressed.

EXAMPLE 7

Figure 17A:
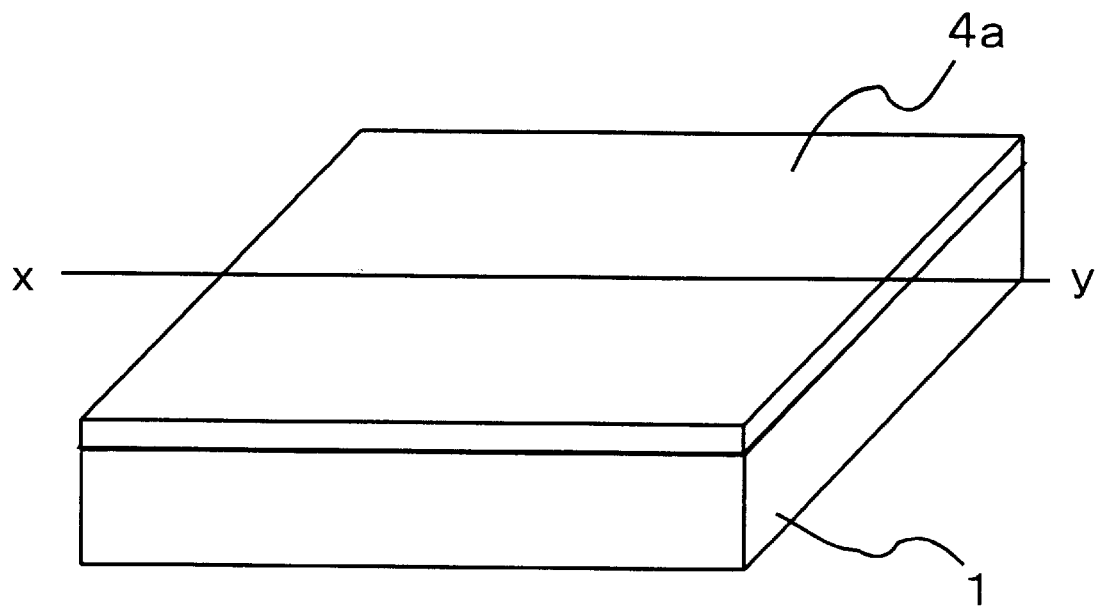
FIGS. 17(a) and 17(b) are explanatory drawings that show manufacturing processes of an electron-source array related to Examples 7 and 8.
Figure 17B:
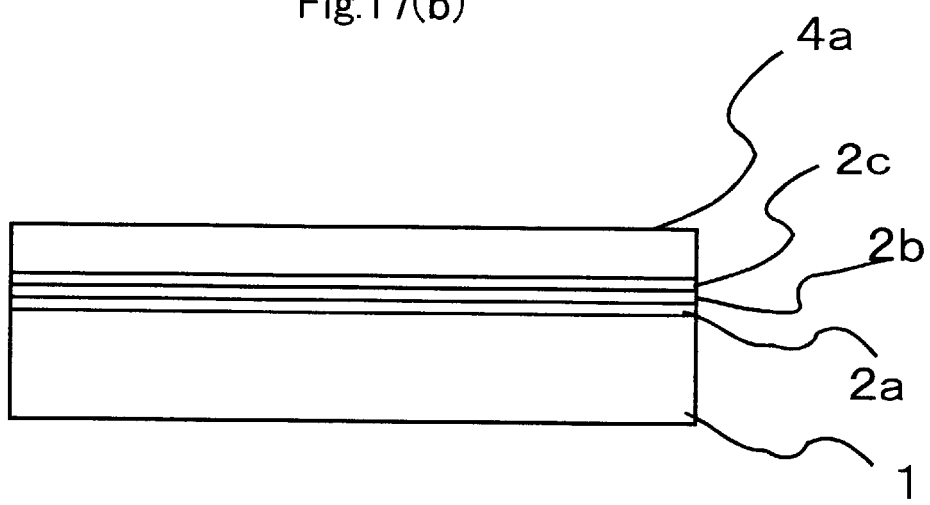

Referring to FIGS. 17(a) and 17(b) through FIG. 23, a detailed explanation will be given of the fifth Example of the present invention. First, as illustrated in FIGS. 17(a) and 17(b), a molybdenum film of 0.4 μm serving as the cathode electrode layer 2a, an amorphous silicon film of 0.5 μm serving as the ballast resistance layer 2b, an alloy layer of 0.1 μm having iron and nickel as its main components and serving as the conductive layer 2c and aluminum of 3 μm serving as the pre-oxide 4a were successively formed as laminated layers on a substrate 1 made of silica-alumina. (Here, FIG. 17(b) is a cross-sectional view taken along line x-y of FIG. 17(a)).

Figure 18A:
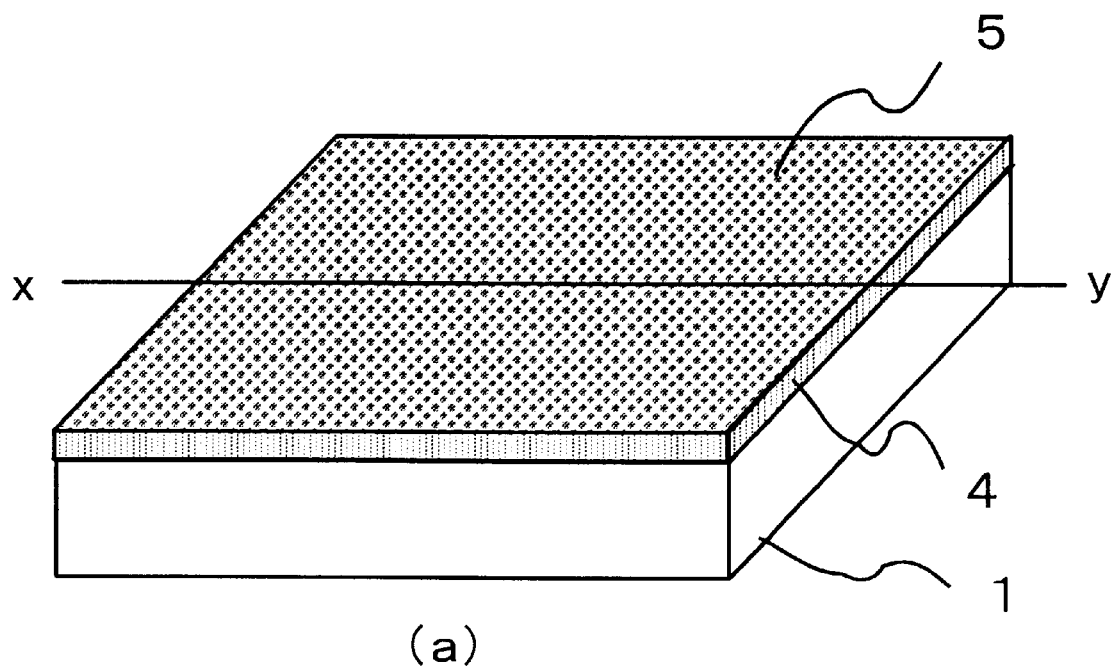
FIGS. 18(a) and 18(b) are explanatory drawings that show manufacturing processes of the electron-source array related to Examples 7 and 8.
Figure 18B:
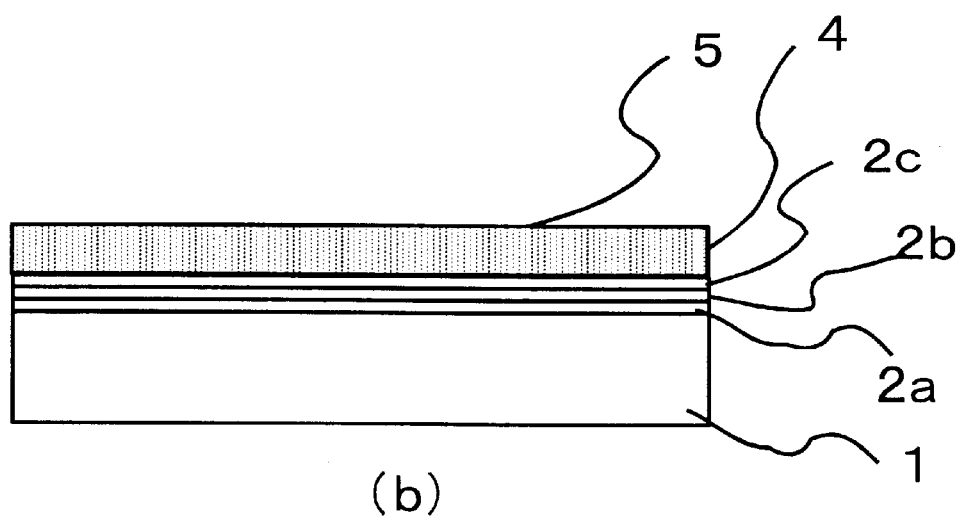

Next, as illustrated in FIGS. 18(a) and 18(b), this was subjected to an anodic oxidation in a solution of sulfuric acid so that the aluminum serving as the pre-oxide 4a was oxidized and pores 5 were formed in the alumina that was the insulation film 4, and the barrier layer was then removed in the same manner as the first example so as to allow each pore 5 to penetrate (see FIG. 18(b) that is a cross-sectional view taken along line x-y of FIG. 18(a)).

Figure 19A:
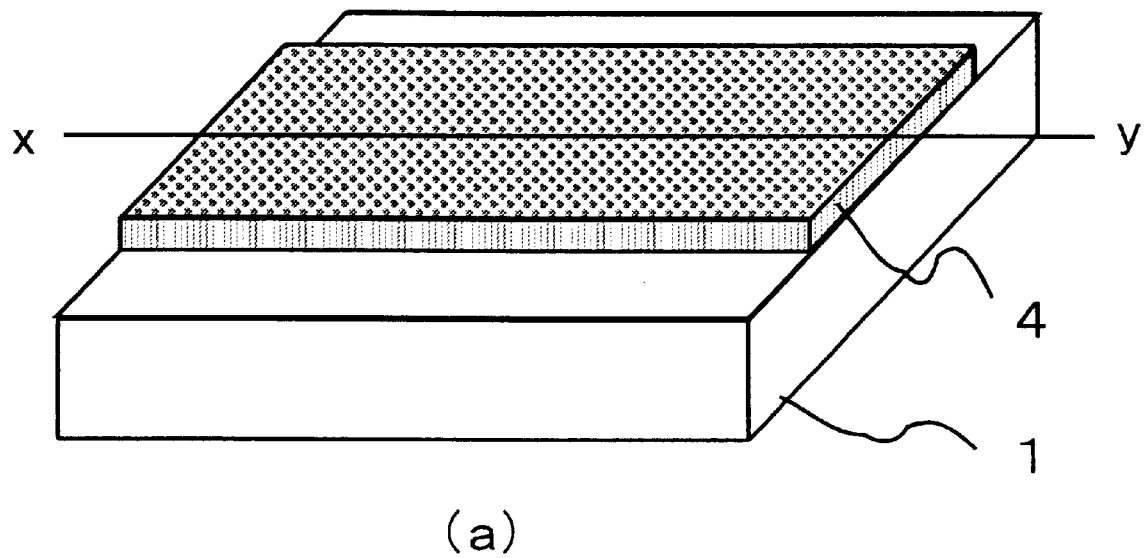
FIGS. 19(a) and 19(b) are explanatory drawings that show manufacturing processes of the electron-source array related to Examples 7 and 8.
Figure 19B:
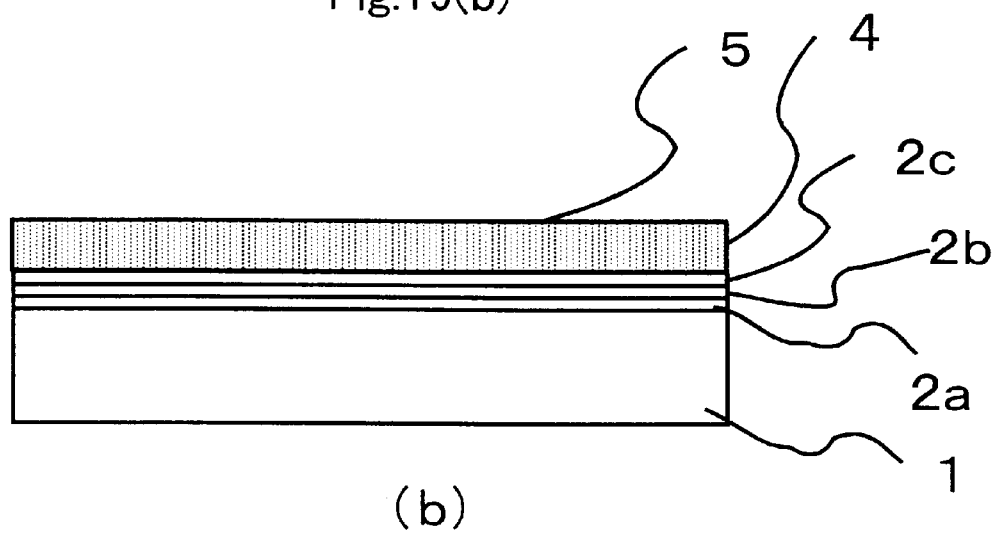

Thereafter, as illustrated in FIGS. 19(a) and 19(b), a resist pattern in the form of lines was formed so that the alumina serving as the insulation film 4, the alloy layer having iron and nickel as its main components and serving as the conductive layer 2c, the amorphous silicon film serving as the ballast resistance layer 2b and the molybdenum film serving as the cathode electrode layer 2a were successively etched into the form of the lines (see FIG. 19(b) that is a cross-sectional view taken along line x-y of FIG. 19(a)). In this case, the width of the respective wires was set to 100 μm with pitches of 200 μm, and five lines of them were formed.

Figure 20A:
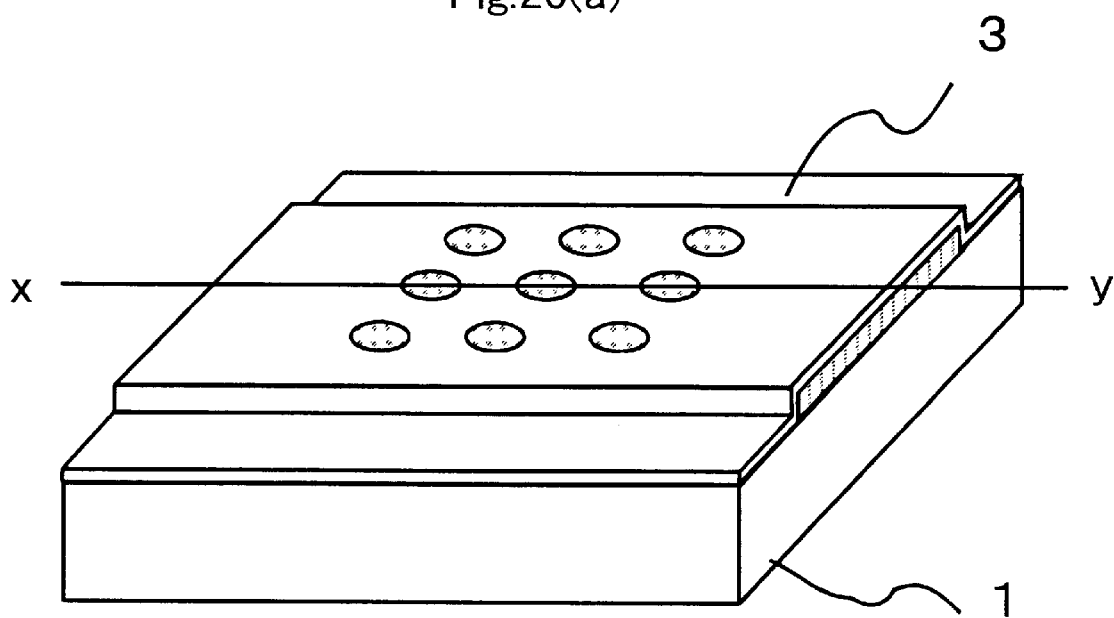
FIGS. 20(a) and 20(b) are explanatory drawings that show manufacturing processes of the electron-source array related to Examples 7 and 8.
Figure 20B:
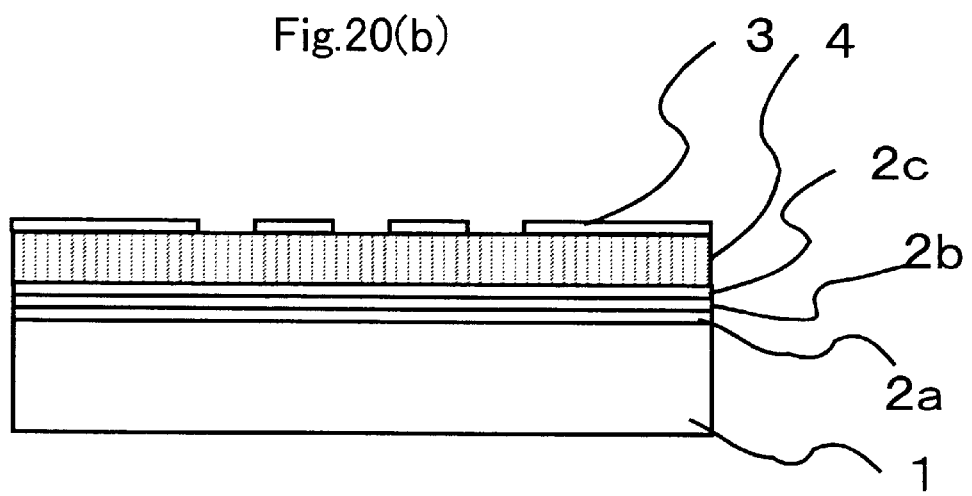
Figure 21A:
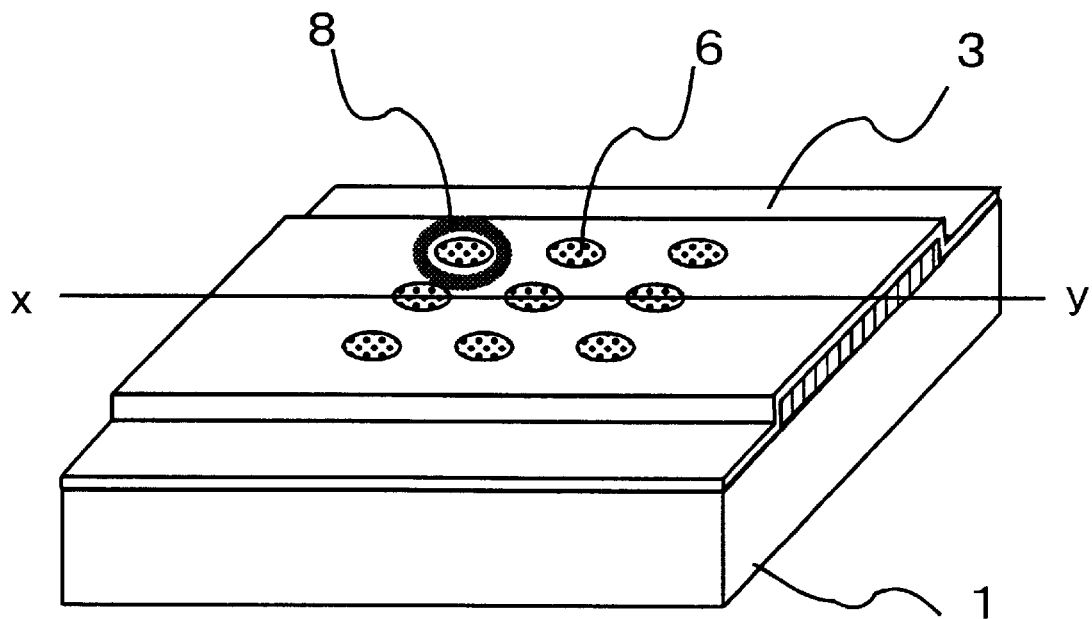
FIGS. 21(a) and 21(b) are explanatory drawings that show manufacturing processes of the electron-source array related to Examples 7 and 8.
Figure 21B:
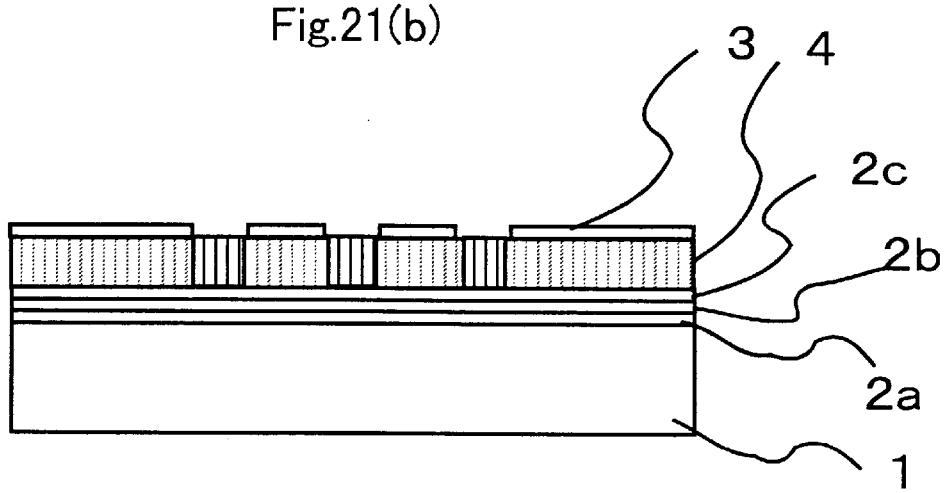
Figure 22A:
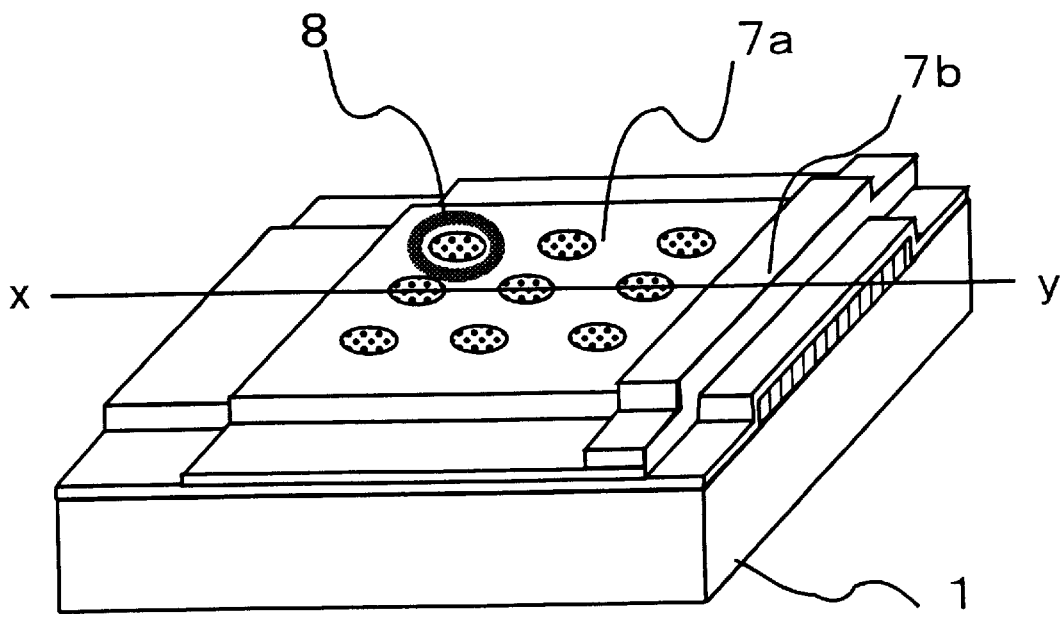
FIGS. 22(a) and 22(b) are explanatory drawings that show manufacturing processes of the electron-source array related to Examples 7 and 8.
Figure 22B:
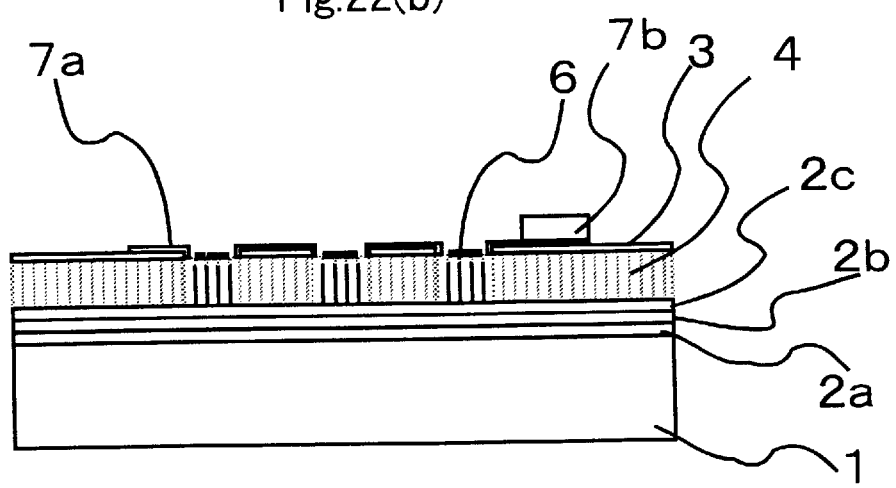
Figure 23:
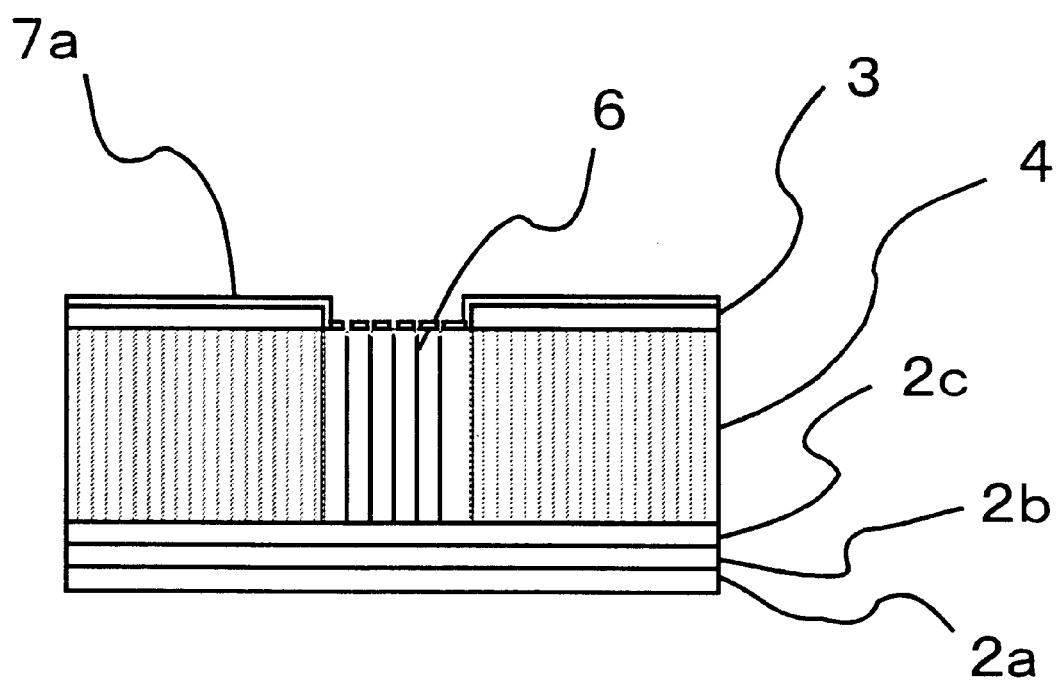
FIG. 23 is a schematic cross-sectional view that shows the electron-source array related to Examples 7 and 8.

Next, as illustrated in FIGS. 20(a) and 20(b), $SiO_2$ with a thickness of 0.1 μm, which was to form the gate insulation layer 3, was formed on the surface thereof. This layer also served as a mask layer used so as not to fill the electron emitting material into unnecessary pores. Nine windows per one pixel, each having a round shape with a diameter of 10 μm, were formed on the $SiO_2$ thus deposited with a pitch of 10 μm by using resist, only at positions which were to be filled with the electron emitting material (see FIG. 20(b) that is a cross-sectional view taken along line x-y of FIG. 20(a)) As illustrated in FIGS. 21(a) and 21(b), after completion of the formation of the windows, methane gas and hydrogen, which were materials of carbon nanotubes, were allowed to flow in the plasma CVD process so as to form carbon nanotubes in the pores 5. Here, the growth was completed at a level in which the tip of the carbon nanotube was maintained slightly lower than the alumina surface (approximately, 30 nm)(see FIG. 21(b) that is a cross-sectional view taken along line x-y of FIG. 21(a)). Thereafter, as illustrated in FIGS. 22(a) and 22(b), molybdenum that was to form the first gate insulation layer 7a was deposited with a thickness of 20 nm having an angle of 30 degrees with respect to the substrate surface by using a diagonal vapor deposition method in a manner so as to surround the respective pores 5. Further, an aluminum layer of 1 μm, serving as the second gate insulation layer 7b used for reducing the resistance, was formed, and patterned; thus, the manufacturing processes of the electron-source array was completed (see FIG. 22(b) that is a cross-sectional view taken along line x-y of FIG. 22(a)). FIG. 23 is an enlarged cross-sectional view of the electron emitting sections 8. The electron-source array thus manufactured had an arrangement in which one pixel had a construction shown in FIG. 22(a) with nine electron emitting sections. The number of the windows was 5×5, that is, 25, and the pitch thereof was 200 μm, A fluorescent plate is placed 1 mm above the electron-source array manufactured as described above, and an anode voltage of 5 kV was applied thereto while the gate voltage was varied in the range of −2 to 4 V so that the emission current was confirmed. A maximum anode current of 10 μA per pixel was obtained, and it was confirmed that the anode current varied in proportion to the number of pixels that had been addressed.

EXAMPLE 8

Figure 24A:
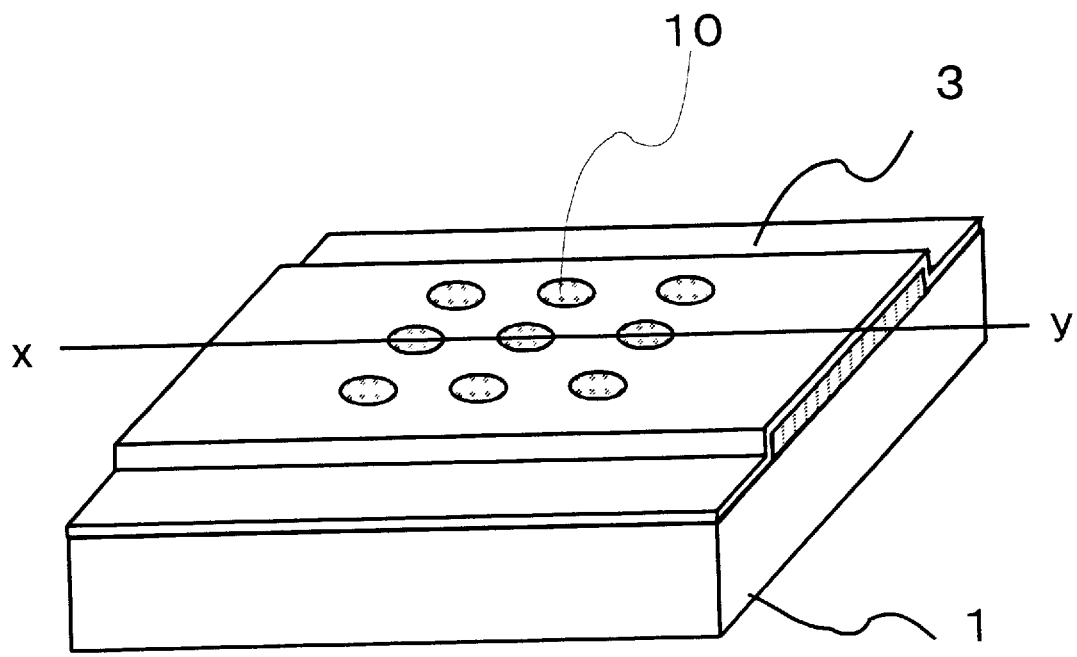
FIGS. 24(a) and 24(b) are explanatory drawings that show manufacturing processes of the electron-source array related to Example 8.
Figure 24B:
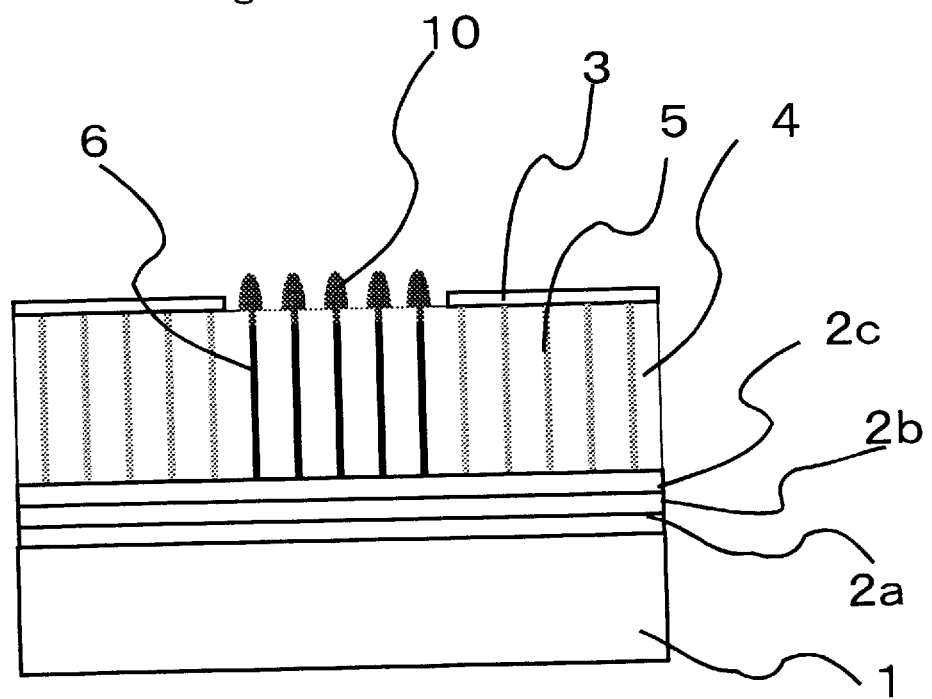

Referring to FIGS. 21(a) and 21(b), FIGS. 22(a) and 22(b), and FIGS. 24(a) and 24(b), a detailed explanation will be given of the eighth Example of the present invention. The construction of the electron-source array was the same as that of the seventh Example. As illustrated in FIGS. 21(a) and 21(b), carbon nanotubes were filled into the pores 5 in the insulation film 4 as the electron emitting material in the same manner as the seventh Example. (Here, FIG. 21(b) is a cross-sectional view taken along line x-y of FIG. 21(a)). Thereafter, as illustrated in FIGS. 24(a) and 24(b), prior to the formation of the gate electrode wire 7, nickel was selectively deposited on the carbon nanotubes by means of electroplating so that a cap 10 was formed on the tip of each carbon nanotube that was the emitter 6 (see FIG. 24(b) that is a cross-sectional view taken along line x-y of FIG. 24(a), which shows one pixel in an enlarged manner). This process was provided in such a manner that, upon formation of the gate electrode wires 7, it becomes possible to positively separate the emitter 6 and the gate electrode wires 7 so as to prevent short-circuiting from occurring between them.

Thereafter, as illustrated in FIGS. 22(a) and 22(b), after the formation of the gate insulation layer 7a serving as the gate electrode wires 7, the nickel was removed by means of lift-off, gate openings were formed, an aluminum layer of 1 μm was formed as the second gate insulation layer 7b, and this was patterned; thus, the manufacturing processes of the electron-source array was complete. (Here, FIG. 22(b) is a cross-sectional view taken along line x-y of FIG. 22(a)).

In the above-mentioned Embodiment 1, the explanation has been given of cases where the conductive layer 2c, required upon forming the emitter 6, is preliminarily stacked on the cathode electrode wires 2; however, not limited to this structure, the conductive layer 2c, required upon forming the emitter 6, is not necessarily formed on the cathode electrode wires 2 preliminarily. The following Embodiment 2 will discuss examples in this case.

Embodiment 2

The following description will discuss one embodiment of the present invention.

Figure 25A:
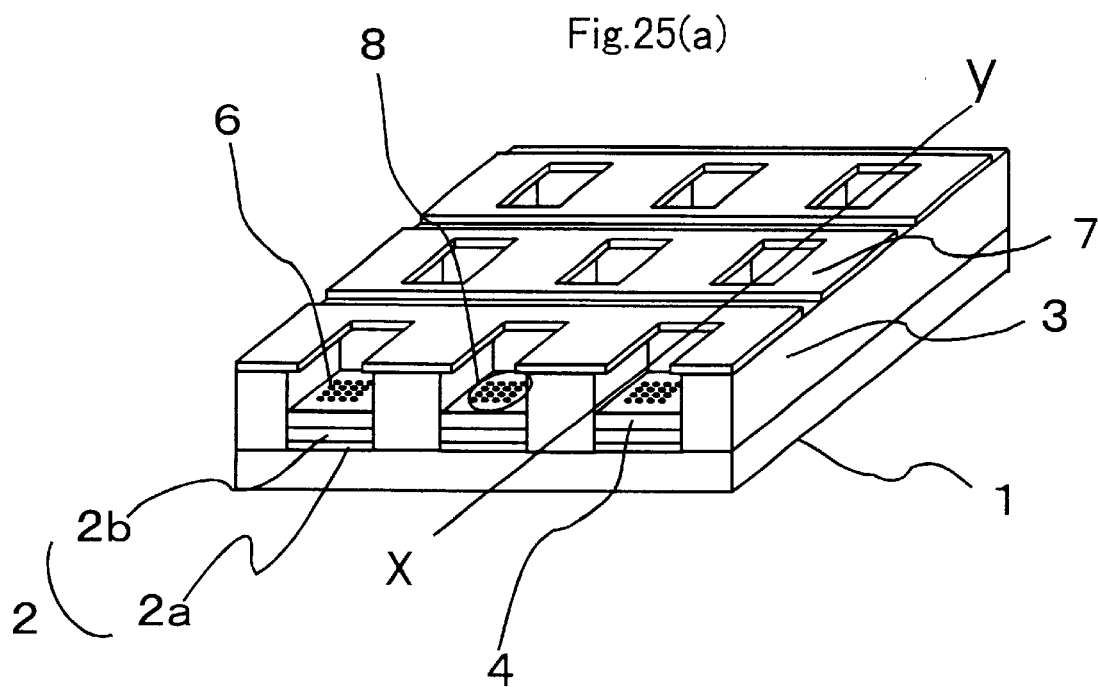
FIG. 25(a) is a perspective view showing another electron-source array of the present invention.
Figure 25B:
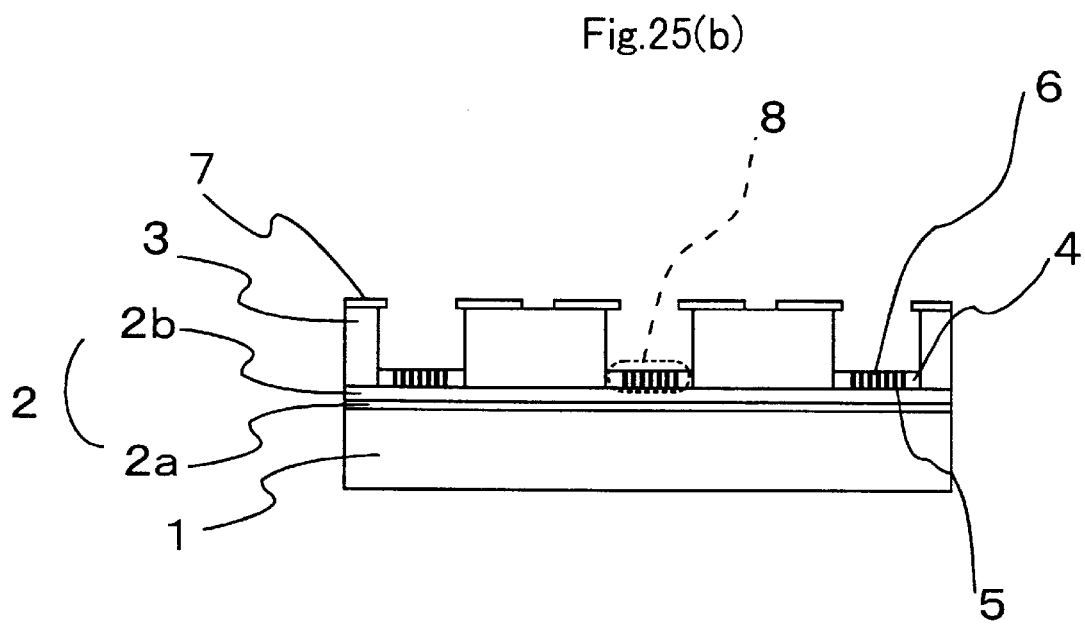
FIG. 25(b) is a cross-sectional view taken along line x-y of FIG. 25(a).

Here, in the same manner as the Embodiment 1, the present embodiment explains a construction in which the electron source having pores filled with an electron emitting material is applied to a display-use electron-source array that enables X-Y matrix driving. FIG. 25(a) is a perspective view showing the present invention, and FIG. 25(b) is a cross-sectional view taken along line x-y in FIG. 25(a).

An electron emitting area is provided with electron emitting sections 8 that are formed at portions at which cathode wires 2 and gate electrode wires 7 orthogonally intersect each other so as to allow X-Y matrix driving. Moreover, each electron emitting section 8 is constituted by a plurality of emitters 6 formed by filling pores 5 in an insulation film 4 independently formed on each crossing section of the cathode electrode wire 2 and the gate electrode wire 7 with an electron emitting material.

Each cathode electrode wire 2, which supplies electrons to an electron source, is constituted by a cathode electrode layer 2a, a ballast resistance layer 2b that is stacked on the cathode electrode layer 2a and that is electrically connected to the electron emitting section 8.

Figure 26A:
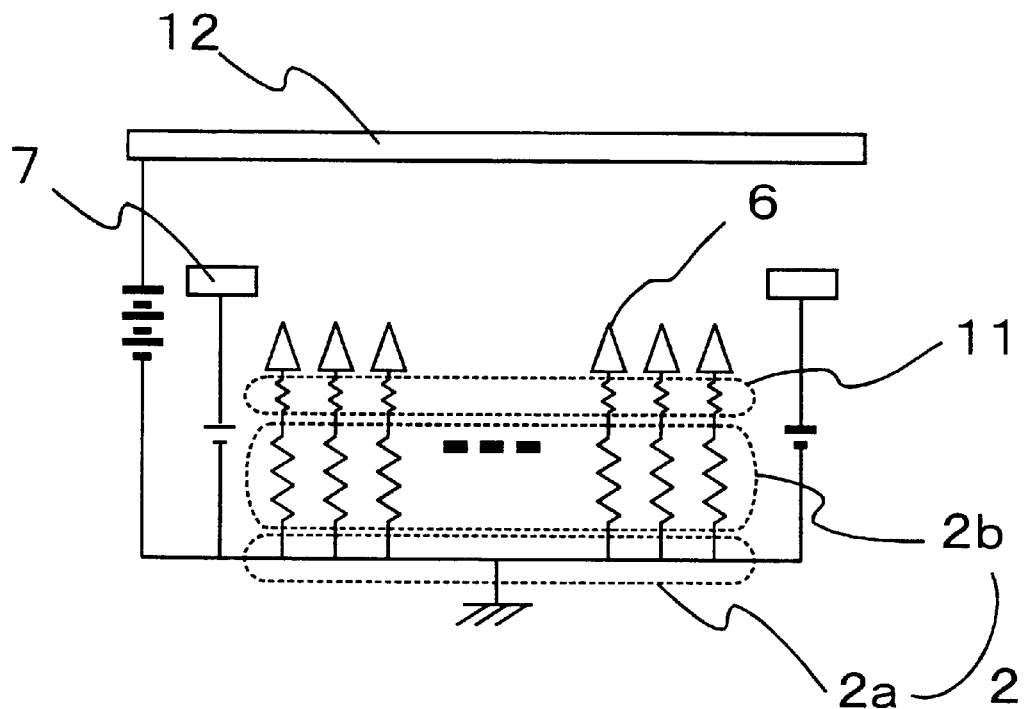
FIG. 26(a) is a block diagram that shows an equivalent circuit of the electron-source array of the present invention.

Moreover, the emitters 6 are formed in the pores 5 in the insulation film 4 in a manner so as to electrically separate from each other, and electrically connected to the cathode electrode layer 2a through the ballast resistance layer 2b. FIG. 26(a) shows an equivalent circuit diagram of the present invention, and FIG. 26(b) shows an equivalent circuit diagram of a conventional construction.

Figure 26B:
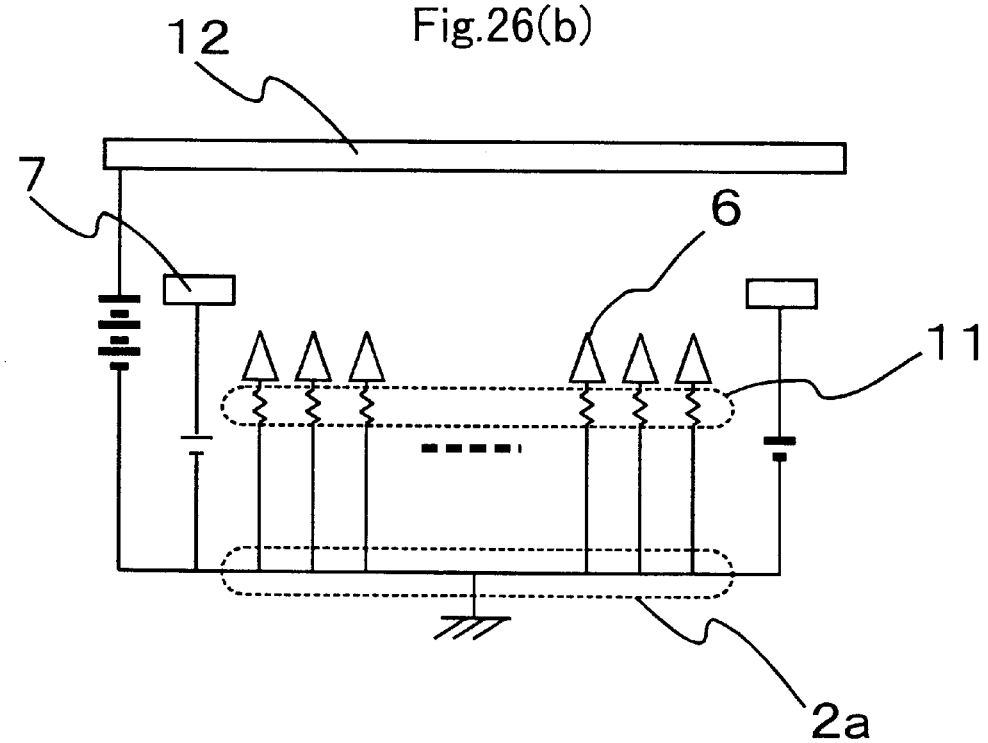
FIG. 26(b) is a block diagram that shows an equivalent circuit of a conventional electron-source array.

In the conventional construction shown in FIG. 26(b), each emitter 6 only contains internal resistance 11 that is exerted by its material, with the result that the emission current is less susceptible to a limitation caused by resistance, thereby causing ununiformity and instability.

In contrast, in the construction of the present invention shown in FIG. 26(a), the emitters 6, which have respective internal resistance 11, are series-connected to the ballast resistance layer 2b, and also connected to the cathode electrode layer 2a in parallel with each other in an independent manner. When electrons are supplied from the cathode electrode layer 2a to the emitters 6, voltage drops occur in proportion to the amounts of current by the ballast resistance layer 2b. Those emitters 6 that tend to emit easily have limitations in their amounts of current, thereby making the amounts of emission uniform and stable. Moreover, this effect is exerted not only in the electron emitting sections 8, but also on all the electron sources formed on the substrate 1 in the same manner; thus, it becomes possible to improve the uniformity of the electron-source array.

Here, as illustrated in FIGS. 26(a) and 26(b), the cathode electrode layer 2a and the gate electrode wires 7 are connected to the anode electrodes 12, and the relationship between the anode electrodes 12 and the emitter 6 will be described later.

Next, with respect to the insulation film 4 having the pores 5 for constituting the electron emitting sections 8, an explanation will be given of the features of the present invention. In the typical manufacturing method, the insulation film 4 having the pores 5 is obtained by subjecting the pre-oxide 4a that is a metal film formed on the substrate 1 to an anodic oxidation treatment. Although it depends on oxidizing conditions, the diameter of the pores 5 is set to approximately 10 to 100 nm, which makes it possible to form the pores uniformly; therefore, it is possible to form a fine construction more easily without the need for using a high-precision pattern forming technique currently used in the semiconductor device process.

Moreover, since the metal film of the pre-oxide 4a is divided into small areas and formed as a pattern on the substrate 1, it is possible to reduce distortion due to thermal expansion caused in the substrate 1 and between the wires, even under a high-temperature process using the aforementioned thermal CVD, and consequently to resist temperatures in a wider range.

In this manner, as compared with the Spindt type metal electron-source that has been mainly used in recent year, the present invention makes it possible to form a uniform fine electron-source without the need for the application of a high-precision patterning technique, and consequently to increase its density to not less than 10 times; thus, it becomes possible to improve the stability and reproducibility of the electron emitting characteristics.

Figure 27A:
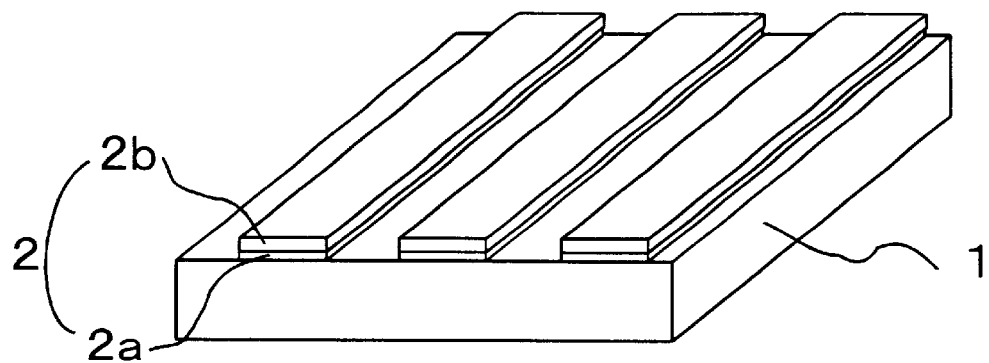
FIGS. 27(a) to 27(c) are explanatory drawings that show manufacturing processes of an electron-source array related to Examples 9 and 10.
Figure 27B:
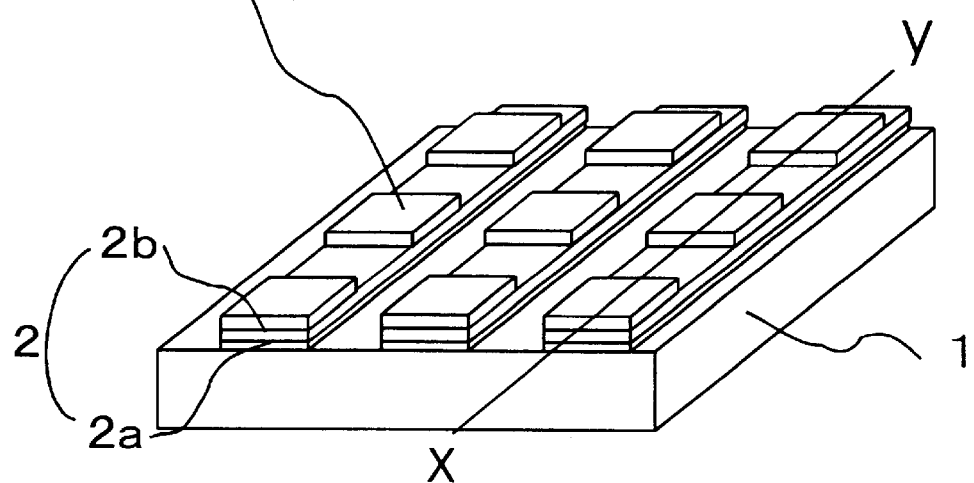
Figure 27C:
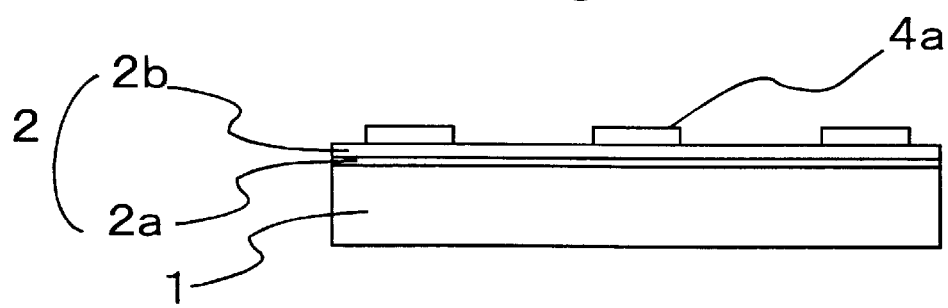

Referring to FIGS. 27(a) through 27(c) as well as 28(a) through 28(c), a brief explanation will be given of the manufacturing method of the above-mentioned electron-source array. In the present example, carbon nanotubes that are superior in electron emitting property are used as the electron emitting material.

First, a cathode electrode layer 2a constituting the cathode electrode wires 2 and a ballast resistance layer 2b are formed as laminated layers on a substrate 1 having a surface insulation property, and this is patterned in the form of lines (FIG. 27(a)), and aluminum serving as the pre-oxide 4a is deposited thereon only at positions that are to form the electron emitting sections 8 by means of sputtering or an electron beam vapor deposition method and a photolithography etching process (FIGS. 27(b) and 27(c)). (Here, FIG. 27(c) is a cross-sectional view taken along line x-y of FIG. 27(b)).

Here, an explanation will be given by reference to FIGS. 28(a) through 28(c) that are cross-sectional views taken along line x-y of FIG. 27(b). After the lamination processes as shown in FIGS. 27(a) through 27(c), the laminated layer is subjected to an anodic oxidation in a solution of sulfuric acid so that the aluminum serving as the pre-oxide 4a is oxidized and pores 5 are formed in the alumina that is the insulation film 4. In this case, since a barrier layer is formed on the electrode interface of the insulation film 4, the pore 5 is not allowed to penetrate to reach the electrode. Therefore, in order to remove the barrier layer in the pore 5, while the anode voltage is gradually reduced, only the barrier layer is removed (FIG. 28(a)).

Thereafter, a material having a catalytic action upon allowing carbon nanotubes to grow (for example, metals of the iron family, such as iron, nickel and cobalt, and platinum and rhodium) is deposited at the bottom of the pore by using a plating method, thereby forming carbon nanotubes.

Figure 28A:
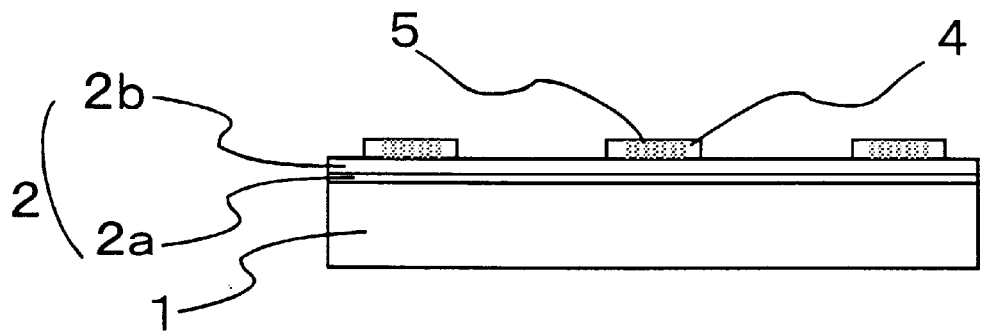
FIGS. 28(a) to 28(c) are explanatory drawings that show manufacturing processes of the electron-source array related to Examples 9 and 10.
Figure 28B:
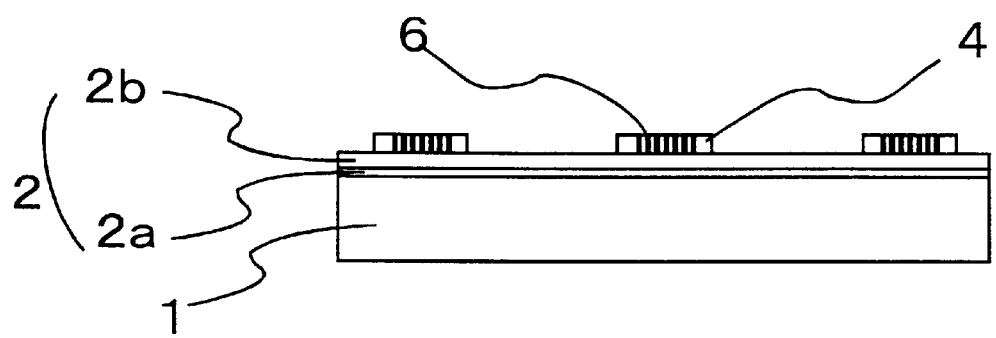

In the formation of carbon nanotubes, a hydrocarbon-based gas, such as methane, ethane, propane, ethylene and propylene, which is a material for carbon nanotubes, is allowed to flow, and carbon nanotubes that are to form emitters 6 are formed in the pores 5 by using a thermal CVD method or a plasma CVD method (FIG. 28(b)).

Moreover, in the same manner as the formation of the catalyst metal in place of carbon nanotubes by using a plating method, the emitters 6 may be formed by filling metal in the pores 5. Thereafter, the gate insulation layer 3 and the gate electrode wires 7 are successively formed, and the electron emitting sections 8 are exposed by using a photolithography etching process, thereby completing the formation of the electron-source array (FIG. 28(c)). At the time of etching, an etching process, used for allowing the carbon nanotubes serving as the emitters 6 to protrude from the surface of the insulation film 4, is simultaneously carried out.

The following description will discuss the construction of the electron-source array and the manufacturing method thereof explained in the present embodiment, by means of examples:

EXAMPLE 9

Referring to FIGS. 27(a) to 27(c) and FIGS. 28(a) to 28(c), a detailed explanation will be given of the ninth Example of the present invention.

First, as illustrated in FIG. 27(a), a molybdenum film of 0.4 μm serving as the cathode electrode layer 2a for the cathode electrode wires 2 and a silicon film of 0.5 μm serving as the ballast resistance layer 2b were successively formed as laminated layers on a substrate 1 made of silica-alumina. In this case, the width of the respective wires was set to 20 μm with pitches of 30 μm, and three lines of them were formed.

Next, as illustrated in FIGS. 27(b) and 27(c)(where FIG. 27(c) is a cross-sectional view taken along line x-y of FIG. 27(b)), after having deposited an aluminum film of 3 μm serving as the pre-oxide 4a of the insulation film 4 having the pores 5 by means of sputtering, only portions that were to form the electron emitting sections 8 were left in the form like islands by using a photolithograpy process and an etching process.

Next, an explanation will be given by reference to FIGS. 28(a) to 28(c) that are cross-sectional views taken along line x-y of FIG. 27(b). Then, this was subjected to an anodic oxidation in a solution of sulfuric acid so that the aluminum was oxidized and pores 5 were formed in the alumina that was the insulation film 4. Here, silicon, which formed the ballast resistance layer 2b, protected the cathode electrode layer 2a that was base metal from the anodic oxidizing solution during the anodic oxidation, and also served as a stopping layer for oxidation of the aluminum anode.

As described above, the ballast resistance layer 2b needs to be formed by a high resistance material which is also less susceptible to corrosion in an anodic oxidizing solution; and SiC, etc. may be used as the same kind of material. As described earlier, the anodic oxidation was complete when the oxidation had reached the silicon film that was the ballast resistance layer 2b. However, since a barrier layer was formed on the electrode interface of the oxidized film, the pore 5 was not allowed to penetrate to reach the electrode.

Therefore, in order to remove the barrier layer in the pore 5, while the anodic voltage is gradually reduced, only the barrier layer was removed (FIG. 28(a)). The pores 5 thus formed had a diameter of 30 nm and a pitch of 40 nm. Thereafter, nickel, which is a catalytic metal, was formed at the bottom of the pore 5 by using a plating method, and methane gas and diluting-use hydrogen, which were materials of carbon nanotubes, were allowed to flow in the plasma CVD process so as to form carbon nanotubes that were to serve as emitters 6 in the pores 5 (FIG. 28(b)).

Next, an SiO$_2$ film of 5 μm serving as the gate insulation layer 3 and a molybdenum film of 0.4 μm serving as the gate electrode wires 7 were deposited. Thereafter, in order to separate lines of the gate electrode wires 7, a resist mask was formed on the molybdenum film, and this was removed and separated by means of RIE. Next, the gaps between the separated gate electrode wires 7 were protected by resist, and SiO$_2$ film serving as the gate insulation layer 3 was etched by using hydrofluoric acid by the use of the molybdenum film serving as the gate electrode wires 7 as a mask so that the line separation of the gate electrode wires 7 and the opening of the electron emitting sections 8 were complete. At the time of etching the SiO$_2$ film, etching for allowing the carbon nanotubes serving as emitters 6 to protrude from the surface of the insulation film 4 was simultaneously carried out.

Figure 28C:
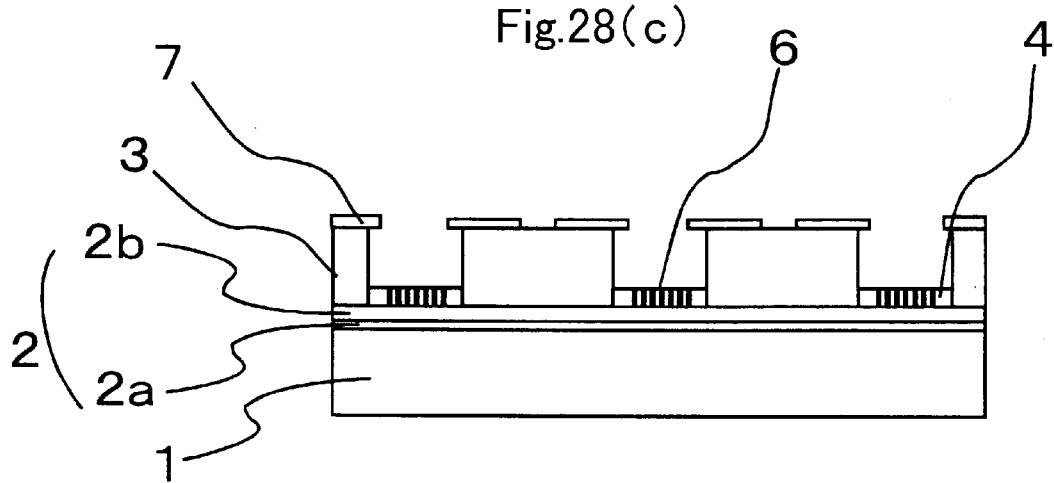

The size of the windows of the electron emitting sections 8 was 5 μm square, and the number of the electron sources thus formed was 3×3, that is, a total 9 (FIG. 28(c)).

A fluorescent plate is placed 1 mm above the electron-source array manufactured as described above, and an anode voltage of 5 kV was applied thereto while the gate voltage was varied in the range of −2 to 20 V so that the emission current was confirmed. A maximum anode current of 5 μA per pixel was obtained, and it was confirmed that the anode current varied in proportion to the number of pixels that had been addressed.

In the driving process of the electron-source array, as described earlier, controlled emission currents were confirmed in the range of $V_A/d_A > V_G/d_G$ (where a voltage applied to the anode electrodes 12 (FIG. 26(a)) is $V_A$; a voltage applied to the gate electrode wires 7 is $V_G$; the distance from the electron emitting sections 8 to the anode electrodes 12 is $d_A$; and the distance from the electron emitting sections 8 to the gate electrode wires 7 is $d_G$), and as compared with a Spindt-type metal emitter that was a metal emitter formed with the same area, it was confirmed that the size of luminous points appearing on the fluorescent plate was sufficiently small.

Moreover, an electron-source array having no silicon film serving as the ballast resistance layer 2b in the present embodiment was also formed in the same manner as described above; thus, the functions of the ballast resistance layer 2b were confirmed. In the present embodiment, the current variations were reduced to approximately ±5% at the time of an emission current of 1 μA; in contrast, in the case of the electron-source array without the ballast resistance layer 2b, the variations exceeded ±15% at the time of the same emission current of 1 μA, thereby failing to obtain a current as stable as the present embodiment.

EXAMPLE 10

In the tenth Example in accordance with the present invention, an explanation will be given of a structure that does not need a high-temperature process for forming carbon nanotubes. Referring to process drawings of FIGS. 27(a) to 27(c) as well as FIGS. 28(a) to 28(c), a detailed explanation will be given of the processes, which are basically same as those of the ninth Example, except that a glass substrate is used as the substrate 1. Here, the same specifications are used with respect to the electron-source array.

As illustrated in FIG. 27(a), a molybdenum film of 0.4 μm serving as the cathode electrode layer 2a and a silicon film of 0.5 μm serving as the ballast resistance layer 2b were successively formed on a substrate 1 made of glass. Thereafter, the same processes as those of the ninth Example were carried out up to the process where the emitter material was filled into the pores 5. After the formation of the pores 5 (FIG. 28(a)), instead of forming carbon nanotubes, copper was deposited in the pores 5 while applying an electric field thereto in a bath (FIG. 28 (b)). Thereafter, the same forming processes of the gate insulation layer 3 and the gate electrode wires 7, and patterning process as those of the ninth Example were carried out, thereby completing the manufacturing processes of the electron-source array (FIG. 28(c)).

A fluorescent plate is placed 1 mm above the electron-source array manufactured as described above, and an anode voltage of 5 kV was applied thereto while the gate voltage was varied in the range of 0 to 200 V so that the emission current was confirmed. A maximum anode current of 3 μA per pixel was obtained, and it was confirmed that the anode current varied in proportion to the number of pixels that had been addressed.

EXAMPLE 11

Referring to FIGS. 29(a) to 29(c) and FIGS. 30(a) to 30(c), a detailed explanation will be given of the eleventh Example of the present invention. The present example is similar to the ninth example in its structure and manufacturing method. In the ninth example, one gate opening section 13 is formed with respect to each electron emitting section 8 at which the cathode electrode wire 2 and the gate electrode wire 7 intersect each other; however, in the present example, the area of the insulation film 4 is made larger, and a plurality of gate opening sections 13 are formed therein. In the case when applied to a display device, since the present example has a plurality of gate opening sections 13 (FIG. 30(c)) for one pixel, it is similar to the Spindt-type metal emitter in its structure. The size of the insulation film 4 manufactured in the present example is set to 100 μm.

Figure 29A:
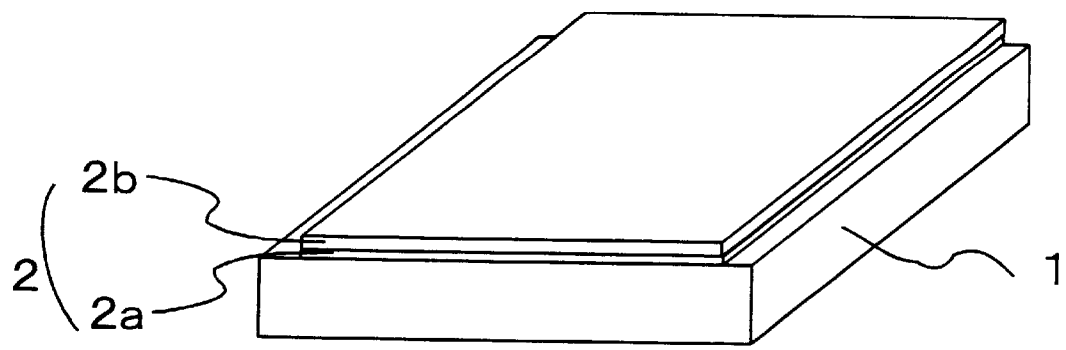
FIGS. 29(a) to 29(c) are explanatory drawings that show manufacturing processes of an electron-source array related to Examples 11 and 12.

First, as illustrated in FIG. 29(a), a molybdenum film of 0.4 μm serving as the cathode electrode layer 2a and a silicon film of 0.5 μm serving as the ballast resistance layer 2b were successively formed as laminated layers on a substrate 1 made of silica-alumina. In this case, the width of the respective wires was set to 150 μm with pitches of 300 μm, and two lines of them were formed.

Figure 29B:
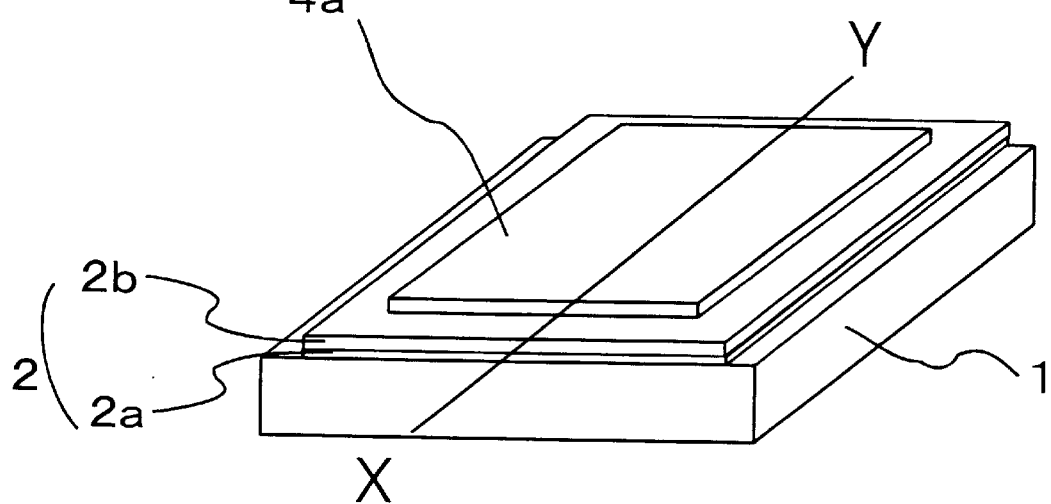
Figure 29C:
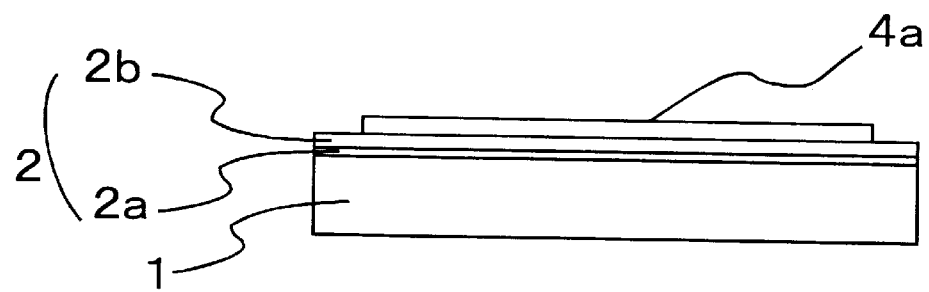

Next, as illustrated in FIGS. 29(b) and 29(c)(where FIG. 29(c) is a cross-sectional view taken along line x-y of FIG. 29(b)), after having deposited an aluminum film of 3 μm serving as the pre-oxide 4a of the insulation film 4 having the pores 5 by means of sputtering, only portions that were to form the electron emitting sections 8 were left in the form like islands by using a photolithograpy process and an etching process.

Next, an explanation will be given by reference to FIGS. 30(a) to 30(c) that are cross-sectional views taken along line x-y of FIG. 29(b). Then, this was subjected to an anodic oxidation in a solution of sulfuric acid so that the aluminum was oxidized and pores 5 were formed in the alumina that was the insulation film 4.

Here, silicon, which formed the ballast resistance layer 2b, protected the cathode electrode layer 2a that was base metal from the oxidizing solution during the anodic oxidation, and also served as a stopping layer for oxidation of the aluminum anode. The ballast resistance layer 2b needs to be formed by a high resistance material which is also less susceptible to corrosion in an anodic oxidizing solution; and SiC, etc. may be used as the same kind of material. As described earlier, the anodic oxidation was complete when the oxidation had reached the silicon film that was the ballast resistance layer 2b. However, since a barrier layer was formed on the electrode interface of the oxidized film, the pore 5 was not allowed to penetrate to reach the electrode.

Figure 30A:
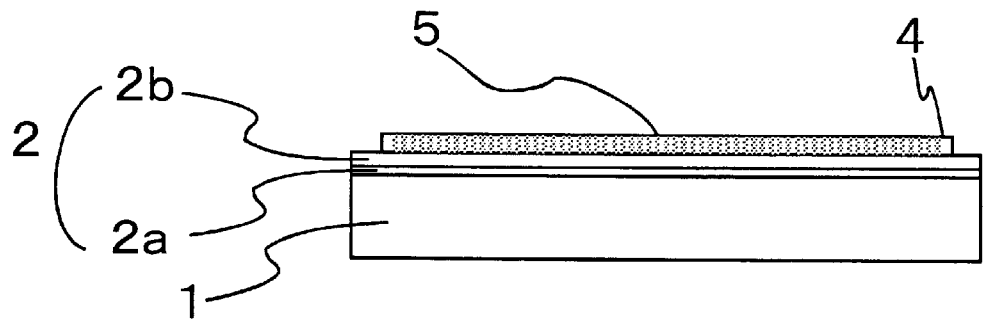
FIGS. 30(a) to 30(c) are explanatory drawings that show manufacturing processes of the electron-source array related to Examples 11 and 12.
Figure 30B:
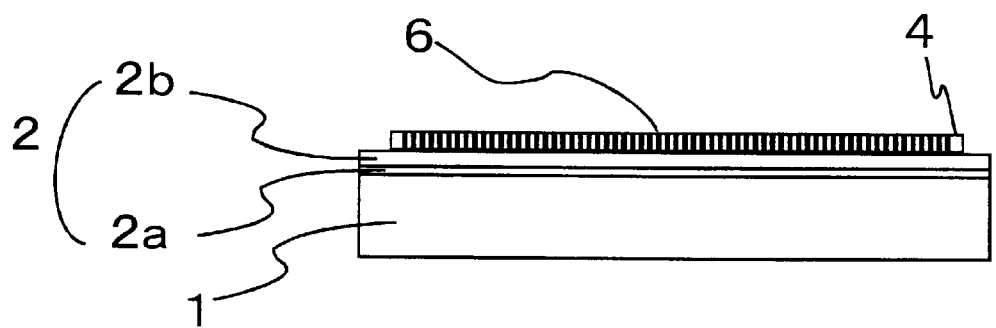
Figure 30C:
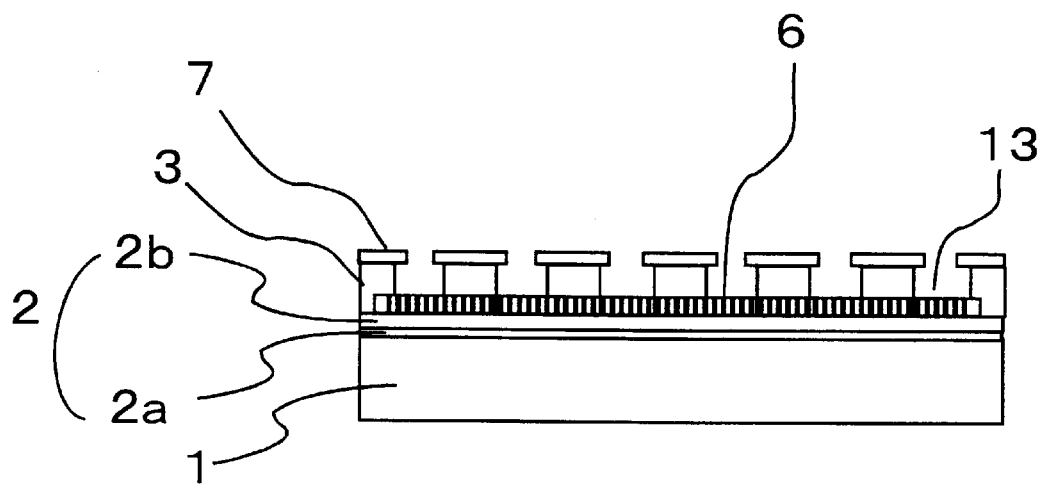

Therefore, in order to remove the barrier layer in the pore 5, while the anodic voltage was gradually reduced, only the barrier layer was removed (FIG. 30(a)). The pores 5 thus formed had a diameter of 30 nm and a pitch of 40 nm. Thereafter, nickel, which is a catalytic metal, was formed at the bottom of the pore 5 by using a plating method, and methane gas and diluting-use hydrogen, which were materials of carbon nanotubes, were allowed to flow in the plasma CVD process so as to form carbon nanotubes that were to serve as emitters 6 in the pores 5 (FIG. 30(b)).

Next, an $SiO_2$ film of 5 μm serving as the gate insulation layer 3 and a molybdenum film of 0.4 μm serving as the gate electrode wires 7 were deposited. Thereafter, in order to separate lines of the gate electrode wires 7, a resist mask was formed on the molybdenum film, and this was removed and separated by means of RIE. Next, the gaps between the separated gate electrode wires 7 were protected by resist, and $SiO_2$ film serving as the gate insulation layer 3 was etched by using hydrofluoric acid by the use of the molybdenum film serving as the gate electrode wires 7 as a mask so that the line separation of the gate electrode wires 7 and the formation of the gate opening section 13 serving as the electron emitting sections 8 were complete (FIG. 30(*c*))x. At the time of etching the $SiO_2$ film, etching for allowing the carbon nanotubes serving as emitters 6 to protrude from the surface of the insulation film 4 was simultaneously carried out.

The size of the windows in the gate opening section 13 was set to 5 μmφ with a pitch of 20 μm. The number of the gate opening sections 13 was 16 (4×4) in one insulation film 4 having 100 μm square, and an electron-source array having a total of 64 (16×4) gate opening sections 13 was manufactured.

A fluorescent plate is placed 1 mm above the electron-source array manufactured as described above, and an anode voltage of 5 kV was applied thereto while the gate voltage was varied in the range of −2V to 20 V so that the emission current was confirmed. A maximum anode current of 40 μA per pixel was obtained, and it was confirmed that the anode current varied in proportion to the number of pixels that had been addressed.

In the driving process of the electron-source array, as described earlier, controlled emission currents were confirmed in the range of $V_A/d_A = V_G/d_G$ (where a voltage applied to the anode electrodes 12 (FIG. 26(*a*)) is $V_A$; a voltage applied to the gate electrode wires 7 is $V_G$; the distance from the electron emitting sections 8 to the anode electrodes 12 is $d_A$; and the distance from the electron emitting sections 8 to the gate electrode wires 7 is $d_G$).

Moreover, an electron-source array having no silicon film serving as the ballast resistance layer 2*b* in the present embodiment was also formed in the same manner as described above; thus, the functions of the ballast resistance layer 2*b* were confirmed. In the present embodiment, the current variations were reduced to approximately ±1% at the time of an emission current of 1 μA; in contrast, in the case of the electron-source array without the ballast resistance layer 2*b*, the variations were located approximately in the range of ±5 to 10% at the time of the same emission current of 1 μA, thereby failing to obtain a current as stable as the present embodiment.

EXAMPLE 12

In the twelfth Example in accordance with the present invention, an explanation will be given of a structure that does not need a high-temperature process for forming carbon nanotubes. Referring to process drawings of FIGS. 29(*c*) as well as FIGS. 30(*a*) to 30(*c*), a detailed explanation will be given of the processes, which are basically same as those of the eleventh Example, except that a glass substrate is used as the substrate 1. Here, the same specifications are used with respect to the electron-source array.

As illustrated in FIG. 29(*a*), a molybdenum film of 0.4 μm serving as the cathode electrode layer 2*a* and a silicon film of 0.5 μm serving as the ballast resistance layer 2*b* were successively formed on a substrate 1 made of glass. Thereafter, the same processes as those of the eleventh Example were carried out up to the process where the emitter material was filled into the pores 5. After the formation of the pores 5 (FIG. 30(*a*)), copper was deposited in the pores 5 while applying an electric field thereto in a bath. The growth was completed when the tip of the copper had reached the alumina surface (FIG. 30(*b*)). Thereafter, the same forming processes of the gate insulation layer 3 and the gate electrode wires 7, and patterning process as those of the eleventh Example were carried out, thereby completing the manufacturing processes of the electron-source array (FIG. 30(*c*)).

A fluorescent plate is placed 1 mm above the electron-source array manufactured as described above, and an anode voltage of 5 kV was applied thereto while the gate voltage was varied in the range of 0 to 200 V so that the emission current was confirmed. A maximum anode current of 10 μA per pixel was obtained, and it was confirmed that the anode current varied in proportion to the number of pixels that had been addressed.

The above-mentioned embodiment 1 and embodiment 2 have exemplified a case in which the pores 5 are filled with the electron emitting material so as to provide an electron source which has emitters electrically separated from each other and which has a uniform shape and a superior electric-field concentration efficiency with a high-density vertical orientation; in contrast, the embodiment 3 exemplifies a case in which a plurality of aggregates, which contain an electron emitting material as the main component, are placed in a divided manner.

Embodiment 3

The following description will discuss still another embodiment of the present invention.

Figure 31A:
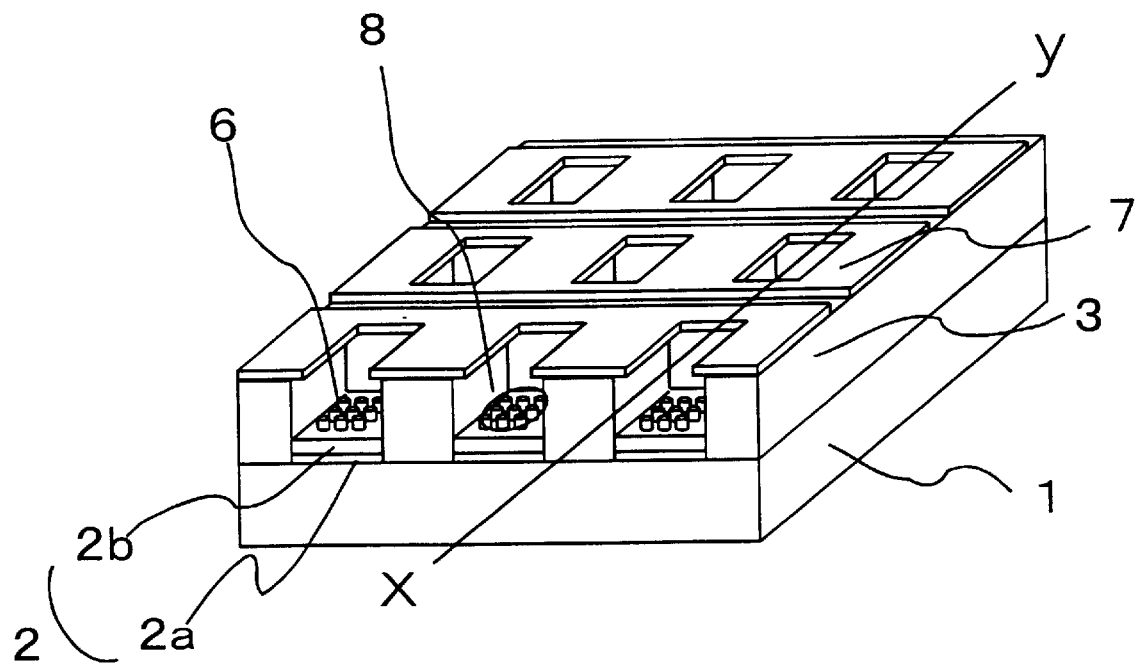
FIG. 31(a) is a perspective view showing still another electron-source array of the present invention.
Figure 31B:
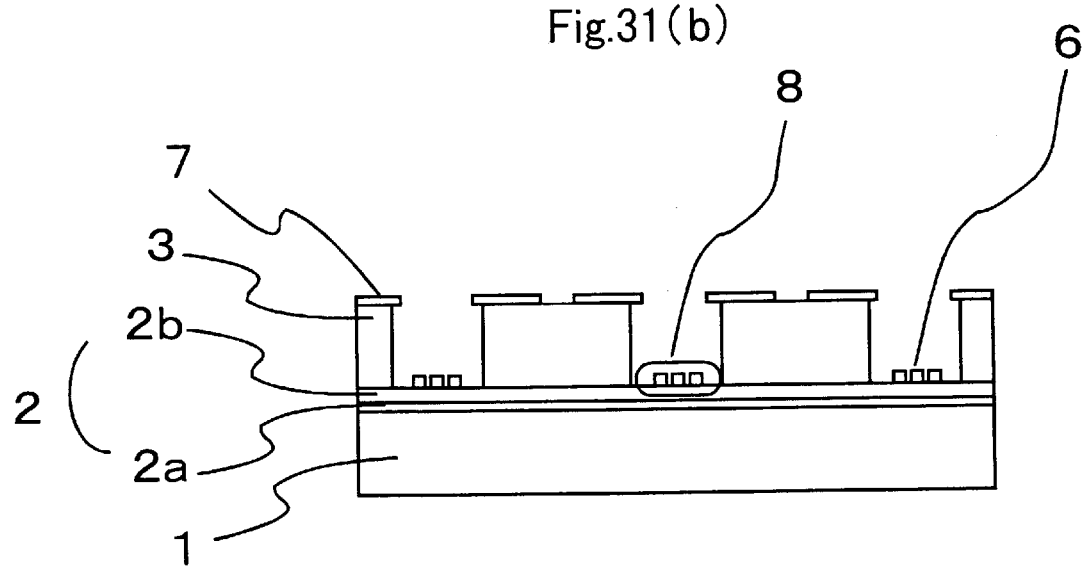
FIG. 31(b) is a cross-sectional view taken along line x-y of FIG. 31 (a)

In the present Embodiment, an explanation will be given of an arrangement in which an electron-source array whose electron emitting section is formed by an aggregate that has an electron emitting material having a fine size as its main component is applied to a display-use electron-source array that enables X-Y matrix driving. FIG. 31(*a*) shows a perspective view of the present invention, and FIG. 31(*b*) is a cross-sectional view taken along line x-y of FIG. 31(*a*).

An electron emitting area is provided with electron emitting sections 8 that are formed at portions at which cathode wires 2 and gate electrode wires 7 orthogonally intersect each other so as to allow X-Y matrix driving. Moreover, each electron emitting section 8 is constituted by a plurality of emitters 6 each of which is divided into a plurality of areas on each crossing section of the cathode electrode wire 2 and the gate electrode wire 7, each area being constituted by an aggregate that has an electron emitting material having a fine size as its main component.

Each cathode electrode wire 2, which supplies electrons to an electron source, is constituted by a cathode electrode layer 2*a*, a ballast resistance layer 2*b* that is stacked on the cathode electrode layer 2*a* and that is electrically connected to the electron emitting section 8.

Moreover, the emitters 6, which are formed in a separated state spatially, are electrically connected to the cathode electrode layer 2*a* through the ballast resistance layer 2*b*. FIG. 32(*a*) shows an equivalent circuit diagram of the present invention, and FIG. 32(*b*) shows an equivalent circuit diagram of a conventional construction.

In the conventional construction shown in FIG. 32(*b*), each emitter 6 only contains internal resistance 11 that is exerted by its material, with the result that the emission current is less susceptible to a limitation caused by resistance, and since this is formed as a continuous paste film that is developed two-dimensionally within the electron emitting section 8, this has no functions for reducing ununiformity and instability within the film.

In contrast, in the construction of the present invention shown in FIG. 32(*a*), the paste film, which has been conventionally provided as an integral film, is separated and divided spatially into areas having a smaller size; thus, it is possible to disperse electron emitting points within the electron emitting section 8.

In other words, in the electron-source array of the present invention, the emitters 6, which have respective internal resistance 11, are series-connected to the ballast resistance layer 2b, and also connected to the cathode electrode layer 2a in parallel with each other in an independent manner. When electrons are supplied from the cathode electrode layer 2a to the emitters 6, voltage drops occur in proportion to the amounts of current by the ballast resistance layer 2b. Those emitters 6 that tend to emit easily have limitations in their amounts of current, thereby making the amounts of emission uniform and stable. Moreover, this effect is exerted not only in the electron emitting sections 8, but also on all the electron sources formed on the substrate 1 in the same manner; thus, it becomes possible to improve the uniformity of the electron-source array.

Moreover, in the present invention, an inexpensive manufacturing method, such as a printing method and an ink jet method, is adopted so that an electron-source array having a large area can be manufactured at low costs.

In this manner, as compared with the Spindt type metal electron-source that has been mainly used in recent year, the present invention makes it possible to form a uniform fine electron-source at low costs, to improve the stability and reproducibility of the electron emitting characteristics, and also to provide an electron-source array suitable for a large area.

Figure 33A:
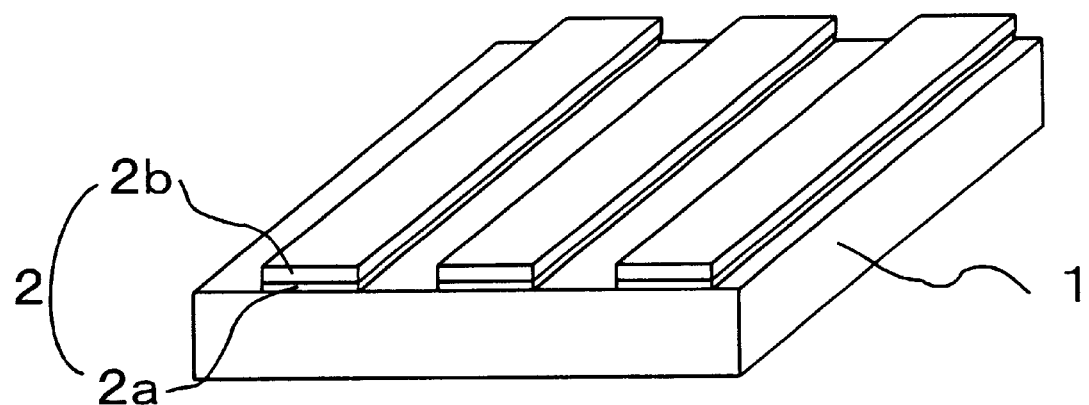
FIGS. 33(a) and 33(b) are explanatory drawings that show manufacturing processes of an electron-source array related to Example 13.
Figure 33B:
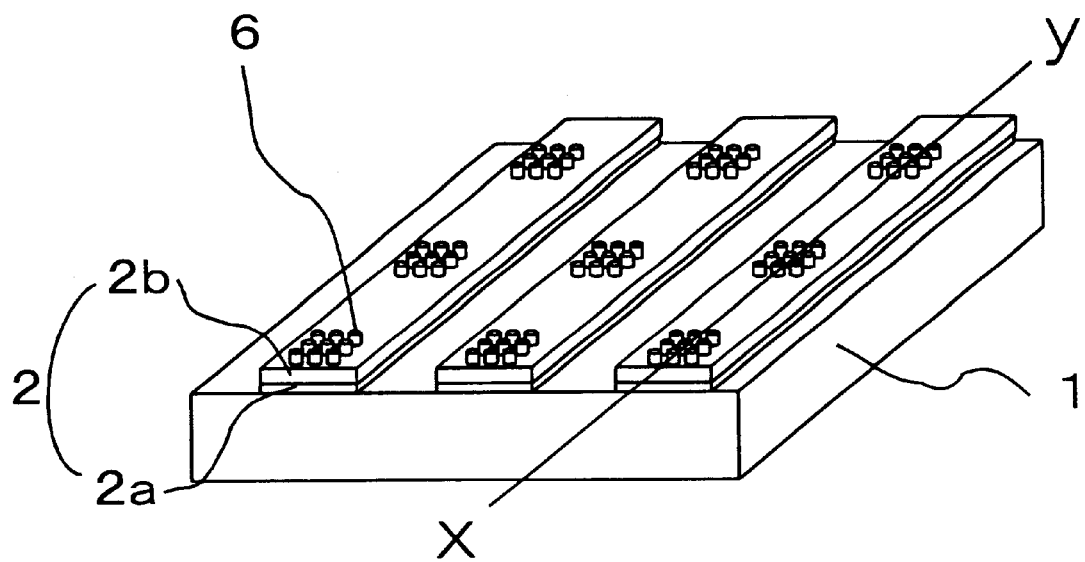
Figure 34:
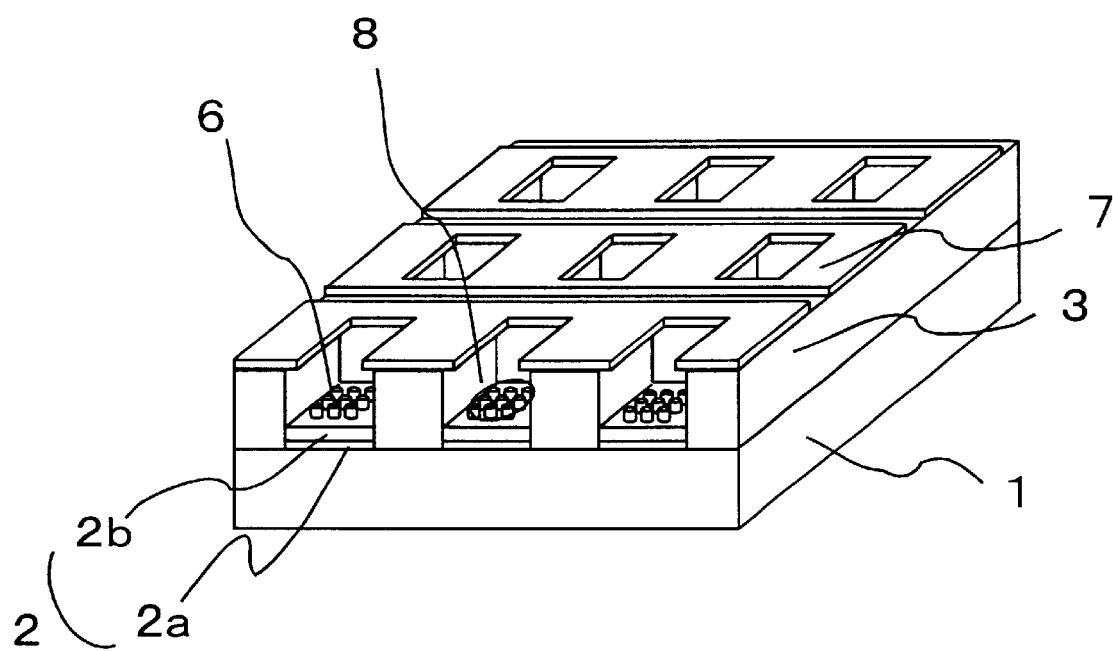
FIG. 34 is a schematic perspective view that shows the electron-source array related to Example 13.
Figure 35:
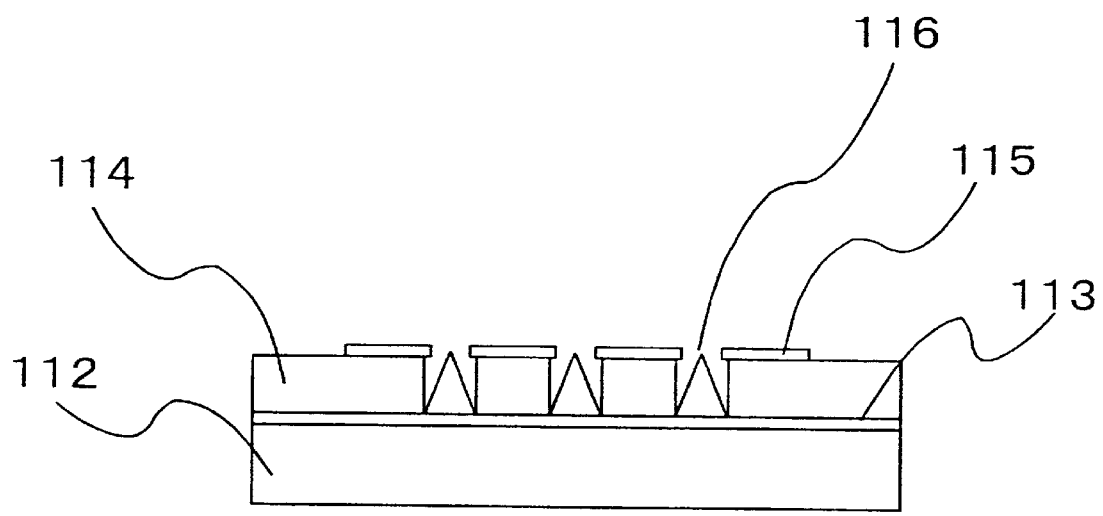
FIG. 35 is a cross-sectional view that shows a conventional electron source.
Figure 36:
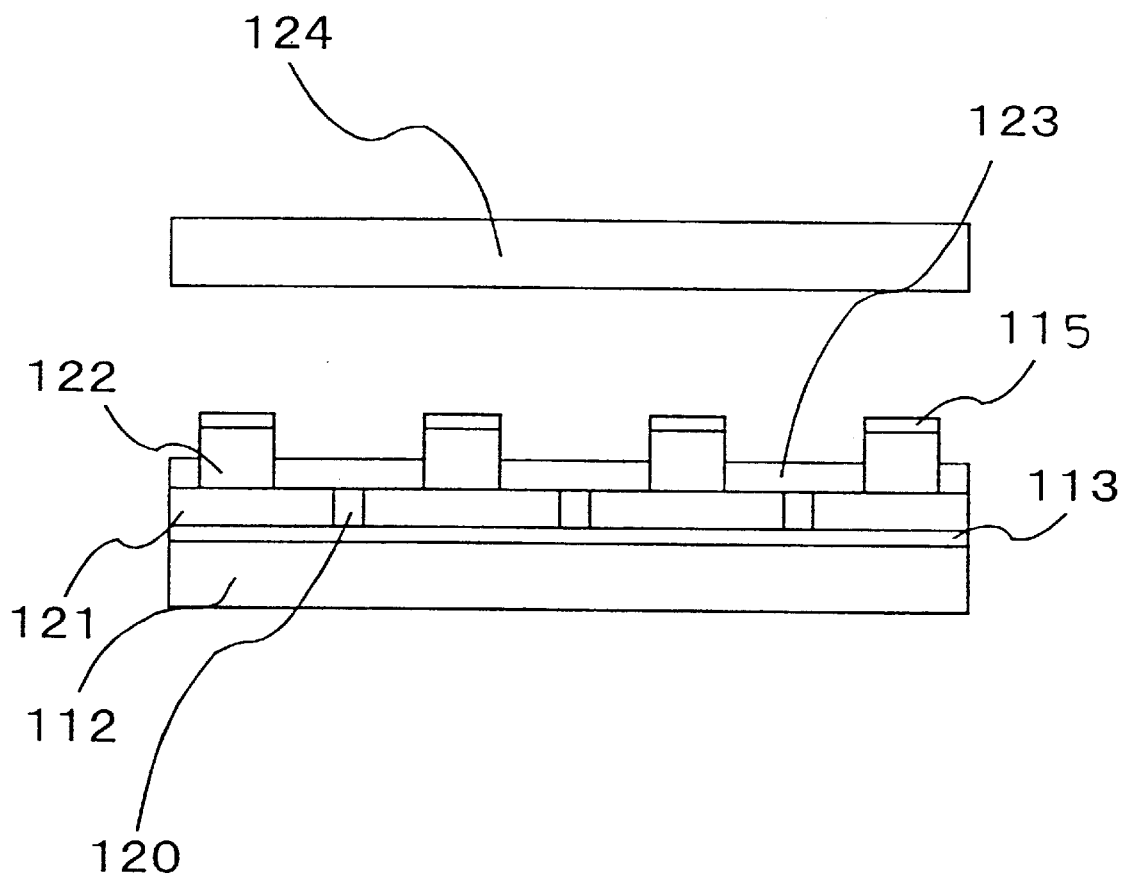
FIG. 36 is a cross-sectional view that shows a conventional electron source.
Figure 37:
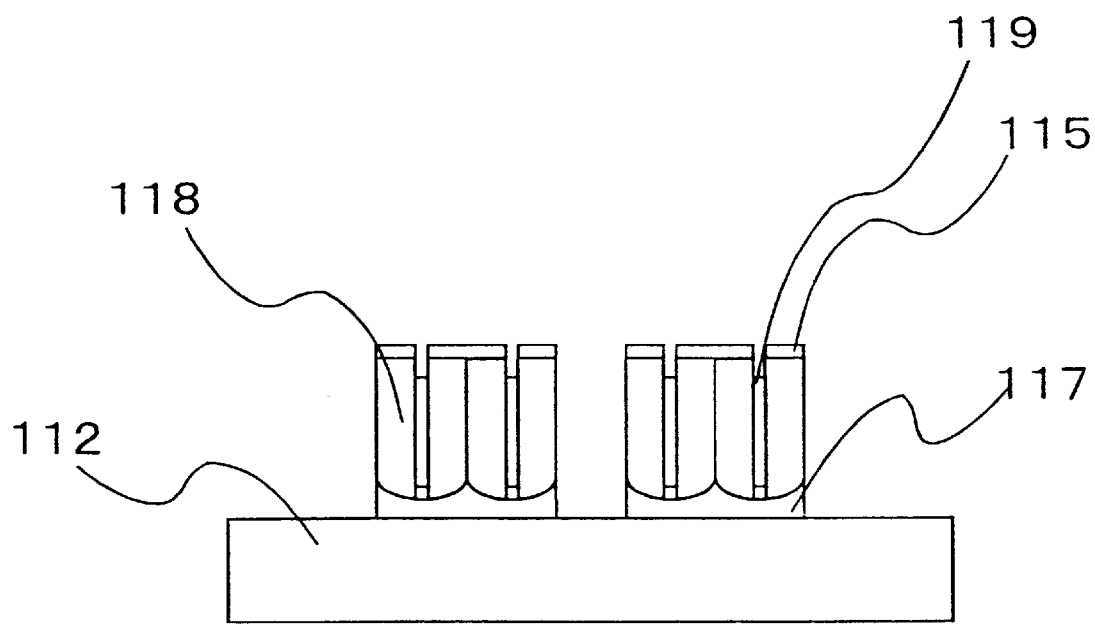
FIG. 37 is a cross-sectional view that shows a conventional electron source.

Referring to FIGS. 33(a) and 33(b) as well as FIG. 34, an explanation will be briefly given of the manufacturing method of the above-mentioned electron-source array. In the present embodiment, with respect to the electron emitting material, carbon nanotubes which are dealt as powder, and superior in the electron emitting property are adopted. First, a cathode electrode layer 2a forming cathode electrode wires 2 in the form of stripes and a ballast resistance layer 2b are formed as laminated layers on a substrate 1 having an insulation surface by using a printing method (FIG. 33(a)), and on this is formed carbon nanotubes, formed into paste, by using a printing method so as to be placed as a plurality of separated areas on the electron emitting section 8; thus, emitters 6 are formed (FIG. 33(b)). Moreover, a gate insulation layer 3 and gate electrode wires 7 are formed in a manner so as to surround the electron emitting section 8, thereby completing the manufacture of the electron-source array as illustrated in FIG. 34.

The following description will discuss the construction of the electron-source array and the manufacturing method thereof explained in the present embodiment, by means of examples:

EXAMPLE 13

Referring to FIGS. 33(a) and 33(b) as well as FIG. 34, a detailed explanation will be given of the thirteenth Example of the present invention.

First, as illustrated in FIG. 33(a), a silver film of 10 $\mu$m serving as the cathode electrode layer 2a and a ruthenium oxide of 5 $\mu$m serving as the ballast resistance layer 2b were successively formed as laminated layers on a substrate 1 made of glass by using a printing method. In this case, the width of the respective wires was set to 200 $\mu$m with pitches of 500 $\mu$m, and three lines of them were formed.

Next, carbon nanotubes having a length of approximately 5 $\mu$m, which had been separately manufactured by using a plasma CVD method, were mixed into a solvent together with frit glass powder so as to form paste. As illustrated in FIG. 33(b), by using this paste, 9 (3×3) emitters 6 were formed on the ruthenium oxide film serving as the ballast resistance layer 2b through a mask having an opening diameter of 25 $\mu$m and a pitch of 50 $\mu$m, made of stainless steel (FIG. 33(b)).

Thereafter, on this were respectively formed in succession a gate insulation layer 3 having a thickness of 200 $\mu$m by using insulation paste used in the plasma display and gate electrode wires 7 having a thickness of 10 $\mu$m by using silver paste through a printing method, and this was calcined in the air, thereby completing the manufacture of the electron-source array (FIG. 34).

In the present embodiment, the carbon nanotube, which is an electron-emitting material, is dispersed in the frit glass powder and the organic solvent so as to form paste; however, for example, in the case when the emitter is formed by using a fine nozzle, it is preferable to disperse, for example, a resist material, a cellulose material, etc. in a polymer.

Moreover, in the present embodiment, the gate electrode wires 7 were placed in a manner so as to surround the periphery of the electron emitting section 8 serving as the electron emitting area; however, these may be provided as mesh electrodes placed above the electron emitting section 8.

A fluorescent plate is placed 1 mm above the electron-source array manufactured as described above, and an anode voltage of 5 kV was applied thereto while the gate voltage was varied in the range of 0 V to 500 V so that the emission current was confirmed. A maximum anode current of 20 $\mu$A per pixel was obtained, and it was confirmed that the anode current varied in proportion to the number of pixels that had been addressed.

Figure 32A:
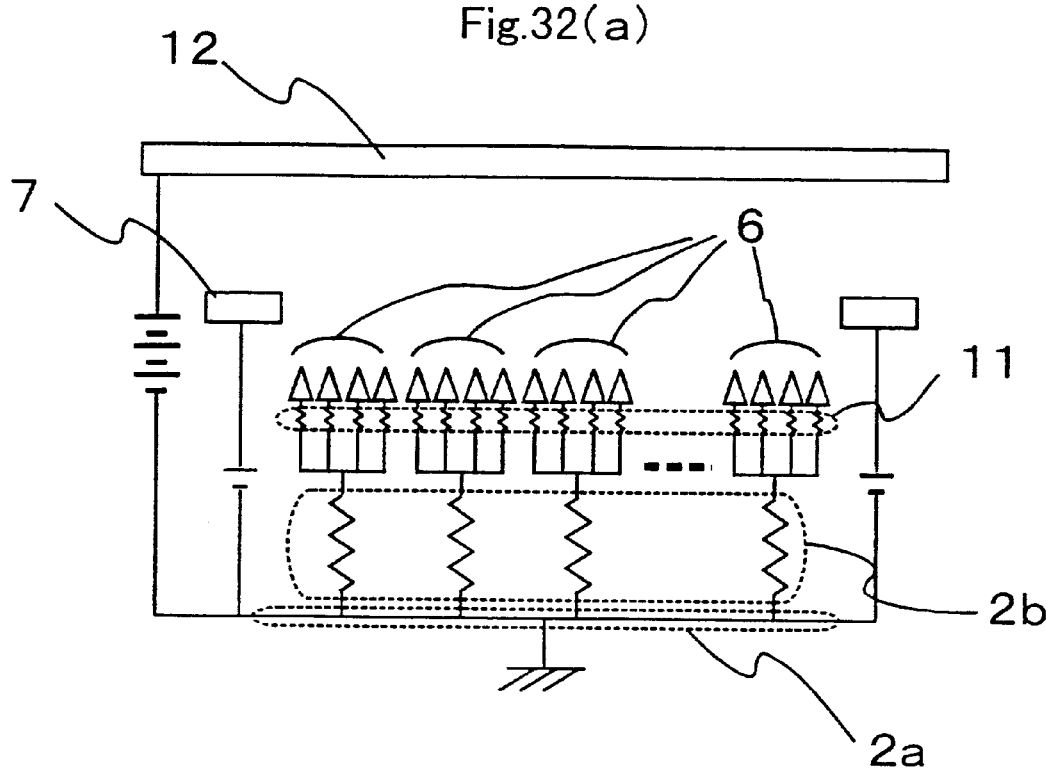
FIG. 32(a) is a block diagram that shows an equivalent circuit of the electron-source array of the present invention.
Figure 32B:
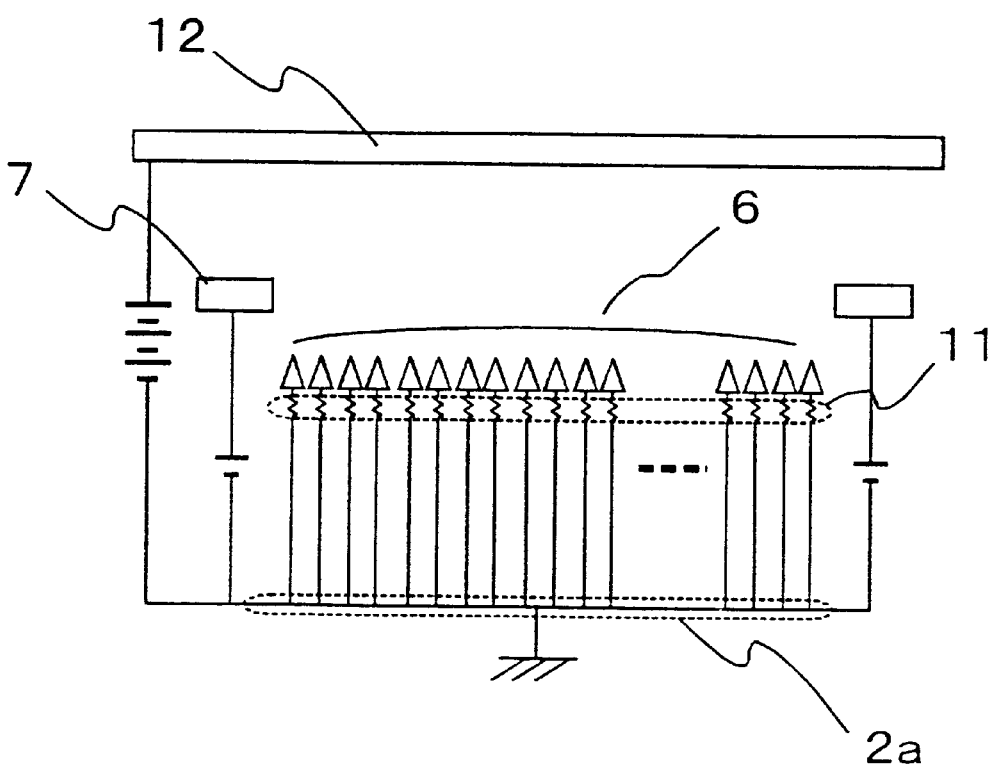
FIG. 32(b) is a block diagram that shows an equivalent circuit of a conventional electron-source array.

In the driving process of the electron-source array, as described earlier, controlled emission currents were confirmed in the range of $V_A/d_A = V_G/d_G$ (where a voltage applied to the anode electrodes 12 (FIG. 32(a)) is $V_A$; a voltage applied to the gate electrode wires 7 is $V_G$; the distance from the electron emitting sections 8 to the anode electrodes 12 is $d_A$; and the distance from the electron emitting sections 8 to the gate electrode wires 7 is $d_G$). In this driving method, in the present example, the gate electrode wires 7 were placed in a manner so as to surround the periphery of the electron emitting section 8 serving as the electron emitting area; however, these may be provided as mesh electrodes placed above the electron emitting section 8.

Moreover, an electron-source array having no silicon film serving as the ballast resistance layer 2b in the present embodiment and emitters 6 were also formed as consecutive films in the same processes as described above; thus, the effects of the emitter separation and division and the functions of the ballast resistance layer 2b were confirmed. With respect to the effects of the emitter separation and division, confirmation was made based upon light emission from the fluorescent plate, and there was an increase in the number of luminous points. Moreover, the electron-source array with the ballast resistance layer 2b had slightly greater variations, ±5 to 10% at the time of an emission current of 1 $\mu$A as compared with the ninth Example of the Embodiment 2; however, the one without the ballast resistance layer 2b had variations exceeding ±20%, thus failing to obtain a current as stable as the present embodiment.

As described above, the following effects are obtained by the electron-source array of the present invention.

First, cathode electrodes and a layer that is a pre-oxide in which pores are formed are independently formed; thus, the cathode electrodes, the electron-emitting sections and gate electrodes are formed into desired shapes by separating the functions of the respective layers, and the gate electrodes are placed in a manner so as to orthogonally intersect the cathode electrodes so that it becomes possible to provide X-Y matrix driving that is indispensable for achieving a display.

Moreover, the insulation film having the pores that form electron-emitting sections is placed in the form like islands so that, by reducing the area per electron-emitting section, it becomes possible to alleviate thermal strain caused by the substrate, cathode electrodes and gate electrodes, which might occur during the processes, etc.

In this case, in the arrangement capable of the X-Y matrix driving, areas on which the cathode electrodes and the gate electrodes intersect each other may be placed in a divided manner as unit elements, or the intersecting area may be divided into a plurality portions like islands. Moreover, in the case when the segment driving is carried out, within the area on which the cathode electrodes and the gate electrodes intersect each other, a plurality of insulation films, which have the above-mentioned pores forming the electron emitting sections, are placed in a divided manner so that the electron-source array is formed without being limited by the size of the electron emitting area. The size of the division is appropriately determined depending on the size, the constituent members, the process temperature, and other factors.

Furthermore, with an arrangement in which the gate electrodes are placed in a manner so as to surround the pores filled with an electron emitting material one by one, the distance between the electron emitting sections and the gate electrodes is shortened so that a low-voltage operation is available, and it is possible to efficiently concentrate an electric field onto the tip of the electron emission section.

The voltage-supply lines are separately installed so that, it becomes possible to solve problems of a voltage drop and signal delay due to an increase in the film thickness resistance, which occur when an increase in the thickness of the gate electrode film is not available.

The resistance layer for regulating an emission current is placed between the cathode electrodes and the electrode emitting material so that it becomes possible to stabilize and uniform the operation of the electron-source array. Moreover, the conductive material is further placed on the ballast resistance layer so that it becomes possible to reduce adverse effects from a barrier layer formed in the electron-emitting material and the resistance layer.

Moreover, in the case when the material to be filled in the pores is carbon nanotubes, the conductive layer is formed by a metal having a catalytic action so that it becomes possible to reduce the formation temperature, to minimize structural defects in the carbon nanotubes, and also to enable selective growth at necessary portions. In the case when the material to be filled into the pores is metal and a plating method is used, it is possible to use the conductive layer as a seed layer.

Furthermore, when the electron-emitting section is constituted by an aggregate having an electron-emitting material having a fine size, such as paste, as its main component, the electrode emitting section, formed on a cathode electrode surrounded by gate electrodes, is separated into a plurality divisions within the electron emitting area; thus, the electron emitting points are dispersed so that it becomes possible to stabilize and uniform the operation of the electron-source array.

Here, the insertion of a ballast resistance layer between the cathode electrodes and the electron emitting sections that have been separated and divided in a plural manner within the electron emitting area makes it possible to apply the function of the ballast resistance to the electron emitting sections one by one in parallel with each other; thus, it becomes possible to further stabilize and uniform the operation of the electron-source array.

Moreover, in the manufacturing method, in particular, the application of the anodic oxidation makes it possible to form fine pores easily without using a lithography process, and the method for removing the barrier layer formed by the anodic oxidization so as to allow the pores to penetrate is provided as a method in which the barrier layer is dissolved by applying a voltage reversed to that applied at the time of the anodic oxidation; thus, it is possible to provide a simple manufacturing method for removing only the barrier layer inside the fine pore by using a sequence of continuous processes.

Furthermore, a material that is resistant to an anodic oxidizing solution is used as the ballast resistance layer that is inserted between the cathode electrodes and the insulation film having the pores and filled with the electron emitting material; thus, this layer is used as a stopper layer for protecting the cathode electrodes, and for converting the pre-oxide completely to the insulation film, thereby making it possible to improve the yield.

Moreover, with another mode of the electron-source array in which the electron emitting section is constituted by an aggregate having an electron-emitting material having a fine size, such as paste, as its main component, it becomes possible to produce an electron-source array having superior characteristics by using a manufacturing method that is inexpensive and suitable for large areas without the need for vacuum processes, such as a printing method and an ink-jet method.

Moreover, in the driving method for the electron source, electrons are drawn from the emitter based upon the anode voltage, and the electrons are controlled by the gate current so that a uniform electric field is applied to the emitters that are developed two-dimensionally as described in the present embodiment; thus, it becomes possible to further improve the characteristics.

Moreover, the present invention features that, between the insulation film and the gate electrodes, a gate insulation layer is formed on areas on the insulation film in which no pores, filled with a conductive material or a semiconductor material to form electron emitting sections, are formed. With this arrangement, in a process where, upon forming the electron emitting sections, the electron emitting material is filled into only pores at desired positions, it is possible to prevent the electron emitting material from being filled into unnecessary portions.

Furthermore, the present invention features that a ballast resistance layer and a conductive layer are formed in this order from the surface of the cathode electrodes between the cathode electrodes formed on the insulation substrate and the electron emitting sections filled into the insulation film having the pores. The ballast resistance layer (resistance layer for regulating an emission current) is placed in such a manner that the operation of the electron-source array is stabilized, and uniformed; and the conductive material is provided in such a manner that it becomes possible to reduce the adverse effects of the barrier layer occurring in the electron emitting material and the resistance layer.

The present invention also features that, between the cathode electrodes formed on the insulation substrate and the electron emitting sections inserted into the insulation film having the pores, a ballast resistance layer and a conductive layer are formed in this order from the surface of the cathode electrodes, with the conductive layer being formed from a material exerting a catalytic action on the formation of carbon nanotubes or a mixture containing such a material as its main component. More preferably, the present invention features that the conductive layer is provided as metal layers made of any metal selected from the group consisting of metals of the iron family such as iron, nickel and cobalt, metals of the platinum family such as platinum, palladium, ruthenium and rhodium, and rare earth metals such as yttrium, lanthanum and cerium, or alloy layers, etc. containing these metals as their main component.

In the case when the material to be filled into the pores is carbon nanotubes, the formation of the cathode electrode layer by using a transition metal, etc. having a catalytic action, such as iron, makes it possible to provide the following effects: a low formation temperature, a reduction in structural defects in the carbon nanotubes, and a selective growth at necessary portions. More specifically, the above-mentioned materials may be used as such materials having a catalytic action.

Different from a method in which a catalyst material is filled after the penetration of the pores and carbon nanotubes are then grown, for example, as disclosed in reference 2, the application of a method in which a catalyst material is preliminarily blended into the base electrode layer as described in the present application makes it possible to eliminate the filling process of the catalyst material after the formation of the pores. In terms of processes, the difference from this reference is that the catalyst material is provided at the initial stage or the catalyst is added later on; however, since the electron-source array of the present application is formed through generally-used processes such as film formation and patterning, it is advantageous from the viewpoint of the yield. Moreover, in the case of the electron-source formation by the use of an aluminum single layer as disclosed in reference 2, the patterning of aluminum determines the area of formation of the electron source; in contrast, in the case of the present application, the aluminum layer in which pores are formed and the electrode layer for anode oxidation are formed in a separated manner so that the electron-source array can be formed at any desired areas.

The present invention also features that, between the cathode electrodes formed on the surface of a substrate and the electron emitting sections inserted into the insulation film having the pores, a ballast resistance layer and a conductive layer are formed in this order from the surface of the cathode electrodes, with the conductive layer being formed from a material that serves as a seed layer in a plating method. More preferably, the conductive layer is made of at least one material selected from the group consisting of metal materials, such as nickel, iron, cobalt, rhodium, chromium, platinum, copper, gold and silver, or the group consisting of alloy materials, each containing nickel, iron, cobalt, rhodium, chromium, platinum, copper, gold or silver as a main component.

Here, the material to be filled into the pours is properly selected from carbon nanotubes, or metals such as nickel, iron, cobalt, rhodium, chromium, platinum, copper, gold and silver, or semiconductor materials, such as boron nitride and silicon, etc. In the case when the material to be filled into the pores is carbon nanotubes, the formation of the cathode electrode layer by using a transition metal having a catalytic action, such as iron, makes it possible to provide the following effects: a low formation temperature, a reduction in structural defects in the carbon nanotubes, and a selective growth at necessary portions.

The electron-source array of the present invention, which is provided with cathode electrodes placed on an insulation substrate in the form of lines, and gate electrodes that are placed face to face therewith with the insulation film being interpolated in between, may be arranged so that the gate electrodes are placed in a manner so as to surround each of electron emitting areas that are developed planarly on the cathode electrodes, and electron emitting sections, which form a plurality of separated divisions on each cathode electrode, are formed within the electron emitting area, with each electron emitting section being constituted by an aggregate mainly formed by an electron emitting material having a fine size. In this arrangement, a ballast resistance layer may be inserted between the cathode electrodes and the electron emitting sections that form the separated divisions within the electron emitting area.

The ballast resistance layer is placed in such a manner that the ballast resistance layer is inserted to the respective electron emitting sections in parallel with each other; thus, it becomes possible to stabilize and uniform the operation of the electron-source array.

The manufacturing method of the electron-source array is characterized by comprising the steps of: patterning cathode electrodes on the surface of a substrate, patterning a ballast resistance layer, patterning a pre-oxide that is to form an insulation film having pores on the ballast resistance layer, forming the pores in the pre-oxide while converting it into an insulation film, filling the pores with an electron emitting material, patterning gate electrodes, and patterning a gate insulation film.

Moreover, the manufacturing method of another electron-source array of the present invention is characterized by comprising the steps of: patterning cathode electrodes on the surface of a substrate, patterning an insulation film on the cathode electrodes and the insulation substrate, patterning a ballast resistance layer, patterning a conductive layer on the ballast resistance layer, patterning a gate insulation film, patterning a pre-oxide that forms an insulation film having the pores on the conductive layer, forming pores in the pre-oxide while converting it into an insulation film, further patterning the insulation film, filling the pores with an electron emitting material, and patterning the gate electrodes, said pattern-forming process of the gate electrodes containing a patterning process for first gate electrodes and a patterning process for second gate electrodes.

Among the above-mentioned manufacturing processes, in the process for forming pores in the pre-oxide after the process for patterning the pre-oxide that forms an insulation film having pores, the present invention features that an anodic oxidation method is adopted by using the cathode electrodes as the corresponding electrodes. In other words, the present invention features that the anodic oxidation method is used as a method for forming the insulation film having pores, and that a method for removing a barrier layer formed through the anodic oxidation and for allowing the pores to penetrate is provided as a method for dissolving the barrier layer by applying a voltage reversed to that of the cathode oxidizing method. In this case, a material, such as platinum and gold, that is resistant to a cathode oxidizing solution is used as the conductive layer; thus, it is possible to use the ballast resistance layer as a stopper layer for protecting the cathode electrodes, for completely converting the pre-oxide into the insulation film, and for allowing the pores to penetrate.

Moreover, with respect to the method for filling carbon nanotubes in the pores of the insulation film as the electron emitting material, selection may be preferably made from a CVD method for decomposing and exciting a material gas by using heat or electromagnetic waves (microwaves, light, etc.) and other methods, and with respect to the method for filling metal as the electron emitting material, a plating method, etc. may be used.

Moreover, in order to solve the aforementioned objectives, another electron-source array of the present invention is characterized in that a ballast resistance layer is inserted between the cathode electrodes formed on the insulation substrate and the electron emitting sections filled into the insulation film having the pores. In this arrangement, the electron emitting sections are vertically oriented with respect to the substrate in the pores regularly, and the respective electron emitting sections are electrically insulated from each other by the pores. Since the ballast resistance layer (resistance layer for regulating emission current) is placed in this manner, the ballast resistance layer is inserted in each of the electron emitting sections in parallel with each other; thus, it becomes possible to stabilize and uniform the operation of the electron-source array.

Moreover, in another manufacturing method of an electron-source array is provided with the steps of: patterning cathode electrodes on a surface of a substrate; patterning a ballast resistance layer; patterning a pre-oxide that is to form an insulation film having pores on the ballast resistance layer; forming the pores in the pre-oxide and converting the pre-oxide into the insulation film; filling the pores with an electron emitting material; patterning gate electrodes; and patterning a gate insulation film, said patterning process of the gate electrodes including a process for patterning first gate electrodes and a process for patterning second gate electrodes.

Moreover, the manufacturing method is further characterized in that, in the process for forming the pores in the pre-oxide after the process of patterning the pre-oxide that is to form the insulation film with pores, an anodic oxidation method is adopted by using the cathode electrodes as corresponding electrodes. In other words, the method for forming the insulating film having the pores is an anodic oxidizing method, and the method for removing the barrier layer formed by the anodic oxidation so as to allow the pores to penetrate is a method for dissolving the barrier layer by applying a voltage reversed to that of the anodic oxidation. At this time, when a material, such as silicon and silicon carbide, that is resistant to an anodic oxidizing solution is used as the ballast resistance layer, it becomes possible to allow the ballast resistance layer to serve as a stopper layer for protecting the cathode electrodes, for completely converting the pre-oxide to the insulating film, and for allowing the pores to penetrate.

Moreover, in another manufacturing method of the electron-source array, in the case when the electron emitting section is constituted by an aggregate mainly formed by an electron emitting material having a fine size, such as carbon nanotube, carbon fibers, graphite, diamond and diamond-like carbon, the method for forming the electron emitting sections that are a plurality of separated divisions within each of the electron emitting areas that develop two-dimensionally on the cathode electrode is provided as a method in which: a dispersing solution formed by dispersing a fine electron emitting material constituting the electron emitting sections in a dispersion medium is divided separately to form the electron emitting sections by a printing method using a mask that has been patterned, or the dispersing solution is discharged through a fine nozzle so as to be divided separately to form the electron emitting sections.

Since the above-mentioned electron emitting sections are an aggregate mainly constituted by an electron emitting material having a fine size, this is provided as paste when dispersed into the dispersion medium. For this reason, the cathode electrodes and gate electrodes, and the other constituent elements such as the gate insulation film, may be formed by using the paste, thereby making it possible to adopt an inexpensive method such as a printing method and an ink jet method. Thus, it becomes possible to form an electron-source array with a large area at low costs.

In the controlling method of emission electrons in the electron-source array, supposing that a voltage applied to the anode electrodes is $V_A$, a voltage applied to the gate electrode wires is $V_G$; the distance from the electron emitting sections to the anode electrodes is $d_A$ and the distance from the electron emitting sections to the gate electrode wires is $d_G$, the electrons emitted from the electron emitting sections are controlled in the range of $V_A/d_A = V_G/d_G$. This means that the factor which controls the electron emitting phenomenon lies in the anode voltage.

In the construction of the electron-source array in the present invention, different from the conic shape metal emitter of the Spindt type made of metal, the emitter is placed two-dimensionally. For this reason, when electrons are drawn by using the gate voltage in the construction of the present invention, the electric-field intensity is greatly dependent on the distance between the gate electrodes and the emitter surface, with the result that it is not possible to provide a uniform electric field on the emitter surface.

In contrast, in the case when electrons are drawn by using the anode voltage, since the substrate bearing the emitters and the substrate bearing the anode electrodes are aligned face to face in a parallel plate construction in a generally-used display, the equipotential surface, formed by the anode electrode, becomes in parallel with the substrate with respect to the emitter surface so that, even when the gate electrode is formed in a manner so as to surround the periphery of the electron emitting area, it is possible to obtain a uniform electric field on the emitter surface.

Moreover, even in the case when the gate electrode is placed as a mesh above the electron emitting areas, electric lines of force, which proceed from the emitter surface toward the anode electrode, are not allowed to directly enter the gate electrode; therefore, it is possible to reduce electrons to be absorbed by the gate electrode, and consequently to improve the emission electron efficiency.

Since carbon-based materials, such as carbon nanotubes, diamond and carbon fibers, make it possible to provide the above-mentioned driving, the present invention can produce an electron-source array having superior characteristics by using such a material as the electron emitting material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electron-source array comprising:
    cathode electrodes placed on an insulation substrate in the form of lines;
    gate electrodes that are placed face to face with the cathode electrodes with an insulation film being interpolated in between;
    electron emitting areas, which are surrounded by the gate electrodes and developed planarly on the cathode electrodes; and electron emitting sections, which are formed in a plurality of divided areas of the electron emitting areas, with each electron emitting section being constituted by an aggregate mainly formed by an electron emitting material having a fine size, wherein a ballast resistance layer is inserted between the cathode electrodes formed on the insulation substrate and the electron emitting sections.

2. An electron-source array comprising:

cathode electrodes placed on an insulation substrate in the form of lines; and gate electrodes that are placed face to face with the cathode electrodes with an insulation film being interpolated in between, wherein the gate electrodes are placed in a manner so as to surround each of electron emitting areas that are developed planarly on the cathode electrodes, and wherein electron emitting sections, which form a plurality of separated divisions on each cathode electrode, are formed within the electron emitting area, with each electron emitting section being constituted by an aggregate mainly formed by an electron emitting material having a fine size, and wherein a ballast resistance layer is inserted between the cathode electrodes formed on the insulation substrate and the electron emitting sections.

3. The electron-source array as defined in claim 2, wherein the electron emitting material is a carbon-based material selected from the group consisting of carbon nanotube, carbon fibers, graphite, diamond, and diamond-like carbon.

4. The electron-source array as defined in claim 2, further comprising:

(1) a substrate which is placed face to face with the insulation substrate; and (2) anode electrodes which are formed on the substrate described in (1).

5. An electron-source array comprising:

cathode electrodes placed on an insulation substrate in the form of lines; and gate electrodes that are placed face to face with the cathode electrodes with an insulation film being interpolated in between, wherein the cathode electrodes and the gate electrodes are arranged so as to intersect each other with a pore being formed at an intersecting portion between each cathode electrode and each gate electrode in a manner so as to penetrate the insulation film, and wherein the pore is filled with a conductive material or a semiconductive material to form an electron emitting section, with the material being electrically connected to the corresponding cathode electrode, and is formed in a manner so as to separate from the gate electrodes with a space in between, and is anchored on side faces.

6. The electron-source array as defined in claim 5, wherein the gate electrodes are formed in a manner so as to surround at least one of the pores filled with an electron emitting material.

7. The electron-source array as defined in claim 5, wherein the gate electrodes are constituted by a first gate insulation layer that is formed in a manner so as to surround the pore and a second gate insulation layer that is formed on areas on which no pores are formed.

8. The electron-source array as defined in claim 5, wherein a gate insulation layer is formed on an area on the insulation film without pores that are filled with a conductive material or a semiconductor material to form an electron emitting section, between the insulation film and the gate electrode.

9. The electron-source array as defined in claim 5, wherein the pore is filled with a carbon nanotube as the conductive material.

10. The electron-source array as defined in claim 5, wherein the pore is filled with any one of nickel, iron, cobalt, rhodium, chromium, platinum, copper, gold, and silver as the conductive material.

11. The electron-source array as defined in claim 5, wherein the pore is filled with either boron nitride or silicon, as the semiconductor material.

12. The electron-source array as defined in claim 5, wherein a diameter of the pore is in a range of 10 nm to 100 nm.

13. The electron-source array as defined in claim 5, further comprising:

(1) a substrate which is placed face to face with the insulation substrate; and (2) anode electrodes which are formed on the substrate described in (1).

14. The electron-source array as defined in claim 5, wherein, between the cathode electrodes formed on the insulation substrate and the electron emitting section filled into the insulation film having the pores, a ballast resistance layer and a conductive layer are formed in this order from the cathode electrode surface, the conductive layer being formed of any one of nickel, iron, cobalt, rhodium, chromium, platinum, copper, gold, and silver.

15. The electron-source array as defined in claim 5, wherein, between the cathode electrodes formed on the insulation substrate and the electron emitting section filled into the insulation film having the pores, a ballast resistance layer and a conductive layer are formed in this order from the cathode electrode surface, the conductive layer being formed of an alloy material containing any one of nickel, iron, cobalt, rhodium, chromium, platinum, copper, gold, and silver, as a main component.

16. The electron-source array as defined in claim 5, wherein, between the cathode electrodes formed on the insulation substrate and the electron emitting section filled into the insulation film having the pores, a ballast resistance layer and a conductive layer are formed in this order from the cathode electrode surface, the conductive layer being made from a material capable of exerting a catalytic action upon forming carbon nanotubes or a mixture containing the material as a main component.

17. The electron-source array as defined in claim 16, wherein a first resistance material having resistance to an anodic oxidizing solution for forming the insulation film is adopted as said conductive layer.

18. The electron-source array as defined in claim 16, wherein the conductive layer is made of platinum.

19. The electron-source array as defined in claim 5, wherein a ballast resistance layer is inserted between the cathode electrodes formed on the insulation substrate and the electron emitting section filled into the insulation film having the pores.

20. The electron-source array as defined in claim 19, wherein a second resistance material is adopted as said ballast resistance layer, said second resistance material being effective to prevent corrosion of the ballast resistance layer by an anodic solution for forming the insulation film.

21. The electron-source array as defined in claim 19, wherein the ballast resistance layer is made of either Si or SiC.

* * * * *